United States Patent
Woo et al.

(10) Patent No.: US 12,254,234 B2
(45) Date of Patent: Mar. 18, 2025

(54) APPARATUS AND METHOD FOR PROVIDING CONTENTS RELATED TO AUGMENTED REALITY SERVICE BETWEEN ELECTRONIC DEVICE AND WEARABLE ELECTRONIC DEVICE

(71) Applicant: Samsung Electronics Co., Ltd., Suwon-si (KR)

(72) Inventors: Youngchan Woo, Suwon-si (KR); Donghee Kang, Suwon-si (KR); Choonkyoung Moon, Suwon-si (KR); Christian Park, Suwon-si (KR); Joayoung Lee, Suwon-si (KR); Jiwon Jeon, Suwon-si (KR); Hoon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/608,190

(22) Filed: Mar. 18, 2024

(65) Prior Publication Data

US 2024/0220185 A1 Jul. 4, 2024

Related U.S. Application Data

(63) Continuation of application No. 17/992,213, filed on Nov. 22, 2022, now Pat. No. 11,934,735, which is a (Continued)

(30) Foreign Application Priority Data

Nov. 9, 2021 (KR) .......................... 10-2021-0153043

(51) Int. Cl.
*G09G 5/00* (2006.01)
*G06F 3/01* (2006.01)
(Continued)

(52) U.S. Cl.
CPC ............ *G06F 3/1454* (2013.01); *G06F 3/017* (2013.01); *G06T 11/00* (2013.01); *G06V 20/20* (2022.01); *G06F 3/013* (2013.01); *G06F 3/0482* (2013.01)

(58) Field of Classification Search
CPC .......... G02B 27/017; G02B 2027/0178; G06F 3/013; G06F 3/017; G06F 3/0482;
(Continued)

(56) References Cited

U.S. PATENT DOCUMENTS

| 9,442,689 B2 | 9/2016 | Chi et al. |
| 9,626,806 B2 | 4/2017 | Kaino et al. |

(Continued)

FOREIGN PATENT DOCUMENTS

| CN | 106569725 A | | 4/2017 |
| JP | 2010067154 A | * | 3/2010 |

(Continued)

OTHER PUBLICATIONS

European Search Report dated Apr. 5, 2024, issued in European Application No. 22893183.8.

(Continued)

*Primary Examiner* — Joe H Cheng
(74) *Attorney, Agent, or Firm* — Jefferson IP Law, LLP

(57) ABSTRACT

A method and a device capable of supporting various display methods using an electronic device and/or glasses-type wearable electronic device (e.g., AR glasses) in an augmented reality (AR) are provided. An AR providing device for AR services includes a display and a processor. The processor is configured to provide content through an AR screen, detect a specified external object through the AR screen while providing the content, determine a display mode for providing the content, based on detection of the specified external object, control to display the content (Continued)

through a display of the specified external object, based on the determined display mode, and perform control to display the content through a virtual display area associated with the specified external object on the AR screen, based on the determined display mode.

20 Claims, 53 Drawing Sheets

Related U.S. Application Data continuation of application No. PCT/KR2022/017539, filed on Nov. 9, 2022.

(51) Int. Cl.
*G06F 3/14* (2006.01)
*G06T 11/00* (2006.01)
*G06V 20/20* (2022.01)
*G06F 3/0482* (2013.01)

(58) Field of Classification Search
CPC ......... G06F 3/1454; G06F 3/147; G09G 5/14; G09G 2340/12; G06V 20/20; G06T 11/00
See application file for complete search history.

(56) References Cited

U.S. PATENT DOCUMENTS

| | | | |
|---|---|---|---|
| 9,870,050 B2 | 1/2018 | Du | |
| 10,134,349 B2* | 11/2018 | Zhang | .................. H04B 1/10 |
| 10,275,023 B2 | 4/2019 | McKenzie et al. | |
| 10,338,673 B2 | 7/2019 | Chen et al. | |
| 10,551,920 B2* | 2/2020 | Joo | .................. G02B 27/0093 |
| 10,950,205 B2 | 3/2021 | Lee et al. | |
| 11,023,109 B2 | 6/2021 | Pahud et al. | |
| 11,094,133 B2 | 8/2021 | Warren et al. | |
| 11,120,630 B2 | 9/2021 | Choi et al. | |
| 11,222,477 B2 | 1/2022 | Moon et al. | |
| 11,302,037 B2 | 4/2022 | Moon et al. | |
| 11,508,134 B2 | 11/2022 | Kawamae et al. | |
| 11,538,443 B2 | 12/2022 | Woo et al. | |
| 11,610,371 B2 | 3/2023 | Powderly et al. | |
| 11,635,805 B2 | 4/2023 | Lee et al. | |
| 11,778,269 B1 | 10/2023 | Hess | |
| 11,934,735 B2* | 3/2024 | Woo | ....................... G06F 3/147 |
| 2012/0302289 A1 | 11/2012 | Kang | |
| 2013/0187835 A1 | 7/2013 | Vaught et al. | |
| 2015/0062022 A1 | 3/2015 | Rabii | |
| 2015/0123966 A1 | 5/2015 | Newman | |
| 2016/0196693 A1 | 7/2016 | Kobayashi et al. | |
| 2017/0150139 A1 | 5/2017 | Lee et al. | |
| 2018/0158242 A1* | 6/2018 | Sugawara | .............. G06F 3/012 |
| 2019/0265781 A1 | 8/2019 | Kehoe et al. | |
| 2021/0011542 A1* | 1/2021 | Sumner | ................. G06T 19/006 |
| 2021/0034222 A1 | 2/2021 | Brems et al. | |
| 2021/0158624 A1 | 5/2021 | Moon et al. | |
| 2021/0255461 A1 | 8/2021 | Watanabe et al. | |
| 2021/0335047 A1 | 10/2021 | Heun et al. | |
| 2023/0094073 A1 | 3/2023 | Ko et al. | |
| 2023/0124173 A1 | 4/2023 | Hashimoto et al. | |
| 2023/0141870 A1 | 5/2023 | Nomura | |

FOREIGN PATENT DOCUMENTS

| | | |
|---|---|---|
| KR | 10-2016-0032269 A | 3/2016 |
| KR | 10-2017-0089662 A | 8/2017 |
| KR | 10-2020-0061930 A | 6/2020 |
| KR | 10-2251710 B1 | 5/2021 |
| KR | 10-2021-0063928 A | 6/2021 |
| WO | 2021/193062 A1 | 9/2021 |

OTHER PUBLICATIONS

International Search Report dated Feb. 24, 2023, issued in International Application No. PCT/KR2022/017539.

\* cited by examiner

FIG. 7A
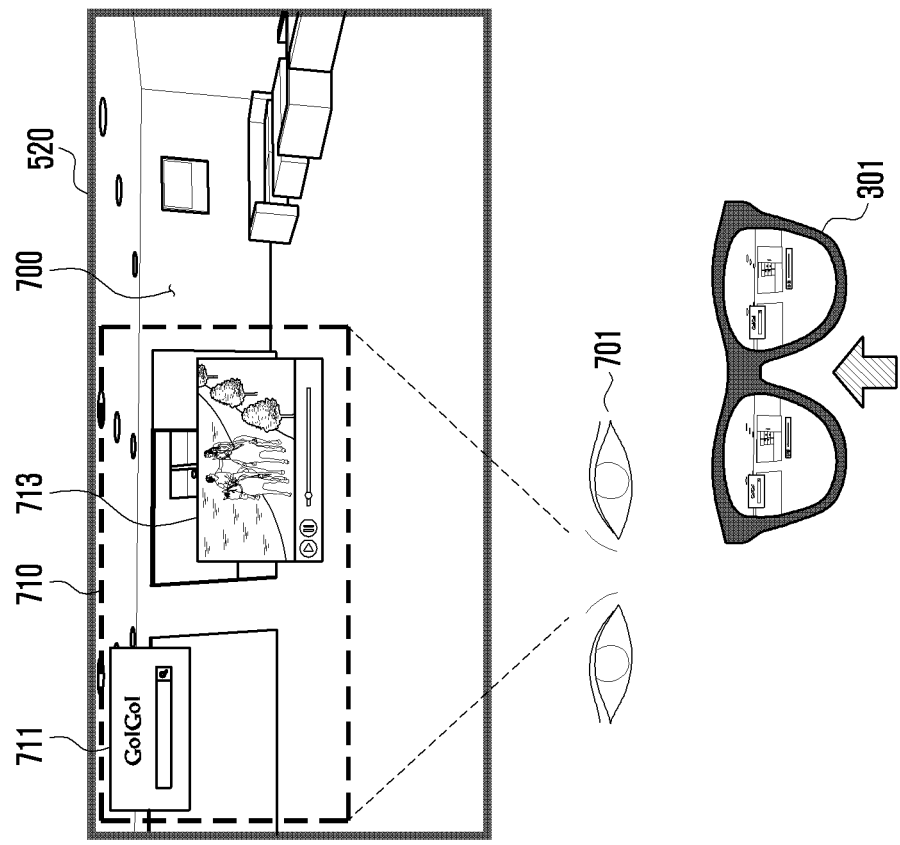
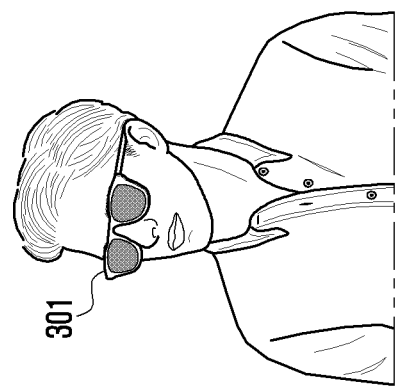

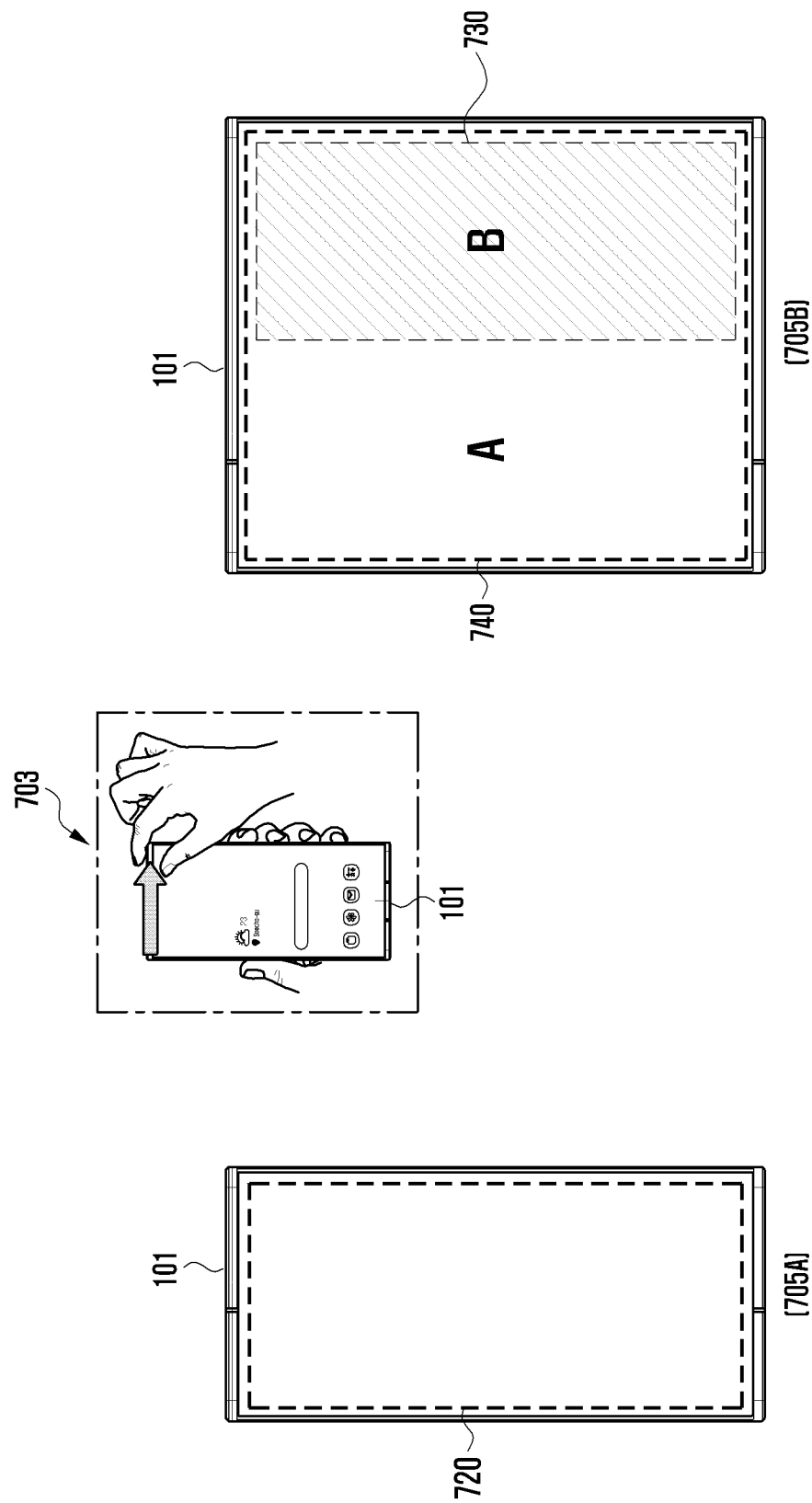

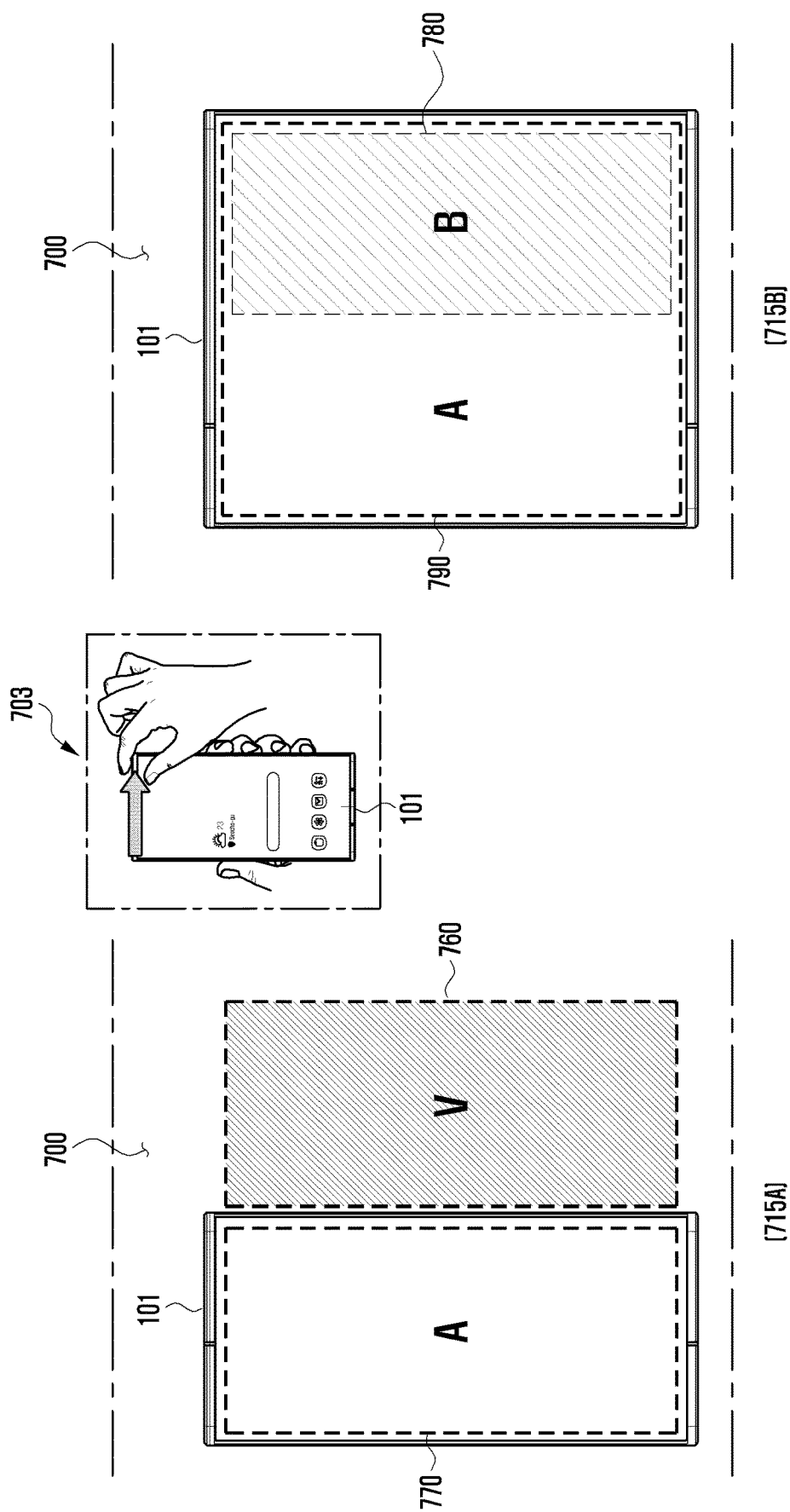

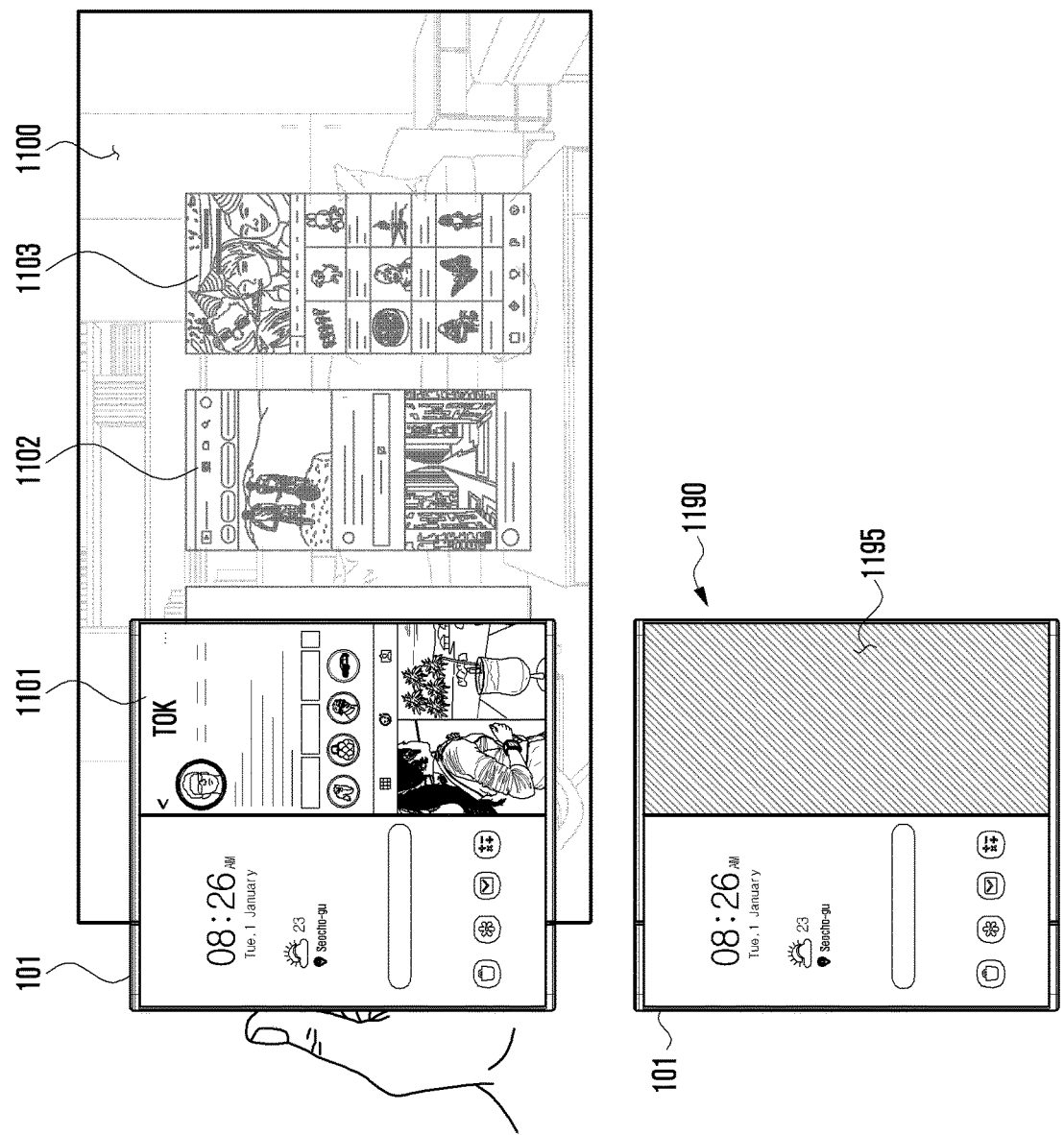

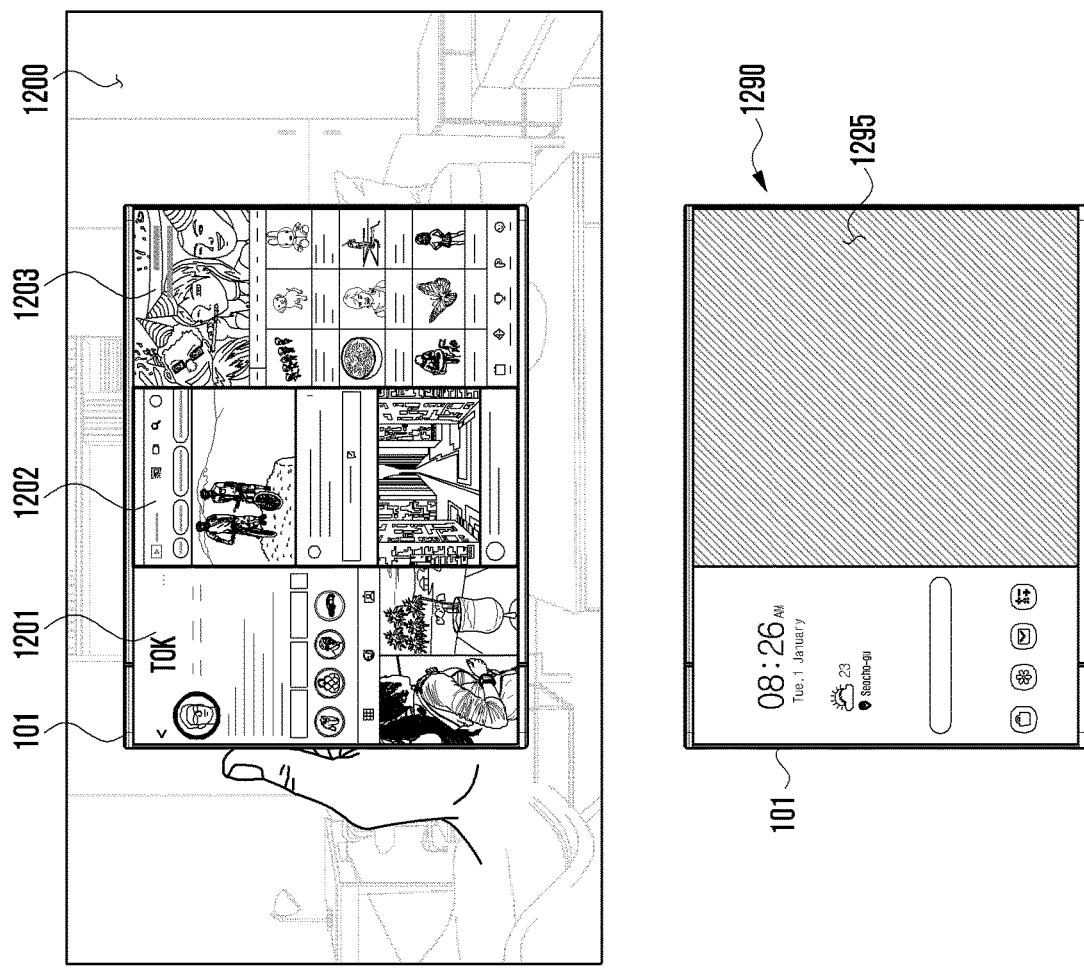

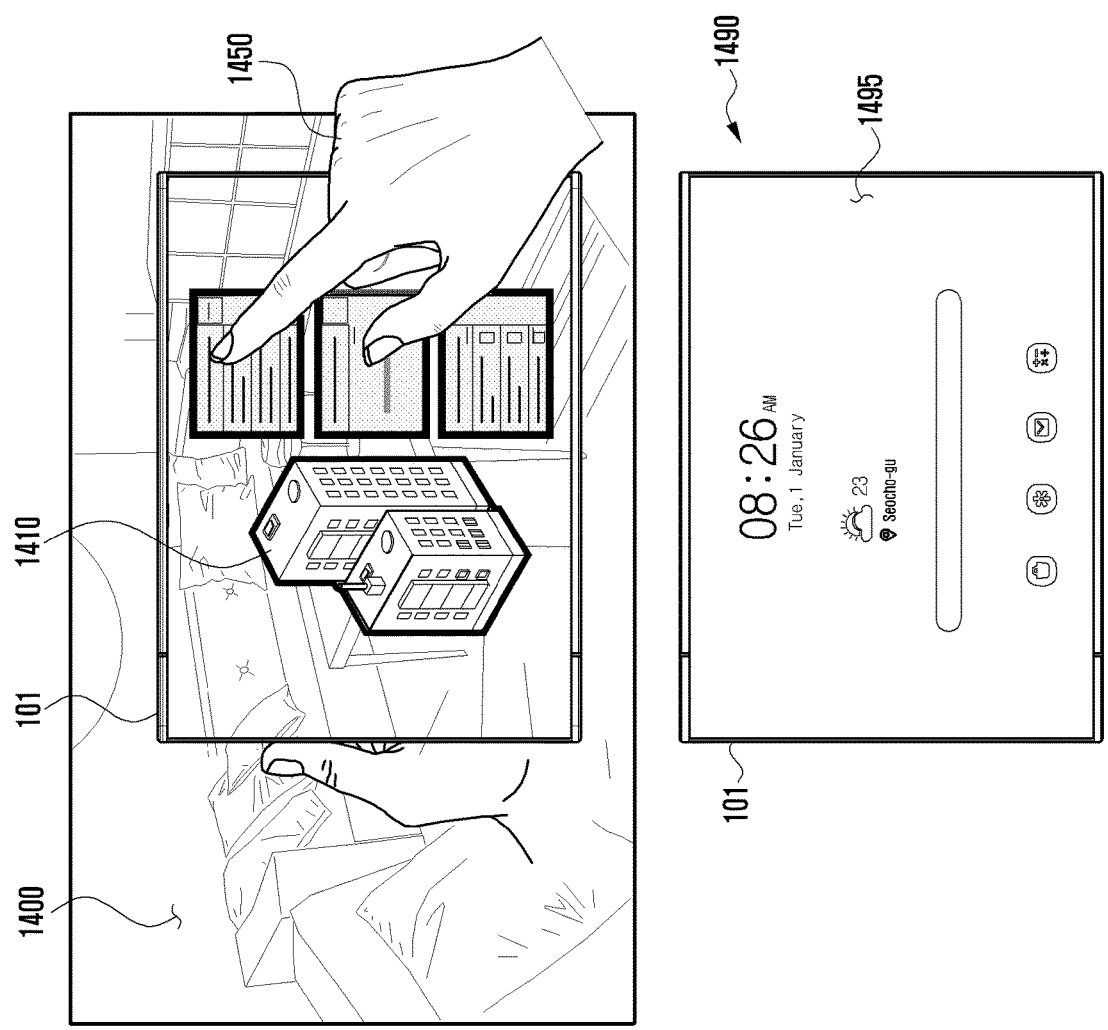

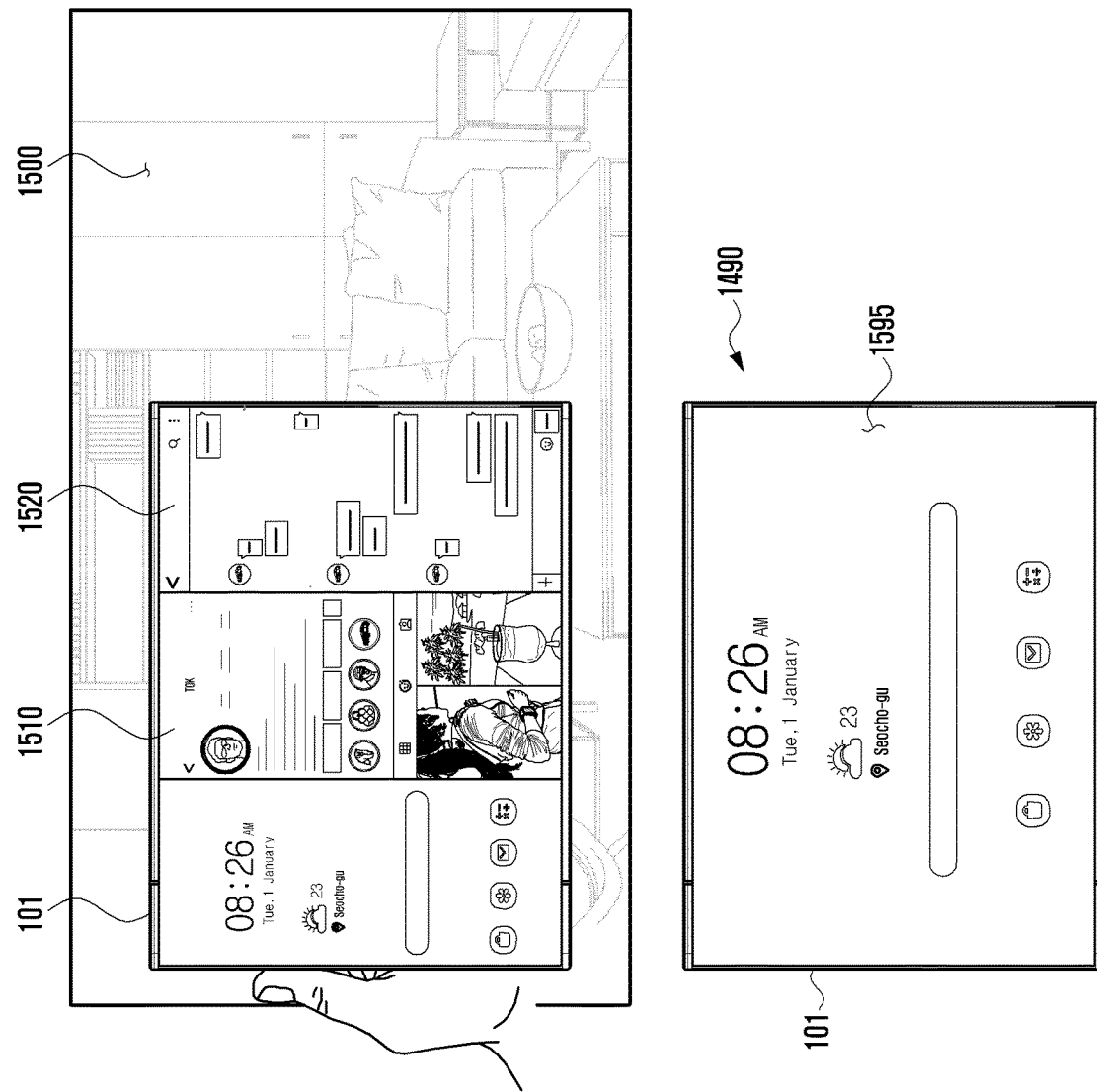

APPARATUS AND METHOD FOR PROVIDING CONTENTS RELATED TO AUGMENTED REALITY SERVICE BETWEEN ELECTRONIC DEVICE AND WEARABLE ELECTRONIC DEVICE

CROSS-REFERENCE TO RELATED APPLICATION(S)

This application is a continuation application of prior application Ser. No. 17/992,213, filed on Nov. 22, 2022, which has issued as U.S. Pat. No. 11,934,735 on Mar. 19, 2024, which is a continuation application, claiming priority under § 365(c), of an International application No. PCT/KR2022/017539, filed on Nov. 9, 2022, which is based on and claims the benefit of a Korean patent application number 10-2021-0153043, filed on Nov. 9, 2021, in the Korean Intellectual Property Office, the disclosure of which is incorporated by reference herein in its entirety.

TECHNICAL FIELD

The disclosure relates to a method and an apparatus capable of supporting various display methods using an electronic device and/or a glasses-type wearable electronic device (e.g., AR glasses) in augmented reality (AR).

BACKGROUND ART

Recently, research and development of extended reality (XR) technologies such as virtual reality (VR), augmented reality (AR), and/or mixed reality (MR) have been conducted. VR, AR, and/or MR technologies have been used in various fields (e.g., entertainment, infotainment, smart homes, and/or smart factories), and hardware parts and/or software parts of an electronic device for the same are actively being researched and developed.

For example, a wearable electronic device may superimpose, through an application related to an AR service, a variety of digital content (e.g., virtual images) on the real world (or overlay the real world with the digital content) alone (e.g., a standalone method) or in association with at least two devices (e.g., a tethered method), thereby providing one image through a display of the wearable electronic device. For example, recently, AR environments such as a tethered AR method in which an electronic device (e.g., a smartphone) and a wearable electronic device are connected to provide virtual content produced by the electronic device through a display of the wearable electronic device and a standalone AR method in which a wearable electronic device independently produces virtual content without connection with an electronic device and provides the same through a display have been implemented.

As described above, in line with the recent technological development of AR services, the number of users using the AR services is increasing, and thus user needs are also increasing. For example, users who use AR services have an increasing demand for selecting and displaying content more accurately and intuitively in an AR environment.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Aspects of the disclosure are to address at least the above-mentioned problems and/or disadvantages and to provide at least the advantages described below. Accordingly, an aspect of the disclosure is to provide a method and an apparatus capable of supporting screen switching for displaying virtual content and content movement between devices in an AR environment using an electronic device and/or a wearable electronic device.

Another aspect of the disclosure is to provide a method and an apparatus capable of supporting content operation depending on an AR environment and a mobile environment by providing content through a display area and/or a virtual extension area of an electronic device while implementing an AR environment using a wearable electronic device.

Another aspect of the disclosure is to provide a method and an apparatus capable of, in the state in which virtual content is displayed through a wearable electronic device, determining a display mode for displaying the virtual content through interaction between an electronic device and the wearable electronic device, and providing the virtual content through the electronic device and/or the wearable device, based on the determined display mode.

Another aspect of the disclosure is to provide a method and an apparatus capable of, while providing an AR environment, providing content through a display area of an electronic device or a display area of an electronic device in the AR environment of a wearable electronic device and/or a virtual display area based on an electronic device.

Another aspect of the disclosure is to provide a method and an apparatus capable of, while providing an AR environment, determining a device to provide virtual content, based on an operation entity implementing the AR environment and providing virtual content to correspond to a display area of the determined device.

Additional aspects will be set forth in part in the description which follows and, in part, will be apparent from the description, or may be learned by practice of the presented embodiments.

Solution to Problem

In accordance with an aspect of the disclosure, an augmented reality (AR) providing device for AR services is provided. The device includes a display module and a processor. The processor is configured to provide content through an AR screen, detect a specified external object through the AR screen while providing the content, determine a display mode for providing the content, based on detection of the specified external object, and, based on the determined display mode, perform control to display the content through a display of the specified external object, based on the determined display mode, or may perform control to display the content through a virtual display area associated with the specified external object on the AR screen, based on the determined display mode.

In accordance with another aspect of the disclosure, an augmented reality (AR) providing device for AR services is provided. The device includes a display and a processor. The processor is configured to display content through the display, recognize an external device corresponding to the external object on the AR screen while displaying the content through the display, monitor a change in state of the external device if the external device is a specified external device, determine a processing entity related to the content, based on identifying the change in state of the external device, determine a display mode of the content, based on the determined processing entity, perform control to display the content on an AR screen through the display, based on the determined display mode, and control the external device to display the content through the display of the external device, based on the determined display mode.

In accordance with another aspect of the disclosure, a method of providing an augmented reality (AR) service is provided. The method includes providing content through an AR screen, detecting a specified external object through the AR screen while providing the content, determining a display mode for providing the content, based on the detection of the specified external object, and, based on the determined display mode, performing control to display the content through a display of the specified external object or performing control to display the content through a virtual display area associated with the specified external object on the AR screen.

In order to solve the above problems, various embodiments of the disclosure may provide a computer-readable recording medium recording a program for executing the method in a processor.

Further scope of applicability of the disclosure will become apparent from the following detailed description. However, since various changes and modifications within the spirit and scope of the disclosure are to be clearly understood by those skilled in the art, it should be understood that the detailed description and specific embodiments, such as preferred embodiments of the disclosure, are given by way of example only.

Advantageous Effects of Invention

According to an electronic device and a method of operating the same according to the disclosure, it is possible to more intuitively support screen switching for displaying content (e.g., AR content) and content movement between devices in an AR environment using an electronic device and/or a wearable electronic device. According to the disclosure, it is possible to provide content through a display area and/or a virtual extension area of an electronic device while implementing an AR environment using a wearable electronic device. According to the disclosure, it is possible to support various content operations depending on an AR environment and a mobile environment.

According to the disclosure, it is possible to determine a display mode to display virtual content through interaction between an electronic device and a wearable electronic device in the state in which content is displayed through the wearable electronic device. According to the disclosure, it is possible to provide content in various ways through an electronic device and/or a wearable device, based on the determined display mode. According to the disclosure, it is possible to provide content in various ways through a display area of an electronic device or a display area of an electronic device in an AR environment of a wearable electronic device and/or a virtual display area based on an electronic device while providing the AR environment.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIGS. 7A, 7B, 7C, and 7D are diagrams illustrating an example of selectively displaying content between an electronic device and a wearable electronic device according to various embodiments of the disclosure;

FIGS. 11A, 11B, 11C, 11D, 11E, and 11F are diagrams illustrating an example of operation scenarios of an electronic device or a wearable electronic device according to various embodiments of the disclosure;

FIGS. 12A, 12B, 12C, 12D, 12E, and 12F are diagrams illustrating an example of operation scenarios of an electronic device or a wearable electronic device according to various embodiments of the disclosure;

FIGS. 14A, 14B, 14C, 14D, 14E, and 14F are diagrams illustrating an example of operation scenarios of an electronic device or a wearable electronic device according to various embodiments of the disclosure;

FIGS. 15A, 15B, 15C, 15D, 15E, and 15F are diagrams illustrating an example of operation scenarios of an electronic device or a wearable electronic device according to various embodiments of the disclosure;

Throughout the drawings, like reference numerals will be understood to refer to like parts, components, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
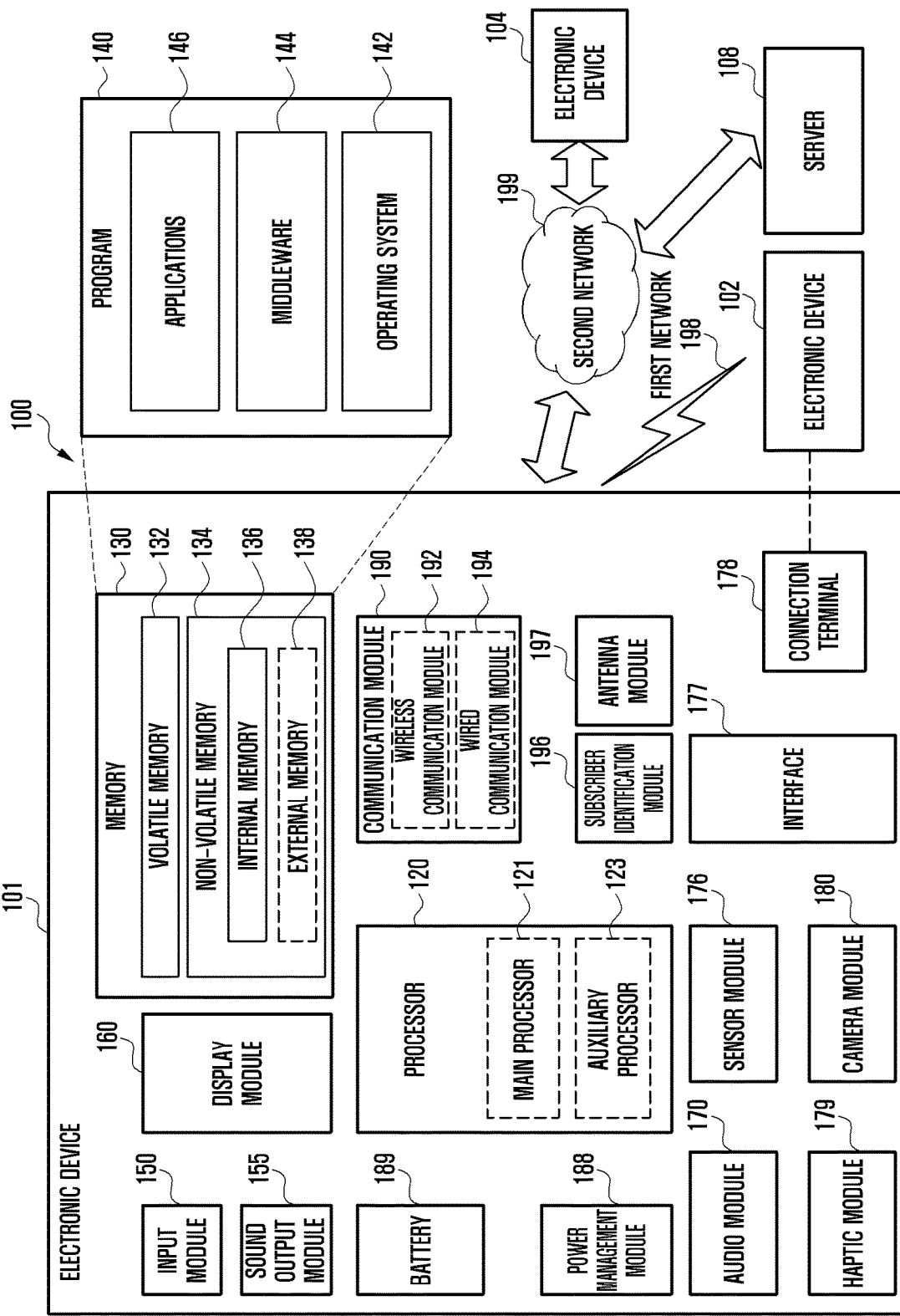
FIG. 1 is a block diagram illustrating an example electronic device in a network environment according to an embodiment of the disclosure.

FIG. 1 is a block diagram illustrating an example electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
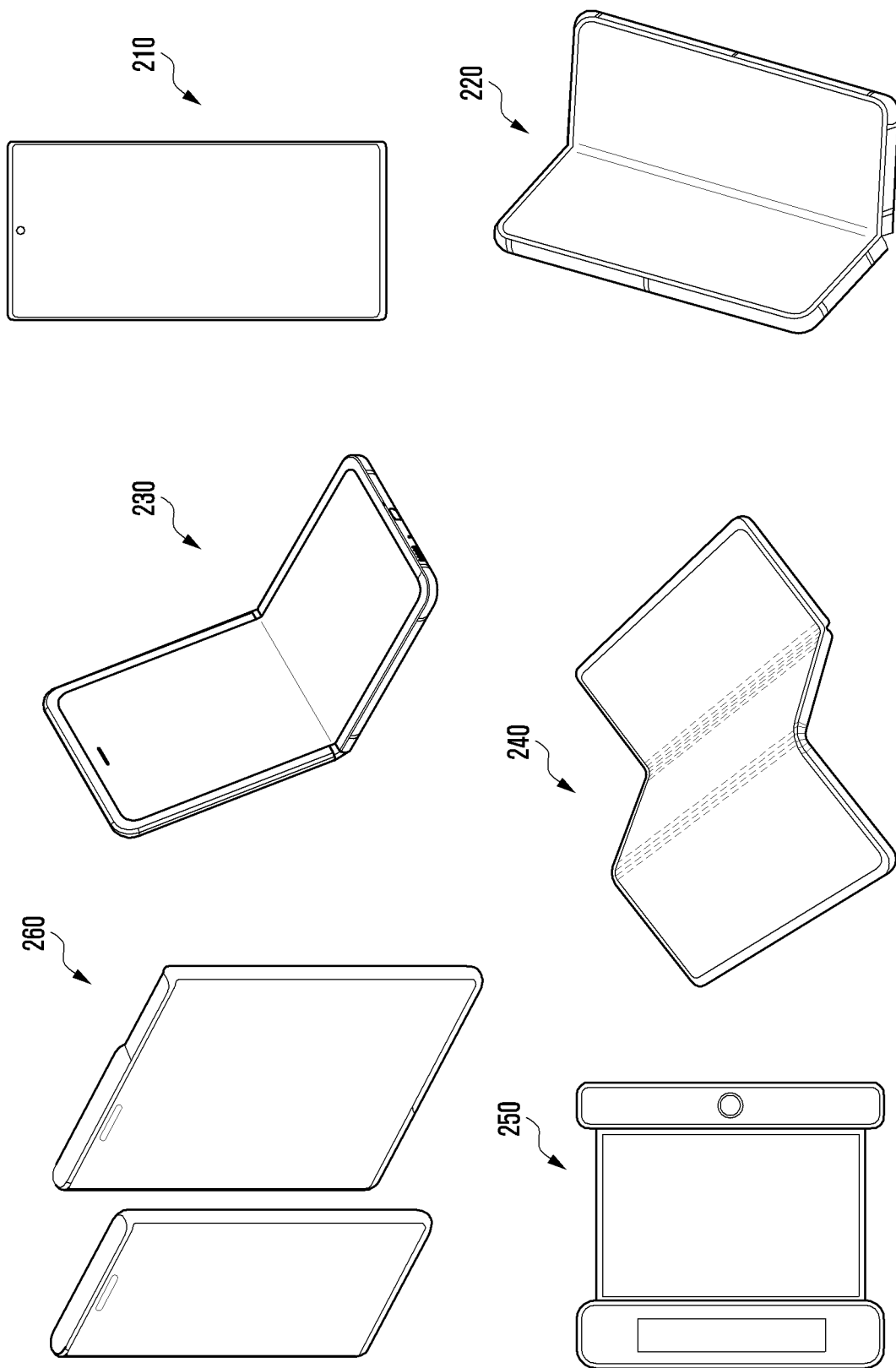
FIG. 2 is a diagram illustrating an example of an electronic device according to an embodiment of the disclosure.

FIG. 2 is a diagram illustrating an example of an electronic device according to an embodiment of the disclosure.

Referring to FIG. 2, examples of various form factors of an electronic device 101 depending on display types are illustrated. The electronic device 101 may include various form factors such as a bar type or plate type 210, a foldable type 220, 230, or 240, a rollable type 250, and/or a slidable type 260. The electronic device 101 may be implemented in various forms, and a display (e.g., the display module 160 in FIG. 1) may be provided in various ways depending on the implementation form of the electronic device 101.

Although it has been illustrated in the disclosure that the electronic device 101 has a bar type or plate type appearance, embodiments of the disclosure is not limited thereto. For example, the illustrated electronic device 101 may be a part of a foldable electronic device 220, 230, or 240, a rollable electronic device 250, or a slidable electronic device 260.

The foldable electronic device 220, 230, or 240 may indicate an electronic device in which two different areas of a display (e.g., the display module 160 in FIG. 1) is able to be folded so as to substantially face each other or face in opposite directions. In general, the foldable electronic device 220, 230, or 240, when carried, may be in the state in which two different areas of a display are folded to face each other or in opposite directions. When the foldable electronic device 220, 230, or 2530 is used, a user may unfold the display (e.g., the display module 160 in FIG. 1) such that two different areas form a substantially flat shape.

The foldable electronic device 220, 230, or 240 may include a form factor (e.g., 220 or 230) including two display surfaces (e.g., a first display surface and a second display surface) based on one folding axis and a form factor (e.g., 240) including at least three display faces (e.g., a first display face, a second display face, and a third display face) based on at least two folding axes. Embodiments of the disclosure are not limited thereto; the number of folding axes provided in the electronic device 101 is not limited thereto.

The display (e.g., the display module 160 in FIG. 1) of the foldable electronic device 220, 230, or 240 may be folded or unfolded in various ways (e.g., in-folding, out-folding, or in/out-folding) depending on the implementation form thereof. The foldable electronic device 220, 230, or 240 may include various foldable types such as a vertical foldable type, a horizontal foldable type, a G foldable type, or a Z foldable type.

The slidable electronic device 260 or the rollable electronic device 250 may indicate an electronic device in which a display (e.g., the display module 160 in FIG. 1) is deformable to be bent such that at least a part thereof is wound or rolled, or is received inside a housing (not shown). According to a user's need, the slidable electronic device 260 or the rollable electronic device 250 may be used with a screen display area that is expanded by unfolding (e.g., slide-out) the display (e.g., the display module 160 in FIG. 1) or exposing a larger area of the display to the outside.

The rollable electronic device 250 may include a form factor including a roll-up type display (e.g., a rollable display). The slidable electronic device 260 or the rollable electronic device 250 may have the area of the display that is exposed to the outside depending on the extent to which the user unfolds the display (e.g., the display module 160 in FIG. 1).

Figure 3:
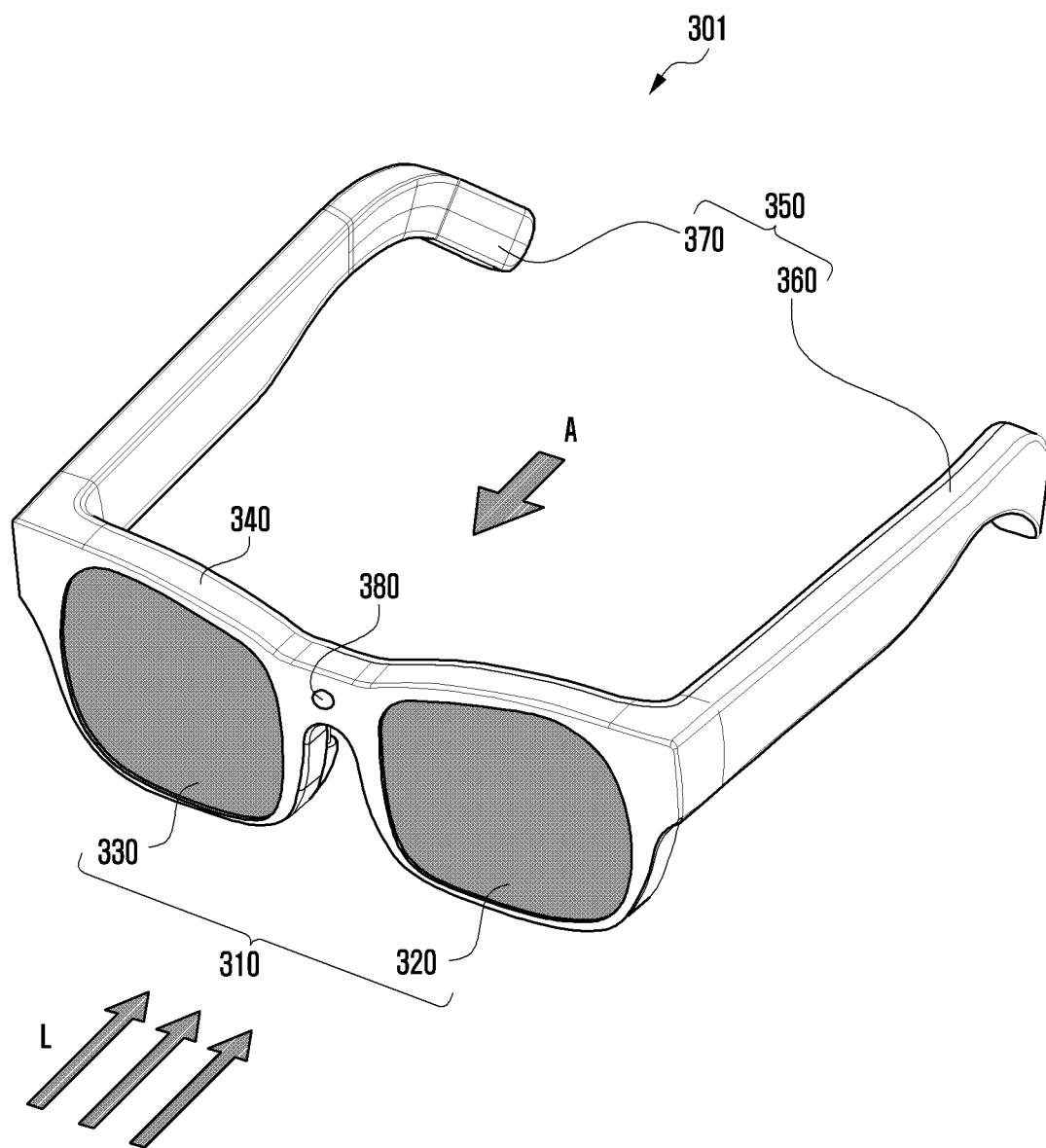
FIG. 3 is a diagram illustrating an example of a wearable electronic device according to an embodiment of the disclosure.

FIG. 3 is a diagram illustrating an example of a wearable electronic device according to an embodiment of the disclosure.

Referring to FIG. 3, although a wearable electronic device 301 in the form of glasses (e.g., a glasses-type display device or augmented reality (AR) glasses) is illustrated in FIG. 3, the disclosure is not limited thereto. For example, the wearable electronic device 301 may include various types of devices that include a display and are worn (or mounted) on a part of a user's body (e.g., a face or a head) to provide augmented reality (AR), mixed reality (MR), and/or virtual reality (VR) services. The wearable electronic device 301 may be implemented in the form of at least one of glasses, goggles, a helmet, or a hat, but is not limited thereto. The wearable electronic device 301 described below may be a device including at least some of the elements included in the electronic device 101 described above with reference to FIG. 1. Although not mentioned in the following description, the wearable electronic device 301 according to the disclosure may be construed to include various elements described with reference to FIG. 1.

The wearable electronic device 301 may be worn on a user's face to provide an image (e.g., an augmented reality image, a mixed reality image, and/or a virtual reality image)

to the user. According to an embodiment, the wearable electronic device 301 may provide an AR service in which virtual information (or a virtual object) is added to at least a portion of a real space (or environment). For example, the wearable electronic device 301 may provide the user with virtual information overlaid on the real space corresponding to the field of view (FOV) of the wearer.

Referring to FIG. 3, the wearable electronic device 301 may include a glass member (or window members) 310 disposed at positions corresponding to both eyes (e.g., left and right eyes) of the user, a main frame (or body part) 340 for fixing the glass member 310, support frames (or support members) 350 connected at both ends of the main frame 340 to be mounted on the user's ears, and a camera module 380 (e.g., a photographing camera).

The glass member 310 may include a first glass 320 corresponding to the user's left eye and a second glass 330 corresponding to the user's right eye. According to an embodiment, the glass member 310 may be supported by the main frame 340. For example, the glass member 310 may be fitted into the opening formed in the main frame 340. The AR image emitted from a display module (e.g., the display module 520 in FIG. 5) may be projected onto the glass member 310.

A waveguide or a transparent waveguide may be formed in at least a portion of the glass member 310. The waveguide may serve to guide the AR image emitted from the display module to the user's eyes. A detailed description of the waveguide according to embodiments of the disclosure will be made with reference to the description related to the first glass 320 and the second glass 330 in FIG. 4.

Although the glass member 310 is implemented such that the first glass 320 and the second glass 330 are separated to correspond to the user's left and right eyes, respectively, as illustrated in FIG. 3, according to another embodiment of the disclosure, the glass member 310 may be implemented in the form of one glass, instead of separating the first glass 320 and the second glass 330.

The main frame 340 and the support frame 350 may be implemented in the form of glasses.

The main frame 340 may have a structure capable of being at least partially mounted on the user's nose. The main frame 340 may support the glass member 310. The main frame 340 may be formed of a synthetic resin material. The glass member 310 may be fitted into the opening formed in the main frame 340, so that the main frame 340 may support the glass member 310.

The support frame 350 may include a first support frame 360 mounted on the ear in the first direction (e.g., the left ear) and a second support frame 370 mounted on the ear in the second direction (e.g., the right ear). For example, the main frame 340 and the support frame 350 (e.g., the first support frame 360 and the second support frame 370) may be coupled to be folded through a hinge (not shown).

The support frame 350 may be rotatably coupled to the main frame 340. The support frame 350 may include a first support frame 360 and a second support frame 370. The first support frame 360 may be coupled to the main frame 340 on the left side (e.g., a first direction) of the main frame 340 when viewed from the direction 'A'. The second support frame 370 may be coupled to the main frame 340 on the right side (e.g., a second direction) of the main frame 340 when viewed from the direction 'A'.

The support frame 350 may be fixed to the main frame 340. For example, the first support frame 360 coupled to the left side of the main frame 340 and the second support frame 370 coupled to the right side of the main frame 340 may be coupled to each other. The support frame 350 coupled to both sides of the main frame 340 may form a ring shape to be worn to be fitted to the user's head. In addition, the support frame 350 may be modified into various shapes in which the wearable electronic device 301 is able to be worn on the user's face.

The support frame 350 may be formed to be supported by the user's ear. For example, the wearable electronic device 301 may be worn on the user's face in such a way that the support frame 350 coupled to the main frame 340 is supported by the user's ear. The support frame 350 may rotate relative to the main frame 340. The support frame 350 may rotate to approach the main frame 340, thereby reducing the volume of the wearable electronic device 301.

The display module (e.g., the display module 520 in FIG. 5) may output an AR image produced by the processor 120 of the electronic device 101 or a processor (e.g., the processor 590 in FIG. 5) of the wearable electronic device 301. When the display module produces and project an AR image onto the glass member 310, the objects included in the AR image may be combined with the visible light L incident from the front (e.g., the direction in which the user views) through the glass member 310, thereby implementing AR. The display module may be a very small projector (e.g., a micro-projector or a pico-projector). For example, the display module may be a laser scanning display (LSD), a digital micro-mirror display (DMD), and/or liquid crystal-on-silicon (LCoS). According to an embodiment of the disclosure, the display module may be a transparent display. In this case, the light-emitting device included in the display module may be directly disposed on the glass member 310. In addition, the display module may be various display devices for implementing AR.

A pair of glass members 310, a pair of support frames 350, and/or a pair of display modules (e.g., the display module 520 in FIG. 5) may be provided to correspond to the user's left and right eyes. For example, the glass member 310 may include a first glass 320 and a second glass 330, and the support frame 350 may include a first support frame 360 and a second support frame 370. According to various embodiments of the disclosure, some of the above-described elements may be different between a configuration corresponding to the left eye and a configuration corresponding to the right eye.

The camera module 380 may include, for example, a photographing camera (e.g., a front photographing camera). For example, the camera module 380 may be implemented to be disposed in the main frame 340 so as to photograph a subject in the front (or the front that the user views) of the wearable electronic device 301. The camera module 380 may be disposed in the central portion (or center point) between the first glass 320 and the second glass 330 in the main frame 340 so as to photograph the front of the main frame 340. The front of the main frame 340 may indicate a direction in which the user wearing the wearable electronic device 301 views. The wearable electronic device 301 may include a plurality of other cameras, as well as the camera module 380, and the camera module 380 and the plurality of other cameras will be described in detail with reference to FIG. 4.

Figure 4:
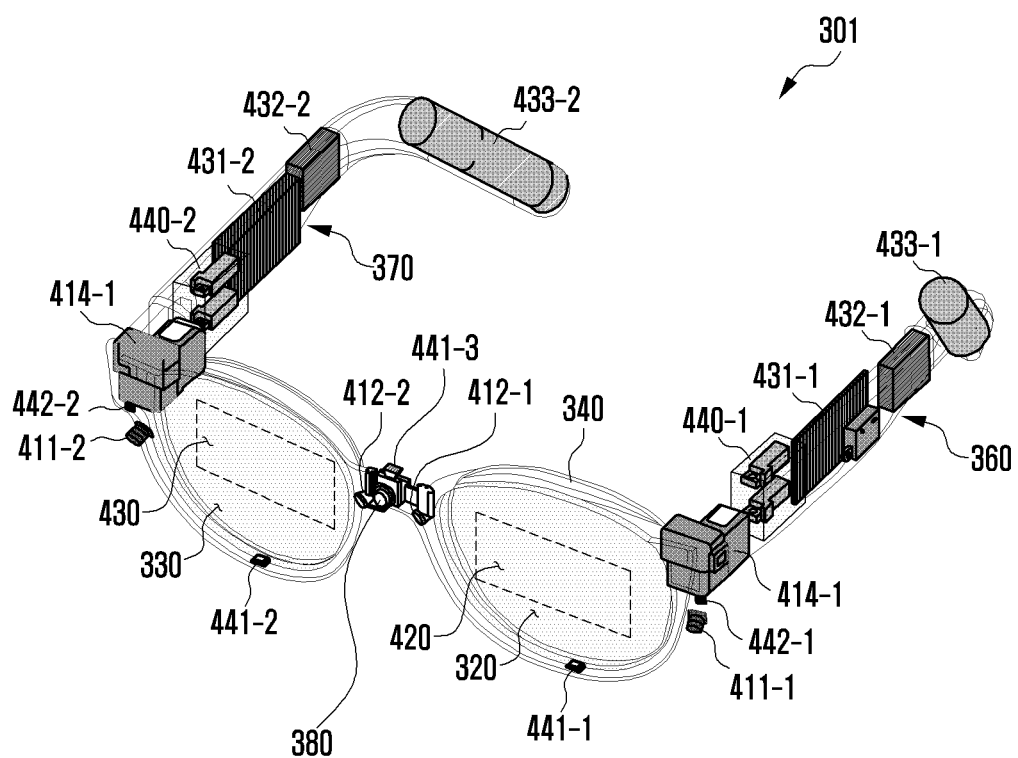
FIG. 4 is a diagram illustrating an example of an internal structure of a wearable electronic device according to an embodiment of the disclosure.

FIG. 4 is a diagram illustrating an example of an internal structure of a wearable electronic device according to an embodiment of the disclosure.

Referring to FIG. 4, a wearable electronic device 301 may be a device implemented in a form worn on the user's face or head. According to an embodiment, the wearable electronic device 301 may include a plurality of glasses (e.g., the first glass 320 and the second glass 330) respectively corresponding to both eyes (e.g., left and right eyes) of the user, and may be implemented in the form of glasses. The wearable electronic device 301 may provide an image related to an AR service to the user. According to an embodiment, the wearable electronic device 301 may project or display a virtual object onto the first glass 320 and/or the second glass 330, so that the user may view the real world recognized through the first glass 320 and/or the second glass 330 of the wearable electronic device 301, on which at least one virtual object is superimposed.

Referring to FIG. 4, the wearable electronic device 301 may include a main frame (or body part) 340, a support frame (e.g., a first support frame 360 and a second support frame 370), and a hinge (e.g., a first hinge 440-1 and a second hinge 440-2).

The main frame 340 and the support frame (e.g., the first support frame 360 and/or the second support frame 370) may have various elements of the wearable electronic device 301 mounted thereto. The main frame 340 and the support frames 360 and 370 may be operatively coupled through the hinges 440-1 and 440-2.

The main frame 340 may include a portion formed to be at least partially supported on the user's nose.

The support frames 360 and 370 may include a support member having a shape capable of being supported on the user's ear. The support frames 360 and 370 may include a first support frame 360 supported on the user's left ear and a second support frame 370 supported on the user's right ear.

The first hinge 440-1 may connect the first support frame 360 and the main frame 340 such that the first support frame 360 is rotatable with respect to the main frame 340. The second hinge 440-2 may connect the second support frame 370 and the main frame 340 such that the second support frame 370 is rotatable with respect to the main frame 340. According to another embodiment of the disclosure, the hinges 440-1 and 440-2 of the wearable electronic device 301 may be omitted. For example, the support frames 360 and 370 may be directly coupled to the main frame 340 to be fixed.

The main frame 340 may include glasses (e.g., a first glass 320 and a second glass 330) corresponding to both eyes (e.g., left and right eyes) of the user, display modules (e.g., a first display module 414-1 and a second display module 414-2), waveguides (e.g., a first waveguide 420 and a second waveguide 430), a camera module 380 (e.g., a photographing camera or a front photographing camera), recognition cameras (e.g., a first recognition camera 411-1 and a second recognition camera 411-2), eye tracking cameras (e.g., a first eye tracking camera 412-1 and a second eye tracking camera 412-2), one or more microphones (e.g., a first microphone 441-1, a second microphone 441-2, and/or a third microphone 441-3), and one or more lighting members (e.g., a first lighting member 442-1 and/or a second lighting member 442-2).

The wearable electronic device 301 may display a variety of information by projecting light produced by the display modules 414-1 and 414-2 onto the glasses 320 and 330. For example, the light produced by the first display module 414-1 may be projected onto the first glass 320, and the light produced by the second display module 414-2 may be projected onto the second glass 330. At least a portion of the first glass 320 and the second glass 330 may be formed of a transparent material (e.g., a transparent member).

The first glass 320 (or a first transparent member) corresponding to the user's left eye may be coupled to the first display module 414-1, and the second glass 330 (or a second transparent member) corresponding to the user's right eye may be coupled to the second display module 414-2. The first glass 320 and the second glass 330 may be formed of a glass plate, a plastic plate, and/or a polymer, and may be made transparent or translucent.

The display modules (e.g., the first display module 414-1 and the second display module 414-2) may include a liquid crystal display (LCD), a digital micro-mirror device (DMD), liquid crystal-on-silicon (LCoS), an organic light-emitting diode (OLED), or a micro light-emitting diode (micro LED).

The first glass 320 and the second glass 330 may include a condensing lens and/or a waveguide (or a transparent waveguide) (e.g., a first waveguide 420 and a second waveguide 430). The waveguides 420, 430 may be at least partially positioned in a portion of the glasses 320 and 330. The first waveguide 420 may be partially positioned on the first glass 320. The second waveguide 430 may be partially positioned on the second glass 330.

The waveguides 420 and 430 may serve to transmit the light produced by the display modules 414-1 and 414-2 to the user's eyes. Light emitted from the display modules 414-1 and 414-2 may be incident on one surface (or one end) of the glasses 320 and 330. The light incident on one surface of the glasses 320 and 330 may be transmitted to the user through waveguides 420 and 430 formed (or positioned) in the glasses 320 and 330.

The waveguides 420 and 430 may be made of glass, plastic, or polymer, and may include nanopatterns formed on one surface inside or outside the same. The nanopattern may include a polygonal or curved grating structure. The light incident on one surface of the glasses 320 and 330 may be transmitted or reflected by the nano-pattern inside the waveguides 420 and 430 to be transmitted to the user. The waveguides 420 and 430 may include at least one of at least one diffractive element (e.g., a diffractive optical element (DOE) or a holographic optical element (HOE)) or a reflective element (e.g., a reflective mirror). The waveguides 420 and 430 may guide the light emitted from the display modules 414-1 and 414-2 (e.g., light sources) to the user's eyes using at least one diffractive element or reflective element.

The diffractive element may include an input optical member/output optical member (not shown). The input optical member may indicate an input grating area, and the output optical member (not shown) may indicate an output grating area. The input grating area may serve as an input terminal that diffracts (or reflects) the light output from the display modules 414-1 and 414-2 (e.g., micro LEDs) to transmit the same to the glasses (e.g., the first glass 320 and the second glass 330). The output grating area may serve as an outlet that diffracts (or reflects) the light transmitted to the glasses (e.g., the first glass 320 and the second glass 330) of the waveguides 420 and 430 to the user's eyes.

The reflective element may include a total reflection optical element or a total reflection waveguide for total internal reflection (TIR). Total internal reflection is one way of guiding light in which an incident angle is formed such that light (e.g., a virtual image) input through the input grating area is reflected about 100% by one surface (e.g., a specified surface) of the waveguides 420 and 430, thereby transmitting about 100% of light to the output grating area.

The light emitted from the display modules (e.g., 414-1 and 414-2) may be guided to the waveguides 420 and 430 through the input optical member. The light travelling inside the waveguides 420 and 430 may be guided to the user's eyes through the output optical member.

The display modules 414-1 and 414-2 may include a plurality of panels (or display areas), and the plurality of panels may be positioned on the glasses 320 and 330. At least a portion of the display modules 414-1 and 414-2 may be formed of a transparent element. The user may recognize the actual space behind the display modules 414-1 and 414-2 through the display modules 414-1 and 414-2. The display modules 414-1 and 414-2 may display a virtual object (or virtual information) in at least a portion of the transparent element such that it appears to the user that the virtual object is added to at least a portion of the real space. If the display modules 414-1 and 414-2 are transparent micro LEDs, the configuration of the waveguides 420 and 430 may be omitted from the glasses 320 and 330.

The wearable electronic device 301 may include a plurality of cameras (e.g., a first camera, a second camera, and a third camera). For example, the first camera (e.g., the camera module 380 in FIG. 3) may be a photographing camera 380 (e.g., an RGB camera) for photographing an image corresponding to the field of view (FoV) of the user and/or measuring a distance to an object. The second camera may be eye tracking camera (eye tracking camera module) 412-1 or 412-2 for identifying the direction of a user's gaze. The third camera may be a recognition camera (gesture camera module) 411-1 or 411-2 for recognizing a certain space.

The photographing camera 380 may photograph the front direction of the wearable electronic device 301, and the eye tracking cameras 412-1 and 412-2 may photograph a direction opposite the photographing direction of the photographing camera 380. For example, the first eye tracking camera 412-1 may partially photograph the user's left eye, and the second eye tracking camera 412-2 may partially photograph the user's right eye. The wearable electronic device 301 may display a virtual object (or virtual information) related to an AR service, based on image information related to the real space obtained through the photographing camera 380.

According to an embodiment of the disclosure, the wearable electronic device 301 may display virtual objects, based on the display module disposed to correspond to both eyes of the user (e.g., a first display module 414-1 corresponding to the left eye and/or a second display module 414-2 corresponding to the right eye). According to another embodiment of the disclosure, the wearable electronic device 301 may display virtual objects, based on predetermined configuration information (e.g., resolution, frame rate, brightness, and/or display area).

The photographing camera 380 may include a high-resolution camera such as a high-resolution (HR) camera and/or a photo video (PV) camera. For example, the photographing camera 380 may utilize an autofocus function and an optical image stabilizer (OIS) function to obtain high-quality images. The photographing camera 380 may be implemented as a global shutter (GS) camera and a rolling shutter (RS) camera in addition to a color camera.

The eye tracking cameras 412-1 and 412-2 may detect the user's gaze direction (e.g., eye movement). For example, the eye tracking cameras 412-1 and 412-2 may detect the user's pupil and track the gaze direction. The tracked gaze direction may be used to move the center of a virtual image including a virtual object in response to the gaze direction. For example, the eye tracking cameras 412-1 and 412-2 may use a global shutter (GS) camera to detect the pupil and track the rapid pupil movement without dragging of a screen, and the performance and specifications may be substantially the same between the eye tracking cameras 412-1 and 412-2.

The recognition cameras 411-1 and 411-2 may detect a user gesture within a predetermined distance (e.g., a predetermined space) and/or a predetermined space. The recognition cameras 411-1 and 411-2 may be used for 3DoF or 6DoF head tracking, hand detection, and/or hand tracking. For example, the recognition cameras 411-1 and 411-2 may be utilized to perform spatial recognition for 6DoF and a simultaneous localization and mapping (SLAM) function through depth imaging. The recognition cameras 411-1 and 411-2 may be utilized for a gesture recognition function for recognizing a user gesture. The recognition cameras 411-1 and 411-2 may include cameras including GS. For example, recognition cameras 411-1 and 411-2 may include a camera including GS, which has less screen drag (or reduced RS phenomenon) like RS (rolling shutter) cameras, to detect and track quick hand movements and/or fine finger movements.

The wearable electronic device 301 may detect an eye corresponding to a primary eye and/or a supplementary eye among the left and/or right eyes of the user using at least one camera 411-1, 411-2, 412-1, 412-2, or 380. For example, the wearable electronic device 301 may detect an eye corresponding to a primary eye and/or a supplementary eye, based on a user's gaze direction for an external object or a virtual object.

One or more cameras (e.g., the photographing camera 380, the eye tracking cameras 412-1 and 412-2, and/or the recognition camera 411-1 and 411-2) included in the wearable electronic device 301 illustrated in FIG. 4 may not be limited to specific numbers and positions. For example, based on the form (e.g., shape or size) of the wearable electronic device 301, the number and positions of one or more cameras (e.g., the photographing camera 380, the eye tracking cameras 412-1 and 412-2, and/or the recognition camera 411-1 and 411-2) may be variously changed.

The wearable electronic device 301 may include one or more lighting members (or illumination LEDs) (e.g., the first lighting member 442-1 and the second lighting member 442-2) for increasing the accuracy of the one or more cameras (e.g., the photographing camera 380, the eye tracking cameras 412-1 and 412-2, and/or the recognition camera 411-1 and 411-2). For example, the first lighting member 442-1 may be disposed in a portion corresponding to the user's left eye, and the second lighting member 442-2 may be disposed in a portion corresponding to the user's right eye.

The lighting members 442-1 and 442-2 may be used for different purposes depending on the position where they are attached to the wearable electronic device 301. For example, the lighting members 442-1 and 442-2 may be used as an auxiliary means to increase accuracy (e.g., ease of detecting eye gaze) when photographing the user's pupils with the eye tracking cameras 412-1 and 412-2, and may include an IR LED that produces light of an infrared wavelength. The lighting members 442-1 and 442-2 may also be used as an auxiliary means of supplementing ambient brightness if it is not easy to detect a subject to be photographed due to a dark environment or mixing of various light sources and reflection light when photographing a user gesture using the recognition cameras 411-1 and 411-2.

The wearable electronic device 301 may include microphones (e.g., a first microphone 441-1, a second microphone 441-2, and a third microphone 441-3) for receiving a user's voice and ambient sounds.

The first support frame 360 (or a first housing) and/or the second support frame 370 (a second housing) may include printed circuit boards (PCBs) (e.g., a first printed circuit board 431-1 and a second printed circuit board 431-2), speakers (e.g., a first speaker 432-1 and a second speaker 432-2) for outputting an audio signal, batteries (e.g., a first battery 433-1 and a second battery 433-2), and/or hinges (e.g., a first hinge 440-1 and a second hinge 440-2).

The printed circuit boards 431-1 and 431-2 may include flexible boards (e.g., FPCBs or flexible PCBs). The printed circuit boards 431-1 and 431-2 may transmit electrical signals to respective elements (e.g., the cameras, the display modules, the microphones, and/or the speakers) of the wearable electronic device 301.

The speakers 432-1 and 432-2 may include a first speaker 432-1 for transmitting an audio signal to the user's left ear and a second speaker for transmitting an audio signal to the user's right ear 432-2.

The batteries 433-1 and 433-2 may provide power to the printed circuit boards 431-1 and 431-2 through a power management module (e.g., the power management module 188 in FIG. 1). The wearable electronic device 301 may include a plurality of batteries 433-1 and 433-2 through the first support frame 360 and the second support frame 370, and supply power to the printed circuit boards 431-1 and 431-2 through the power management module. For example, the plurality of batteries 433-1 and 433-2 may be electrically connected to the power management module.

Although not shown, the wearable electronic device 301 illustrated in FIGS. 3 and 4 may be received in a specified external device (e.g., a case) (not shown). According to an embodiment of the disclosure, the case may include a function of simply storing and charging the wearable electronic device 301. According to another embodiment of the disclosure, the case may include elements such as a camera and/or a processor, in addition to charging and storage of the wearable electronic device 301, and may also be used as an auxiliary arithmetic device of the wearable electronic device 301 using the above elements. For example, when received inside the case, the wearable electronic device 301 may communicate with the case (e.g., wired communication and/or wireless communication), and the case may perform some of the functions of a host device (e.g., a smartphone).

The wearable electronic device 301 may provide an AR service alone or in association with at least one other electronic device (e.g., a host device (e.g., the electronic device 101)). For example, the wearable electronic device 301 may be connected to a host device (e.g., the electronic device 101) to operate in a tethered AR method of connecting to a network (e.g., cloud) through the host device, thereby providing AR services. The wearable electronic device 301 may operate to connect to a network (e.g., cloud) in a standalone manner without connection with a host device (e.g., the electronic device 101), thereby providing AR services.

Figure 5:
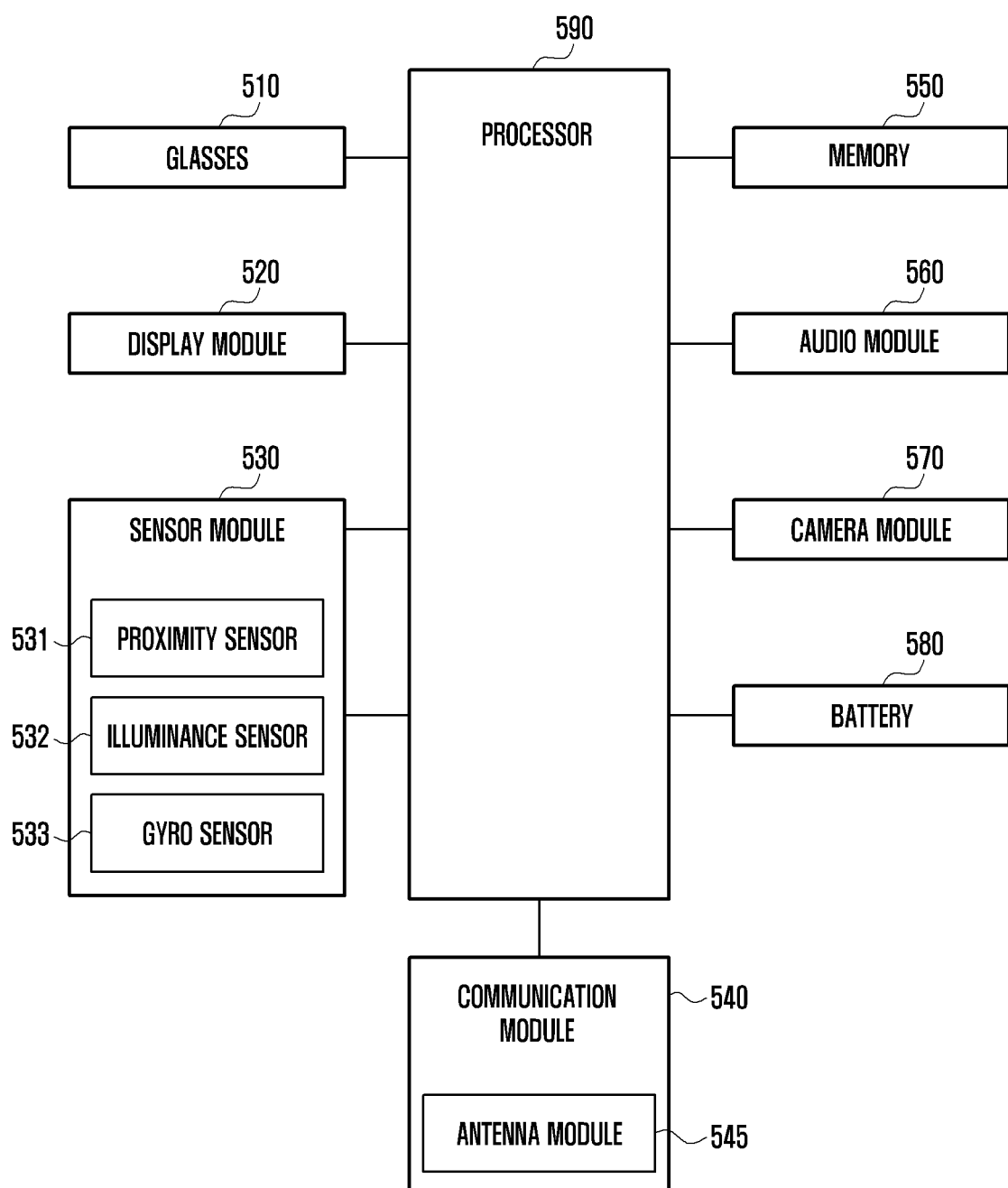
FIG. 5 is a diagram illustrating an example of the configuration of a wearable electronic device according to an embodiment of the disclosure.

FIG. 5 is a diagram illustrating an example of the configuration of a wearable electronic device according to an embodiment of the disclosure.

FIG. 5 shows an example of the configuration associated with supporting AR services in the electronic device 301 according to an embodiment. The wearable electronic device 301 illustrated in FIG. 5 may include the elements of the wearable electronic device 301 described with reference to FIGS. 3 to 4.

Referring to FIG. 5, the wearable electronic device 301 may include glasses 510, a display module 520, a sensor module 530, a communication module 540, a memory 550, an audio module 560, a camera module 570, a battery 580, and a processor 590. Elements included in the wearable electronic device 301 may be understood as, for example, hardware modules (e.g., circuits).

The glasses 510 (e.g., the first glass 320 and/or the second glass 330 in FIGS. 3 and 4) may include a condensing lens and/or a transparent waveguide (e.g., the first waveguide 420 and the second waveguide 430 in FIG. 4). For example, the transparent waveguide may be at least partially positioned in a portion of the glasses 510. Light emitted from the display module 520 may be incident on one end of the glasses 510, and the incident light may be transmitted to the user through the waveguide formed inside the glasses 510. The waveguide may be made of glass or polymer and include a nano-pattern, for example, a polygonal or curved grating structure, formed on one surface inside or outside the same.

The display module 520 may include a plurality of panels (or display areas), and the plurality of panels may be positioned on the glasses 510. At least a portion of the display module 520 may be formed of a transparent element, and the user may recognize the real space behind the display module 520 through the display module 520. The display module 520 may display a virtual object (or virtual information) on at least a portion of the transparent element such that it appears to the user that the virtual object is added to at least a portion of the real space.

The sensor module 530 may include a proximity sensor 531, an illuminance sensor 532, and/or a gyro sensor 533.

The proximity sensor 531 may detect an object approaching the wearable electronic device 301.

The illuminance sensor 532 may measure the brightness around the wearable electronic device 301. The processor 590 may identify the brightness around the wearable electronic device 301 using the illuminance sensor 532 and change brightness-related configuration information of the display module 520, based on the brightness. For example, if the surrounding brightness is greater than a predetermined value, the processor 590 may configure the brightness of the display module 520 to be higher to improve the user's visibility.

The gyro sensor 533 may detect the posture and position of the wearable electronic device 301. For example, the gyro sensor 533 may detect whether or not the wearable electronic device 301 is properly worn on the user's head. As another example, the gyro sensor 533 may detect movement of the wearable electronic device 301 or a user wearing the wearable electronic device 301.

The communication module 540 may correspond to the wireless communication module 192 shown in FIG. 1. The wearable electronic device 301 may perform wireless communication with an external device (e.g., the server 201 and/or other electronic devices 101, 102, and 104 in FIG. 1) through a network using the communication module 540. For example, the wearable electronic device 301 may perform wireless communication with the electronic device 101 and exchange instructions and/or data with each other.

The wearable electronic device 301 may be at least partially controlled by an external device (e.g., the electronic device 101) through the communication module 540. For example, the wearable electronic device 301 may perform at least one function under the control of another external electronic device.

The wearable electronic device 301 may transmit, to an external device (e.g., the server 201 and/or other electronic devices 101, 102, and 104 in FIG. 1), information on an object (e.g., an image) located in the real space, obtained through the camera module 570, information on a distance to an object, user gaze information, and/or user gesture information through the communication module 540.

The communication module 540 may include an antenna module 545. For example, the communication module 540 may support various technologies (e.g., beamforming, multiple-input multiple-output (MIMO), and/or an array antenna) for securing performance in a specified frequency band. The antenna module 545 may transmit or receive a signal or power to or from the outside (e.g., a peripheral device of the wearable electronic device 301 and/or a server). According to an embodiment, the antenna module 545 may include a plurality of antennas (e.g., an array antenna). According to an embodiment, a signal or power may be transmitted or received between the communication module 540 and the outside through the antenna module 545.

The memory 550 may correspond to the memory 130 described with reference to FIG. 1. The memory 550 may store a variety of data used by the wearable electronic device 301 when the wearable electronic device 301 provides AR services. The data may include, for example, input data or output data for software (e.g., the programs 140 in FIG. 1) and commands related thereto. The memory 550 may store instructions that cause the processor 590 to operate when executed. The instructions may be stored as software in the memory 550 and may be executable by the processor 590.

The audio module 560 may convert a sound into an electric signal or convert an electric signal into a sound, based on the control of the processor 590.

The camera module 570 may correspond to at least one camera described with reference to FIGS. 3 to 4. The camera module 570 may include a plurality of cameras (e.g., the photographing camera 380, the recognition cameras 411-1 and 411-2, and the eye tracking cameras 412-1 and 412-2) as illustrated in FIG. 4.

The battery 580 may supply power to at least one element of the wearable electronic device 301. The battery 580 may include the plurality of batteries described with reference to FIG. 4. For example, the battery 580 may include a first battery for supplying power in the first support frame 360 and a second battery for supplying power in the second support frame 370.

The processor 590 may execute a program (e.g., the programs 140 in FIG. 1) stored in the memory 550 to control at least one other element (e.g., a hardware or software element), and perform various data processes or computations. The processor 120 may operate to provide an AR service to the user, based on the wearable electronic device 301 alone or in connection with the electronic device 101. The processor 120 may display, through the display module 520, at least one virtual object to be viewed such that at least one virtual object (or virtual information) is added to the real space corresponding to the gaze (e.g., FOV or angle of view (AOV)) of the user wearing the wearable electronic device 301.

The processor 590 may correspond to the processor 120 described with reference to FIG. 1. The processor 590 may execute an application (e.g., an AR application) to control a peripheral device connected to the wearable electronic device 301 through a data communication link on the AR screen, and perform various data processes and computations related to AR services. As examples of data processes or computations, the processor 590 may store data received through the communication module 540 in the memory 550, process the data stored in the memory 550, store result data in the memory 550, and/or transmit the same to a peripheral device (e.g., the electronic device 101). The processor 590 may control the display module 520 to superimpose a variety of digital content (e.g., AR images) on the real world provided through the display module 520, thereby displaying a single image (e.g., an AR screen).

The processor 590 may be included in any one of the first support frame 360 and the second support frame 370 of the wearable electronic device 301 to operate. The processor 590 may include a first processor (e.g., a main processor) and a second processor (e.g., a coprocessor) in the first support frame 360 and the second support frame 370 of the wearable electronic device 301, respectively, and include a dual system structure that operates in synchronization with the first processor and the second processor.

Figure 6:
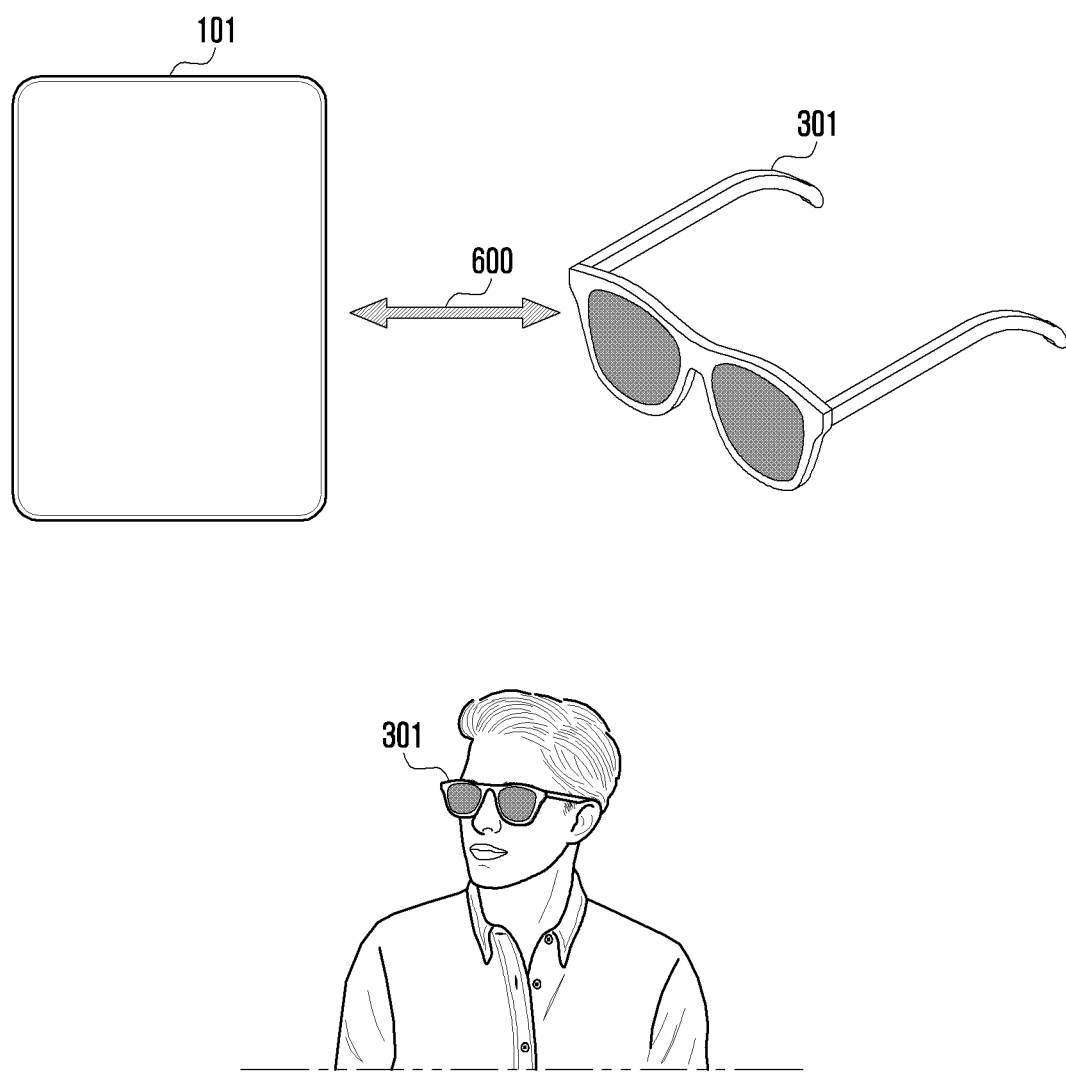
FIG. 6 is a diagram illustrating a network environment between an electronic device and a wearable electronic device according to an embodiment of the disclosure.

FIG. 6 is a diagram illustrating a network environment between an electronic device and a wearable electronic device according to an embodiment of the disclosure.

Referring to FIG. 6, an electronic device 101 according to an embodiment of the disclosure may be coupled to a wearable electronic device 301. The electronic device 101 and the wearable electronic device 301 may be connected (e.g., paired) by wire or wireless communication. For example, the electronic device 101 may be connected with the wearable electronic device 301 through short-range wireless communication 600 such as Bluetooth, Bluetooth Low Energy, Wi-Fi, Wi-Fi Direct, or ultra-wide band (UWB).

The electronic device 101 may include a smart phone, a tablet personal computer (PC), a notebook, and/or a display device (e.g., a monitor or television (TV)). According to an embodiment, the wearable electronic device 301 may include AR glasses, smart glasses, or a head mounted display (HMD).

The wearable electronic device 301 may directly produce data (e.g., an AR image) related to AR services (e.g., produce the same, based on stored or processed data) or obtain the data from the outside (e.g., the electronic device 101 or a server (e.g., the server 108 in FIG. 1)), thereby displaying the same through the display module 520. For example, the wearable electronic device 301 may be worn on the user's body (e.g., face) and superimpose a variety of digital content (e.g., an AR image) on the real world to display a single image (e.g., an AR screen) through the display module 520. According to an embodiment, the wearable electronic device 301 may receive image data (e.g., an AR image) from the electronic device 101 and display the received image data together with various objects in the real world through the display module 520.

When connected with the electronic device 101 for communication, the wearable electronic device 301 may periodically transmit information on the images captured by the camera module 570 of the wearable electronic device 301 and the user's gaze information (e.g., FOV and/or AOV) to the electronic device 101, and/or if there is a change in the state (e.g., a change in position or direction) of the wearable electronic device 301, the wearable electronic device 301 may transmit the same to the electronic device 101. The wearable electronic device 301, when connected with the electronic device 101, may provide (e.g., transmit) information, such as image information, gaze information, device information, sensing information, function information, and/or location information, to the electronic device 101.

When providing an AR service, the electronic device 101 or the wearable electronic device 301 may detect (or recognize) a specified interaction related to triggering the operation of the disclosure on the AR screen and determine a display mode in which content is to be displayed in response to the detection of the specified interaction. The electronic device 101 or the wearable electronic device 301, based on the determined display mode (e.g., a first display mode or a second display mode), may operate to display content through the display module 160 of the electronic device 101 (e.g., the first display mode) or display content on the AR screen through the display module 520 of the wearable electronic device 301 (e.g., the second display mode). Different operations of the display mode based on detection of a specified interaction according to the disclosure will be described in detail with reference to the drawings to be described later.

FIGS. 7A to 7D are diagrams illustrating an example of selectively displaying content between an electronic device and a wearable electronic device according to various embodiments of the disclosure.

Figure 7B:
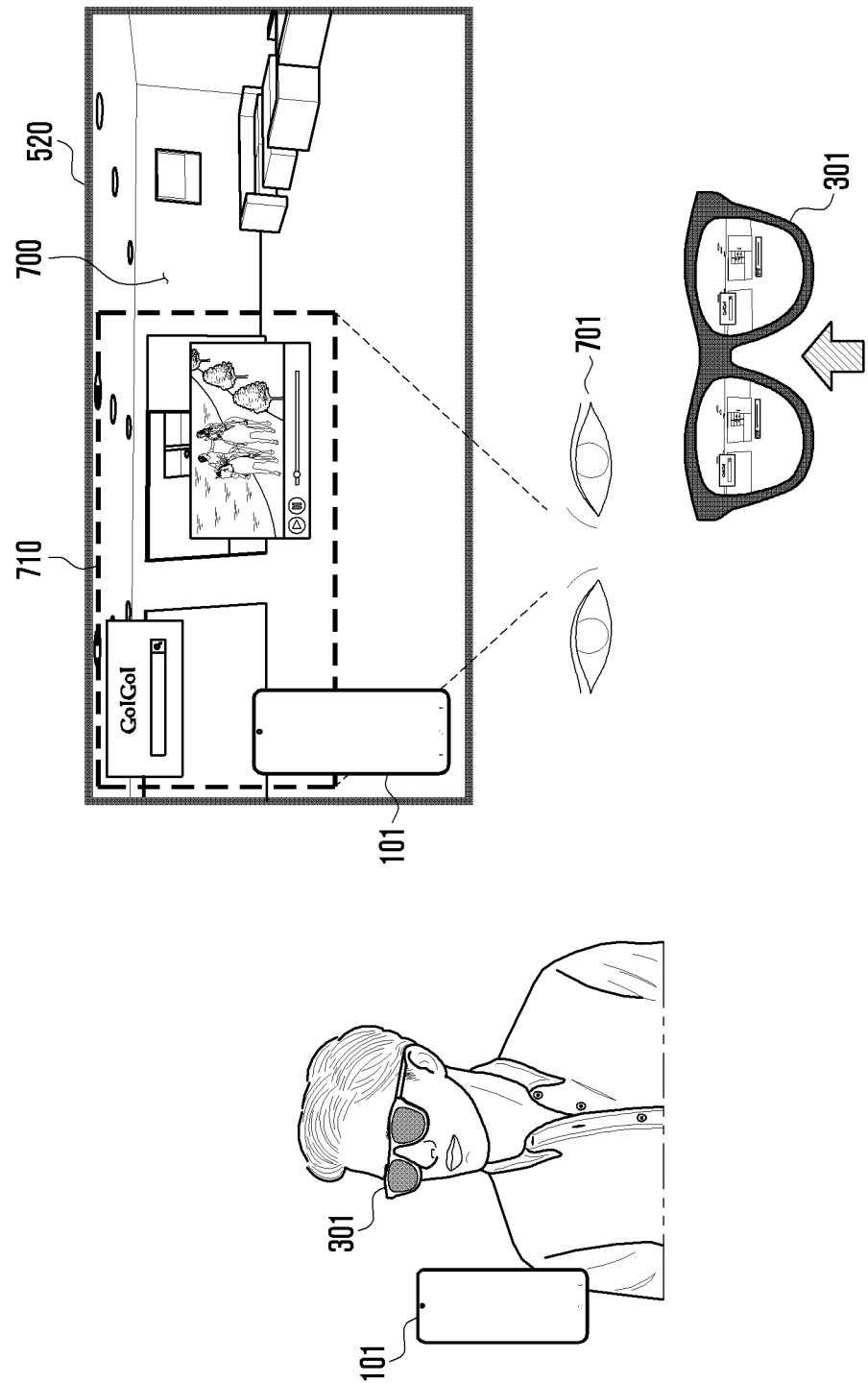

FIG. 7A shows a state in which a user wearing a wearable electronic device 301 views an AR screen provided through a display module 520 of the wearable electronic device 301. FIG. 7A shows the state in which the user views content 710 (or an augmented reality image) (e.g., first virtual information 711 and second virtual information 713) superimposed on at least a portion of a real space 700 (or environment) through the AR screen of the wearable electronic device 301. FIG. 7B shows the state in which the user in the state of FIG. 7A moves the electronic device 101 into the field of view (FOV) 701 of the user so that the electronic device 101 is displayed to overlap the content 710. FIG. 7C shows an example of displaying the content 710 in a first display mode if a processing entity of the content 710 is the electronic device 101. FIG. 7D shows an example of displaying the content 710 in a second display mode if a processing entity of the content 710 is the wearable electronic device 301 The content 710 (or the augmented reality image) may be graphic data corresponding to at least one application, which is provided as virtual objects to the real space 700 in which the user wearing the wearable electronic device 301 is located.

Referring to FIG. 7A, the wearable electronic device 301 may be in the state of being worn by the user and displaying various content 710 (or content-related virtual information) on at least a portion of the real space 700 through the display module 520 of the wearable electronic device 301. For example, the wearable electronic device 301 may superimpose at least one piece of virtual information in the real space 700 corresponding to the field of view 701 of the user, thereby providing the same to the user.

The situation of displaying the content 710 may include the case in which the user performs a gesture input and/or eye gaze on a real object in the real space 700. The situation of displaying the content 710 may include a situation of displaying an execution screen of an application (e.g., a browser, a shopping app, and/or SNS) capable of performing a search function. The situation of displaying the content 710 may include a situation of displaying an execution screen (e.g., a video playback screen or an image playback screen) of an application (e.g., a player) for playing media content. The situation of displaying the content 710 may include a situation of executing specified simulation (e.g., a situation of using collaboration tools or a situation of playing games) by the user in a virtual space.

For example, the content 710 may include information provided by a corresponding application, such as virtual information (or virtual objects or graphic images) corresponding to a first application, virtual information corresponding to a second application, and/or virtual information corresponding to a third application.

In the state in which the content 710 is provided, the wearable electronic device 301 may track the user's gaze 701 and provide virtual information related to at least one real object in the real space 700, which corresponds to the user's gaze 701 or provide an execution screen of a specified application executed by the user to an AR screen (or virtual space) through the display module 520. For example, the user may use the content 710 corresponding to various real objects in the real space 700 according to the movement of the user's gaze 701 in the AR service using the wearable electronic device 301.

Referring to FIG. 7B, the user may place the electronic device 101 in the real space 700 corresponding to the field of view 701 while using the AR service using the wearable electronic device 301. In the state in which the content 710 is provided through the wearable electronic device 301, the user may place the electronic device 101 in the real space 700 visible to the user's field of view to be displayed through the display module 520 of the wearable electronic device 301.

If an interaction (or trigger) for placing the electronic device 101 on the user's gaze 701 is detected while displaying information on the content 710, the electronic device 101 or the wearable electronic device 301 may determine a display mode (e.g., a first display mode or a second display mode) for displaying information on the content 710 depending on a processing entity of the content 710.

The display mode may include a first display mode in which the content 710 on the AR screen is displayed through the display module 160 of the electronic device 101. The display mode may include a second display mode in which the content 710 on the AR screen is displayed in a virtual space through the display module 520 of the wearable electronic device 301.

The interaction (or trigger) may include a gesture of extending the display module 160 of the electronic device 101 positioned on the user's gaze 701 through the wearable electronic device 301. The gesture of extending the display module 160 may include an interaction for sliding out a flexible display and/or a rollable activation interaction.

The processing entity for determining the display mode may differ depending on, for example, a standalone method or a tethered method. The standalone method may include a method in which the AR service is processed by the wearable electronic device 301. The tethered method may include a method in which the AR service is processed by the electronic device 101 and provided by interworking between the electronic device 101 and the wearable electronic device 301. For example, in the case of the tethered method, the processing entity of the content 710 may be the electronic device 101 that may operate to display the content 710 in the first display mode. As another example, in the case of the standalone method, the processing entity of the content 710 may be the wearable electronic device 301 that may operate to display the content 710 in the second display mode.

The display mode determined according to the processing entity may vary depending on whether the profile of the content 710 to be provided corresponds to a prespecified profile. For example, if the content 710 to be provided corresponds to a specified profile, the display mode (e.g., the second display mode) using the virtual space may be determined, regardless of whether the processing entity is the electronic device 101 or the wearable electronic device 301. The profile may include identification information related to whether or not the content 710 is information related to privacy and/or whether the content is an application category (e.g., phone, personal SNS, and/or finance) specified to be protected by the user. The profile for determining the display mode may be variously pre-configured in the electronic device 101 or the wearable electronic device 301 by the user.

Referring to FIG. 7C, FIG. 7C shows an example in which the processing entity is the electronic device 101. For example, FIG. 7C shows an example of the first display mode in which the content 710 is continuously displayed through the display mode 160 of the electronic device 101 in the case where the AR service is provided in the tethered method and/or where the content 710 to be provided does not correspond to a specified profile. For example, in the case where the electronic device 101 performs processing of the content 710 an application corresponding to the content 710 being executed in relation to AR services or, the current screen display of the wearable electronic device 301 may be stopped, and the content 710 being displayed through the AR screen may be displayed through the display module 160 of the electronic device 101. For example, the electronic device 101 may display the content 710 through the entirety or at least a portion of the display area of the display module 160 of the electronic device 101 in the first display mode. In an embodiment, the stoppage of the screen display is, for example, the state in which the wearable electronic device 301 is taken off and may include, for example, the state in which the display module 520 or the wearable electronic device 301 is powered off.

The first display mode is a mode for displaying the content 710, provided through the AR screen, on the display module 160 of the electronic device 101 and may be provided in various ways depending on a user interaction according to the form factor of the electronic device 101.

As illustrated in example <705A> in FIG. 7C, if the form factor of the electronic device 101 is a bar type or if the form factor is a rollable type but there is no rollable activation interaction (e.g., in a closed (or slide-in) state), the electronic device 101 may display the content 710 through a specified display area of the display module 160. According to an embodiment, the electronic device 101 may provide the entire area or at least a partial area of the display module 160 as an active window 720 for displaying the content 710.

As illustrated in example <705B> in FIG. 7C, if the form factor of the electronic device 101 is a rollable type and if the display module 160 is extended by a rollable activation interaction 703 such that an extension area B is further provided in addition to a default area A, the electronic device 101 may display the content 710 through a specified display area of the display module 160.

The electronic device 101 may maintain the existing display state of the default area A of the display module 160 and provide the extension area B, which is further extended, as an active window 730 for displaying the content 710. The degree of extending the extension area B may vary depending on at least one of the number of pieces of content 710, the type of content 710, the display method of the content 710 (e.g., a landscape mode or a portrait mode), or a display size of the content 710.

According to another embodiment of the disclosure, since the user interaction 703 reflects a clear intention of the user for screen extension, the electronic device 101 may provide the entire area (e.g., default area A+extension area B) including the default area A and the extension area B of the display module 160 as an active window 740 for displaying the content 710.

Referring to FIG. 7D, FIG. 7D shows an example in which the processing entity is the wearable electronic device 301. For example, FIG. 7D shows an example of the second display mode in which the content 710 is continuously displayed through the display module 520 of the wearable electronic device 301 if an AR service is provided in the standalone method and/or if an AR service is provided in the tethered method but the content 710 to be provided corresponds to a specified profile. For example, if the wearable electronic device 301 performs processing of the content 710 or an application corresponding to the content 710 being executed in relation to AR services, or if the content 710 to be provided corresponds to a specified profile, the wearable electronic device 301 may perform the following. Mapping (e.g., texture mapping or lock) content 710 may be displayed in a default area A of the electronic device 101 positioned in the real space 700 displayed in the AR screen, in an extension area B of the electronic device 101, and/or in a virtual area V produced adjacent to the electronic device 101 through the display module 520 of the wearable electronic device 301. The wearable electronic device 301 may map and display the content 710 through the entirety or at least a portion of the default area A, the extension area B, the entire area (e.g., default area A+extension area B), and/or the virtual area V of the electronic device 101 in the virtual space according to the second display mode.

The second display mode is a mode for displaying the content 710 through a virtual space provided through the display module 520 of the wearable electronic device 301 and may be provided in various ways depending on an user interaction on the AR screen according to the form factor of the electronic device 101. The second display mode may be a mode in which the content 710, provided by being mapped to a real object in the real space 700 through the AR screen, is to be mapped and displayed on the display module 160 of the electronic device 101 on the AR screen.

As illustrated in example <715A> in FIG. 7D, if the form factor of the electronic device 101 is a bar type or if the form factor is a rollable type but there is no rollable activation interaction (e.g., in a closed (or slide-in) state), the wearable electronic device 301 may map and display content 710 in the default area A of the display module 160 of the electronic device 101, which is recognized from the real space 700 provided through the display module 520, and/or in the virtual area V that is virtually produced based on the default area A.

The wearable electronic device 301 may map the default area A and/or the virtual area V of the electronic device 101 recognized from the real space 700, provided through the display module 520, as active windows 760 and 770 for displaying the content 710. The content 710 mapped to the default area A is provided through the AR screen and may not be displayed through the display module 160 of the electronic device 101 in the real space. In an embodiment, the virtual area V may indicate a virtual display area that is digitally produced corresponding to the default area A of the electronic device 101, based on the recognized electronic device 101, and is displayed only through the display module 520 of the wearable electronic device 301.

For example, the virtual area V may not be an extension area resulting from actual extension of the electronic device 101. The user may input only a gesture for extension, instead of substantially extending the electronic device 101, and a virtual extension area may be provided in response thereto by replacing the area corresponding to an actually extension area by a virtual area V. As described above, the content 710 provided through the second display mode may be provided only by the AR screen provided through the display module 520 of the wearable electronic device 301, and may be viewed and/or controlled only by the user wearing the wearable electronic device 301, but may be invisible to other users in the real world.

As illustrated in example <715B> in FIG. 7D, if the form factor of the electronic device 101 is a rollable type and if the display module 160 is extended by a rollable activation interaction 703 such that an extension area B is further provided in addition to a default area A, the wearable electronic device 301 may display the content 710 through a specified display area of the display module 160 of the electronic device 101.

The wearable electronic device 301 may maintain the existing display state of the default area A of the electronic device 101 in the real space 700 provided through the display module 520, configure the extension area B, which is further extended, as an active window 780 for displaying the content 710, and may map the content 710 to the active window 780, thereby providing the same. According to another embodiment of the disclosure, since the user interaction 703 reflects a clear intention of the user for screen extension, the wearable electronic device 301 may configure the entire area (e.g., default area A+extension area B) including the default area A and the extension area B of the electronic device 101 in the real space 700 provided through the display module 520 as an active window 790 for displaying the content 710 and map the content 710 to the active window 790, thereby providing the same.

As described above, the content 710 provided through the second display mode may be provided only by the AR screen provided through the display module 520 of the wearable electronic device 301, and may be viewed and/or controlled only by the user wearing the wearable electronic device 301, but may be invisible to other users in the real world.

Although the AR service is provided in the tethered method, in the case where the content 710 to be provided corresponds to a specified profile, the electronic device 101 may provide the second display mode by an operation corresponding to the operation of the wearable electronic device 301, which was described with reference to FIG. 7D. The electronic device 101 may obtain a variety of information for the second display mode from the wearable electronic device 301 and, based on the obtained information, transmit data related to an active window according to the second display mode (e.g., coordinate, position, and/or spatial information) and information to be displayed on the active window to the wearable electronic device 301 such that the wearable electronic device 301 provides the second display mode.

An augmented reality (AR) providing device (e.g., the electronic device 101 or the wearable electronic device 301) for AR services according to an embodiment of the disclosure may include a display module (e.g., the display module 160 of the electronic device 101 or the display module 520 of the wearable electronic device 301) and a processor (e.g., the processor 120 of the electronic device 101 or the processor 590 of the wearable electronic device processor 301). The processor 120 or 590 may operate to provide content through an AR screen. The processor may operate to detect a specified external object through the AR screen while providing the content. The processor may operate to determine a display mode for providing the content, based on detection of the specified external object. The processor may operate to control display of the content through a display module of the specified external object (e.g., the display module 160 of the electronic device 101), based on the determined display mode. The processor may operate to control display of the content through a virtual display area associated with the specified external object on the AR screen, based on the determined display mode.

The content may be produced by the AR providing device for AR services and provided through the display module of the AR providing device (e.g., the display module 160 of the electronic device 101 or the display module 520 of the wearable electronic device 301), or may be produced by the AR providing device, transmitted to an external device connected through specified communication, and provided through a display module of the external device (e.g., the display module 160 of the electronic device 101 or the display module 520 of the wearable electronic device 301).

The processor 120 or 590 may operate to detect a specified interaction through the AR screen, determine whether a target device processing the content is an electronic device 101 or a wearable electronic device 301, based on the detection of the specified interaction, if the target device is determined to be the electronic device 101, determine a first display mode in which the content on the AR screen switches to be displayed through the electronic device 101, and if the target device is determined to be the wearable electronic device 301, determine a second display mode in which the content is mapped to the electronic device 101 and displayed on the AR screen.

Based on the determination of the first display mode, the processor 120 or 590 may operate to perform control to stop displaying a screen of the wearable electronic device 301 and control the display of the content being displayed through the AR screen, based on a display area corresponding to a display module 160 of the electronic device 101.

The processor 120 or 590 may operate to configure a specified active window for the content being displayed on the AR screen through a default area and/or an extension area of the display module 160 of the electronic device 101, and control display of the content based on the configured active window.

The processor 120 or 590 may operate to control content display based on a virtual display area associated with the electronic device 101 on an AR screen provided through a display module 590 of the wearable electronic device 301, based on the determination of the second display mode.

Based on the determination of the second display mode, the processor 120 or 590 may operate to map and display the content, based at least on a default area of the electronic device 101 positioned in a real space displayed on the AR screen through the display module 590 of the wearable electronic device 301, an extension area of the electronic device 101, and/or a virtual area produced adjacent to the electronic device 101.

Based on the determination of the second display mode, the processor 120 or 590 may operate to configure a virtual area corresponding to an extension area of the display module 160 of the electronic device 101 to correspond to the extension area of the electronic device 101, configure a specified active window for the content being displayed on the AR screen through the default area and/or the extension area of the display module 160 of the electronic device 101, and control content display through content mapping based on the configured active window.

If the processor 120 or 590 provides the content according to the second display mode, the content mapped to the AR screen may be provided only through a display area associated with the electronic device 101 on the AR screen, instead of being displayed through the display module 160 of the electronic device 101 in the real space.

The specified interaction may include a first interaction in which the electronic device 101 enters the real space of the AR screen provided through the display module 590 of the wearable electronic device 301, a second interaction in which a user inputs a specified gesture using the electronic device 101 after the entry of the electronic device 101, and/or a third interaction in which the user inputs a specified menu manipulation gesture through the electronic device 101 on the AR screen after the entry of the electronic device.

The processor 120 or 590 may operate to determine whether or not the content corresponds to a specified profile when determining the target device processing the content and, if the content corresponds to the specified profile, determine the second display mode so as to provide content of the specified profile through the AR screen, regardless of the target device processing the content.

An augmented reality (AR) providing device (e.g., the electronic device 101 or the wearable electronic device 301) for AR services according to an embodiment of the disclosure may include a display module (e.g., the display module 160 of the electronic device 101 or the display module 520 of the wearable electronic device 301) and a processor (e.g., the processor 120 of the electronic device 101 or the processor 590 of the wearable electronic device processor 301). The processor 120 or 590 may operate to display content through the display module. The processor may operate to recognize an external device corresponding to the external object from the AR screen while displaying the content through the display module. The processor may operate to monitor a change in state of the external device if the external device is a specified external device. The processor may operate to determine a processing entity related to the content, based on identifying a change in the state of the external device. The processor may operate to determine the display mode of the content, based on the determined processing entity. The processor may operate to display the content on the AR screen through a display module, based on the determined display mode. The processor may operate to control the external device to display the content through the display module of the external device, based on the determined display mode.

Operation methods of the electronic device 101 and the wearable electronic device 301 according to various embodiments of the disclosure are described below.

Operations performed by the electronic device 101 may be executed by the processor 120 of the electronic device 101 including various processing circuits and/or executable program elements. The operations performed by the electronic device 101 may be stored in the memory 130 and executed by instructions that, when executed, cause the processor 120 to operate.

The operations performed by the wearable electronic device 301 described below may be executed by the processor 590 of the wearable electronic device 301 including various processing circuits and/or executable program elements. Operations performed by the wearable electronic device 301 may be stored in the memory 550 and executed by instructions that, when executed, cause the processor 590 to operate.

The operations of the electronic device 101 and the wearable electronic device 301 may be distinguished depending on a processing entity according to whether the AR service is a standalone method or a tethered method, and the operation of displaying content by operating the display mode of the disclosure may be similar or the same therebetween, excluding the operation of performing data communication as necessary. For example, the electronic device 101 and the wearable electronic device 301 may perform a series of operations of rapidly switching between screens in the situation of using AR, enabling content movement between the electronic device 101 and the wearable electronic device 301, configuring an active window, based on a processing entity and/or a specified profile, and displaying content through a corresponding active window.

Figure 8:
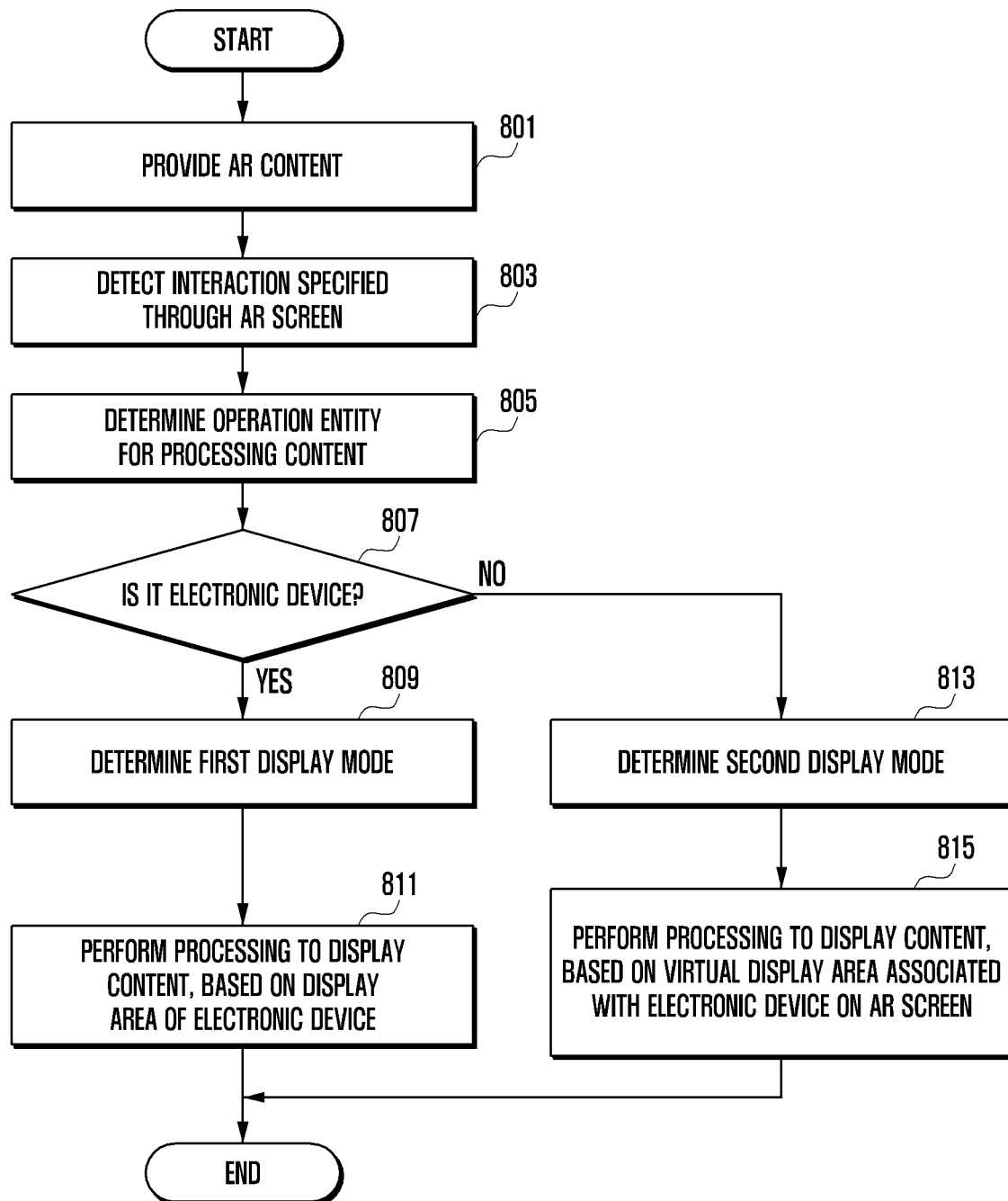
FIG. 8 is a flowchart illustrating a method of operating an electronic device or a wearable electronic device according to an embodiment of the disclosure.

FIG. 8 is a flowchart illustrating a method of operating an electronic device or a wearable electronic device according to an embodiment of the disclosure.

Figure 9:
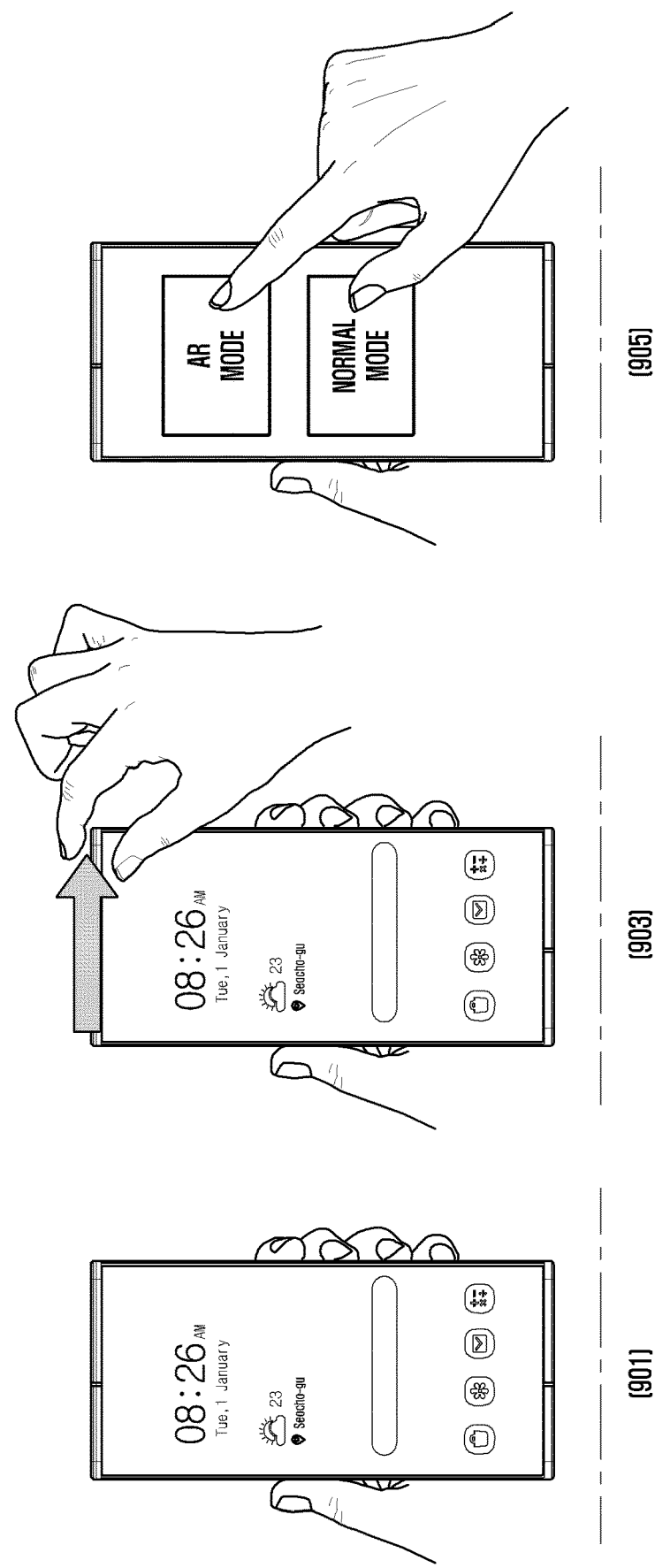
FIG. 9 is a diagram illustrating an example of a specified interaction for triggering an operation according to an embodiment of the disclosure.

FIG. 9 is a diagram illustrating an example of a specified interaction for triggering the operation according to an embodiment of the disclosure.

FIG. 8 shows an example of an operation of providing content through an electronic device 101 or a wearable electronic device 301 depending on a display mode (e.g., a first display mode or a second display mode) for displaying content, based on a specified interaction, in a situation in which the electronic device 101 or the wearable electronic device 301 provides an AR service according to a tethered method or a standalone method. In an embodiment, the operation illustrated in FIG. 8 may be performed by the electronic device 101 or the wearable electronic device 301, and, in the following description of FIG. 8, the electronic device 101 or the wearable electronic device 301 will be referred to as an AR providing device for convenience of description. The electronic device 101 and the wearable electronic device 301 may further include an operation of receiving, processing, and transmitting related data for an AR service depending on the entity that performs the operation, and a description thereof will be made with reference to the drawings to be described later.

Referring to FIG. 8, in operation 801, an AR providing device (e.g., the electronic device 101 or the wearable electronic device 301) or a processor of the AR providing device (e.g., the processor 120 of the electronic device 101 or the processor 590 of the wearable electronic device 301) may provide content through a display module 520 of the wearable electronic device 301. The AR providing device, the wearable electronic device 301 may be in the state of being worn on the user and displaying at least one piece of content (or virtual information) superimposed on at least a portion of a real space on an AR screen through the display module 520 of the wearable electronic device 301.

For example, the wearable electronic device 301 may superimpose at least one piece of content in the real space corresponding to the field of view of the user, thereby providing the content to the user. The wearable electronic device 301 may display, through the display module 520 of the wearable electronic device 301, content that is directly produced for the AR service by the wearable electronic device 301 (e.g., produced based on stored or processed data) or content that is produced by the electronic device 101 and obtained from the electronic device 101 through specified communication. According to an embodiment, the user may browse AR content provided through the display module 520 of the wearable electronic device 301.

In operation 803, the AR providing device may detect a specified interaction through the AR screen. In an embodiment, an example of a specified interaction is shown in FIG. 9.

Referring to FIG. 9, the specified interaction may include a first interaction (example 901) of recognizing the electronic device 101 entering the real space of the AR screen provided through the display module 520 of the wearable electronic device 301, a second interaction (example 903) of recognizing a specified gesture (e.g., a slide-out gesture or a rollable extension gesture) input by a user using the electronic device 101 after the entry of the electronic device 101, or a third interaction (example 905) of recognizing a specified menu manipulation gesture (e.g., a touch input) input by the user through the electronic device 101 on the AR screen after the entry of the electronic device 101.

The second interaction may include a gesture of substantially extending the extension area of the electronic device 101. In another embodiment, the second interaction may not be a substantial extension of the extension area of the electronic device 101. For example, the user may input only an extending gesture without substantially extending the electronic device 101, and the AR providing device may recognize the user's gesture to identify the second interaction. The AR providing device may detect a user's gesture according to the second interaction and/or the third interaction, based on the user hand detecting and/or hand tracking on the AR screen.

The example of the specified interaction is intended only to help understanding of the disclosure and is not intended to limit the embodiment of the disclosure. For example, the second interaction in the specified interaction may include a real extension or virtual extension trigger for the electronic device 101 and include, for example, an input to a specified hardware button of the electronic device 101 for extension of the extension area (e.g., a click input or a long-press input) and an input to a specified software button displayed through the display module 160 of the electronic device 101 for extension of the extension area (e.g., a touch input or a long-press input). The second interaction may include various specified inputs as an extension trigger capable of substantially or virtually extending the extension area of the electronic device 101.

Referring back to FIG. 8, in operation 805, the AR providing device may determine an operation entity for processing the content. The operation entity for processing may be determined differently depending on a method of providing an AR service. For example, in the tethered method, content may be produced by the electronic device 101 and provided to the wearable electronic device 301, and the processing entity of the content may be the electronic device 101. As another example, in the case of the standalone method, content may be directly produced and provided by the wearable electronic device 301, and the processing entity of the content may be the wearable electronic device 301.

For example, in the tethered method, the electronic device 101 has the control right of the overall operation for the AR service, the AR service is controlled by the electronic device 101, and the wearable electronic device 301 may obtain content from the electronic device 101, thereby providing the content to the user. As another example, in the standalone method, the wearable electronic device 301 has the control right of the overall operation for the AR service, and the AR service is controlled by the wearable electronic device 301, and the content directly produced by the wearable electronic device 301 may be provided. The AR providing device may further determine whether or not the content to be provided corresponds to a specified profile, in addition to the operation entity for processing. For example, the AR providing device may operate to preferentially provide content of a specified profile through the AR screen, regardless of the processing entity. An operation using the specified profile will be described later.

In operation 807, the AR providing device, based on the result of determining the operation entity, may determine whether a target device for displaying content is the electronic device 101 or the wearable electronic device 301.

If it is determined that the target device is the electronic device 101 in operation 807 (e.g., "Yes" in operation 807), the AR providing device may determine a first display mode in operation 809. If the operation entity is the electronic device 101, the AR providing device may determine a first display mode in which the content on the AR screen switches to be displayed through the electronic device 101.

In operation 811, based on the determination of the first display mode, the AR providing device may perform processing to display content, based on a display area corresponding to the display module 160 of the electronic device 101. If the electronic device 101 performs processing of content or an application corresponding to the content being executed in relation to AR services, the AR providing device may operate to stop displaying the current screen of the wearable electronic device 301 (e.g., turn off the display module 520 or the wearable electronic device 301 in the state in which the wearable electronic device 301 is taken off) and display the content being displayed through the AR screen through the display module 160 of the electronic device 101.

If the processing entity related to the content is the electronic device 101, the AR providing device may operate to stop displaying the AR screen of the wearable electronic device 301, configure a specified active window (e.g., a window based on a default area, a window based on an extension area, or a window based on the entire area) for the content being displayed on the AR screen through a default area and/or an extension area of the display module 160 of the electronic device 101, and display the content, based on the configured active window.

If the processing entity is the electronic device 101, the AR providing device may configure an active window to correspond to a form factor (e.g., a bar type or rollable type) of the electronic device 101. For example, in the case of the bar-type electronic device 101, the AR providing device may configure an active window based on the default area. As another example, in the case of the rollable type electronic device 101, the AR providing device may configure an active window based on at least one of the default area, a partially extension area, the entire extension area, or the entire area.

If it is determined that the target device is the wearable electronic device 301 in operation 807 (e.g., "No" in operation 807), the AR providing device may determine a second display mode in operation 813. For example, if the operation entity is the wearable electronic device 301, the AR providing device may determine a second display mode in which the content on the AR screen is mapped to the actual electronic device 101 on the AR screen and displayed.

In operation 815, based on the determination of the second display mode, the AR providing device, may perform processing to display the content, based on a virtual display area associated with the electronic device 101, on the AR screen provided through the display module 520 of the wearable electronic device 301. If the wearable electronic device 301 performs processing of the content or an application corresponding to the content being executed in relation to AR services, or if the content to be provided corresponds to a specified profile, the AR providing device may process content display, based on the determination of the second display mode. The AR providing device may operate to map (e.g., texture mapping) and display the content, based at least on a default area of the electronic device 101 positioned in the real space displayed on the AR screen through the display module 520 of the wearable electronic device 301, an extension area of the electronic device 101, and/or a virtual area produced adjacent to the electronic device 101. For example, the AR providing device may display the content through the entirety or at least a portion of the default area of the electronic device 101, the extension area, the entire area (e.g., default area+extension area), and/or the virtual area in the virtual space according to the second display mode.

If the processing entity related to content is the wearable electronic device 301, the AR providing device may operate to configure a virtual area corresponding to the extension area of the display module 160 of the electronic device 101 to correspond to the extension area of the electronic device 101, configure a specified active window (e.g., a window based on the default area or a window based on the entire screen) for the content being displayed on the AR screen through the default area and/or the extension area of the display module 160 of the electronic device 101, and map and display the content, based on the configured active window.

As described above, the AR providing device (e.g., the electronic device 101 or the wearable electronic device 301) according to the disclosure may include a processor (e.g., the processor 120 of the electronic device 101 or the processor 590 of the wearable electronic device 301). The processor may operate to provide first content (and/or information related to the content) through an AR screen of the wearable electronic device 301. The processor may operate to detect a specified interaction (e.g., a specified external object (e.g., detect the electronic device 101 entering an AR screen and/or detect a specified gesture)) through the AR screen while providing the content through the AR screen.

Based on the detection of the specified interaction, the processor may determine a display mode for second content (e.g., the first content or other content obtained by processing the first content), based on a processing entity providing the second content.

Based on the determined display mode (e.g., a first display mode or a second display mode), the processor may operate to display the second content through the display module 160 of the electronic device 101 or map and display the second content to and on a display area associated with a specified external object (e.g., the actual electronic device 101 on the AR screen) on the AR screen through the display module 520 of the wearable electronic device 301.

The second content mapped to the AR screen may be provided only through the display area associated with the electronic device 101 on the AR screen, instead of being displayed through the display module 160 of the electronic device 101 in the real world.

If the processing entity related to the content is the wearable electronic device 301, the processor may operate to monitor a change in state of the electronic device 101 (e.g., interaction for rollable activation) in the AR screen while displaying the content on the AR screen of the wearable electronic device 301, based on identification of the change in state of the electronic device 101, determine a display mode of the content, based on the processing entity related to the content, and display the content on an AR screen through the display module 520 of the wearable electronic device 301 or display the content through the display module 160 of the electronic device 101, based on the determined display mode.

Figure 10:
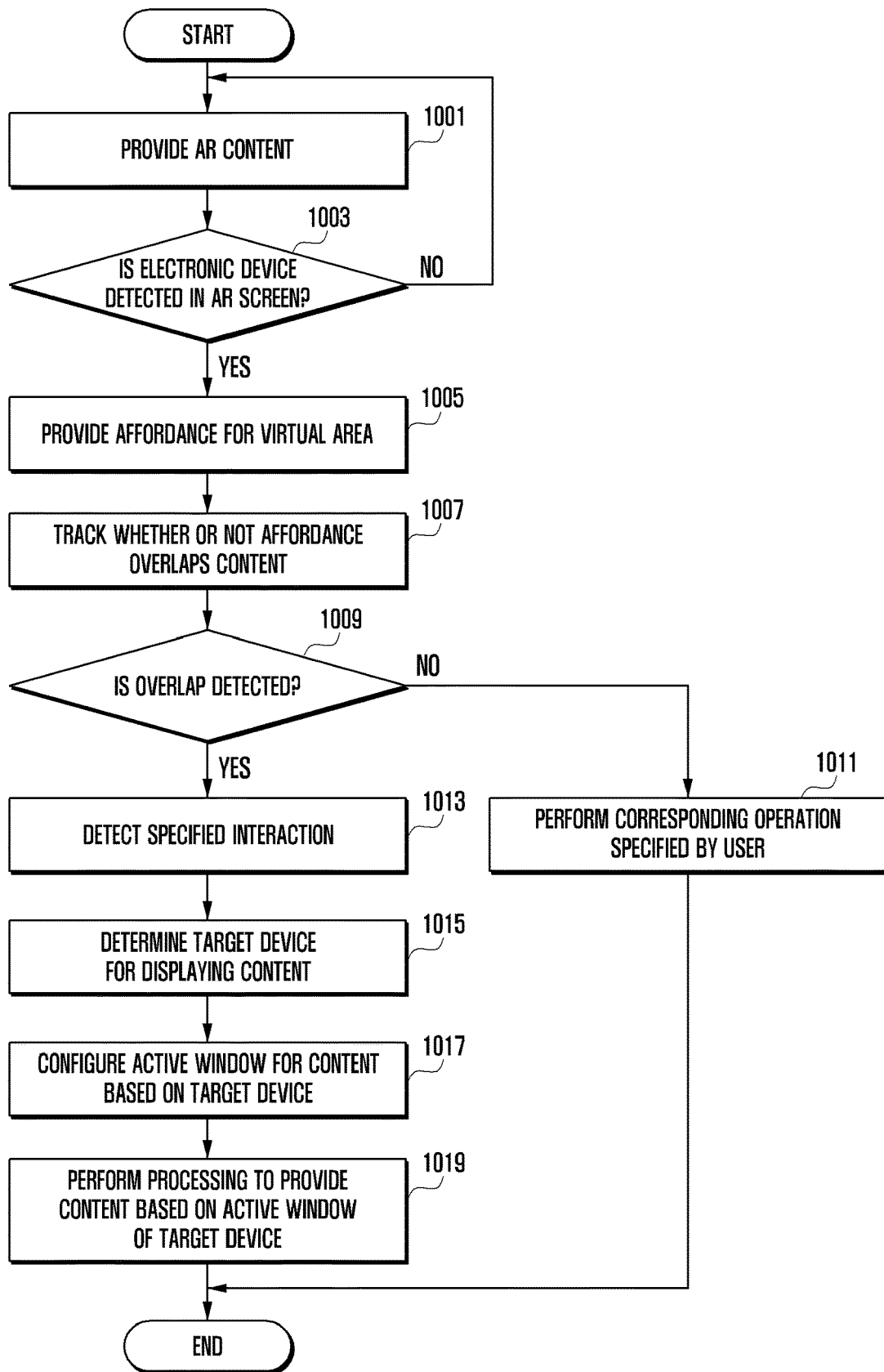
FIG. 10 is a flowchart illustrating a method of operating an electronic device or a wearable electronic device according to an embodiment of the disclosure.

FIG. 10 is a flowchart illustrating a method of operating an electronic device or a wearable electronic device according to an embodiment of the disclosure.

FIGS. 11A to 11F are diagrams illustrating an example of operation scenarios of an electronic device or a wearable electronic device according to various embodiments of the disclosure.

Referring to FIGS. 10 and 11A to 11F, the operations illustrated these figures may be performed by the electronic device 101 or the wearable electronic device 301 depending on the tethered method or the standalone method for providing AR services. Hereinafter, in the description of FIG. 10, the electronic device 101 or the wearable electronic device 301 will be referred to as an AR providing device for convenience of description. The electronic device 101 and the wearable electronic device 301 may further include an operation of receiving, processing, and transmitting related data for AR services depending on the entity that performs the operation, and a description thereof will be made with reference to the drawings to be described later.

Figure 11A:
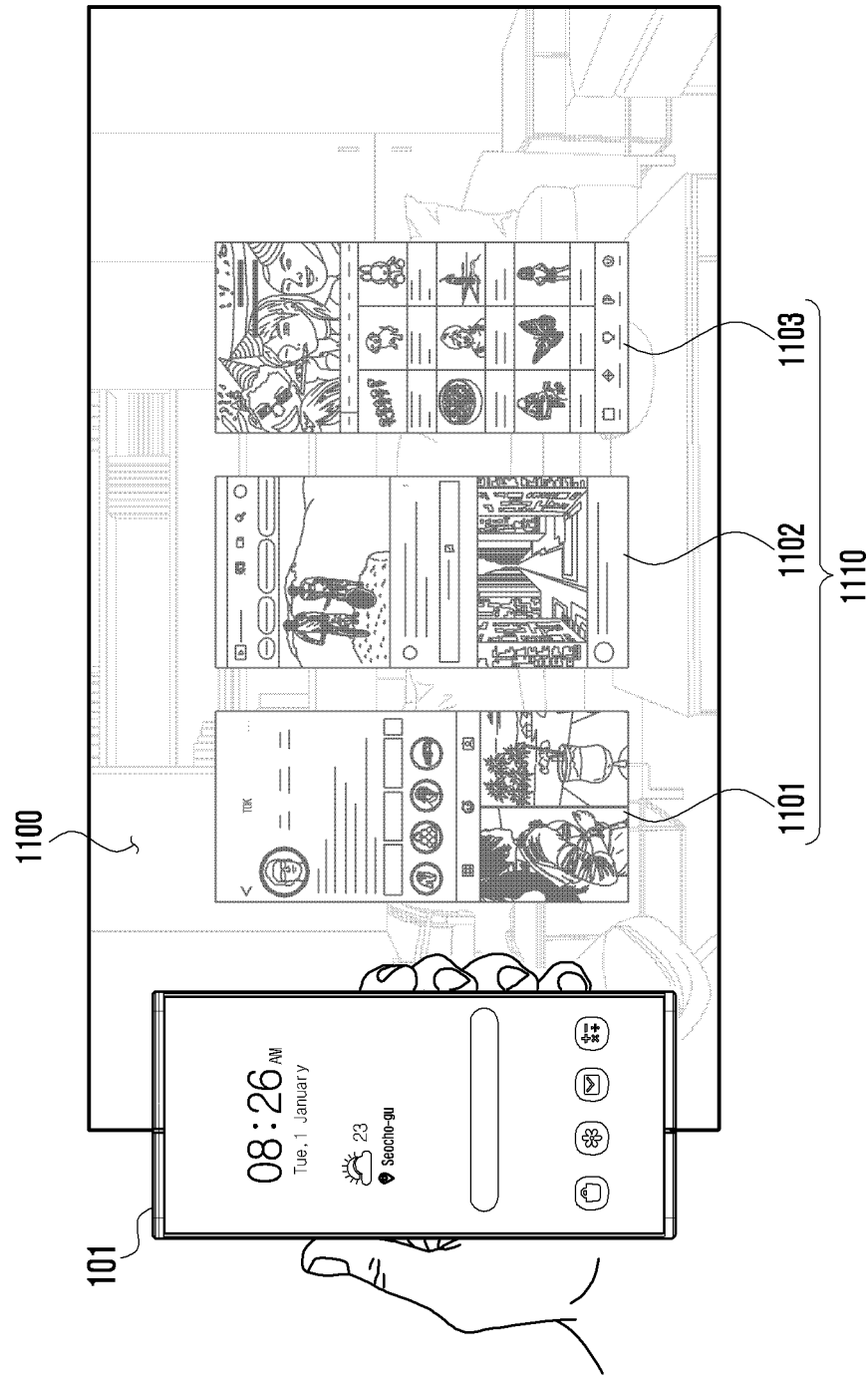

Referring to FIG. 10, in operation 1001, an AR providing device (e.g., the electronic device 101 or the wearable electronic device 301) or a processor of the AR providing device (e.g., the processor 120 of the electronic device 101 or the processor 590 of the wearable electronic device 301) may provide content through a display module 520 of the wearable electronic device 301. An example of this is shown in FIG. 11A. Referring to FIG. 11A, the wearable electronic device 301 may be worn on the user, and the AR providing device may display content (or virtual information) 1110 superimposed on at least a portion of a real space on an AR screen 1100 through the display module 520 of the wearable electronic device 301. For example, the AR providing device may superimpose content 1110 (e.g., first content 1101, second content 1102, and third content 1103) in the real space corresponding to the field of view of the user, thereby providing the same to the user.

In operation 1003, the AR providing device may determine whether or not the electronic device 101 is detected in the AR screen. The AR providing device may track whether or not the electronic device 101 enters the real space provided through the display module 520 of the wearable electronic device 301. An example of this is shown in FIG. 11A. Referring to FIG. 11A, the user may move the electronic device 101 into the AR screen 1100 provided through the display module 520 of the wearable electronic device 301. For example, the user may move the electronic device 101 to a corresponding position to be displayed through the AR screen 1100, and the AR providing device may identify the electronic device 101 moving into the AR screen 1100, based on tracking of an object and/or gaze on the AR screen 1100.

If the electronic device 101 is not detected in operation 1003 (e.g., "No" in operation 1003), the AR providing device may return to operation 1001 and perform operation 1001 and subsequent operations.

Figure 11B:
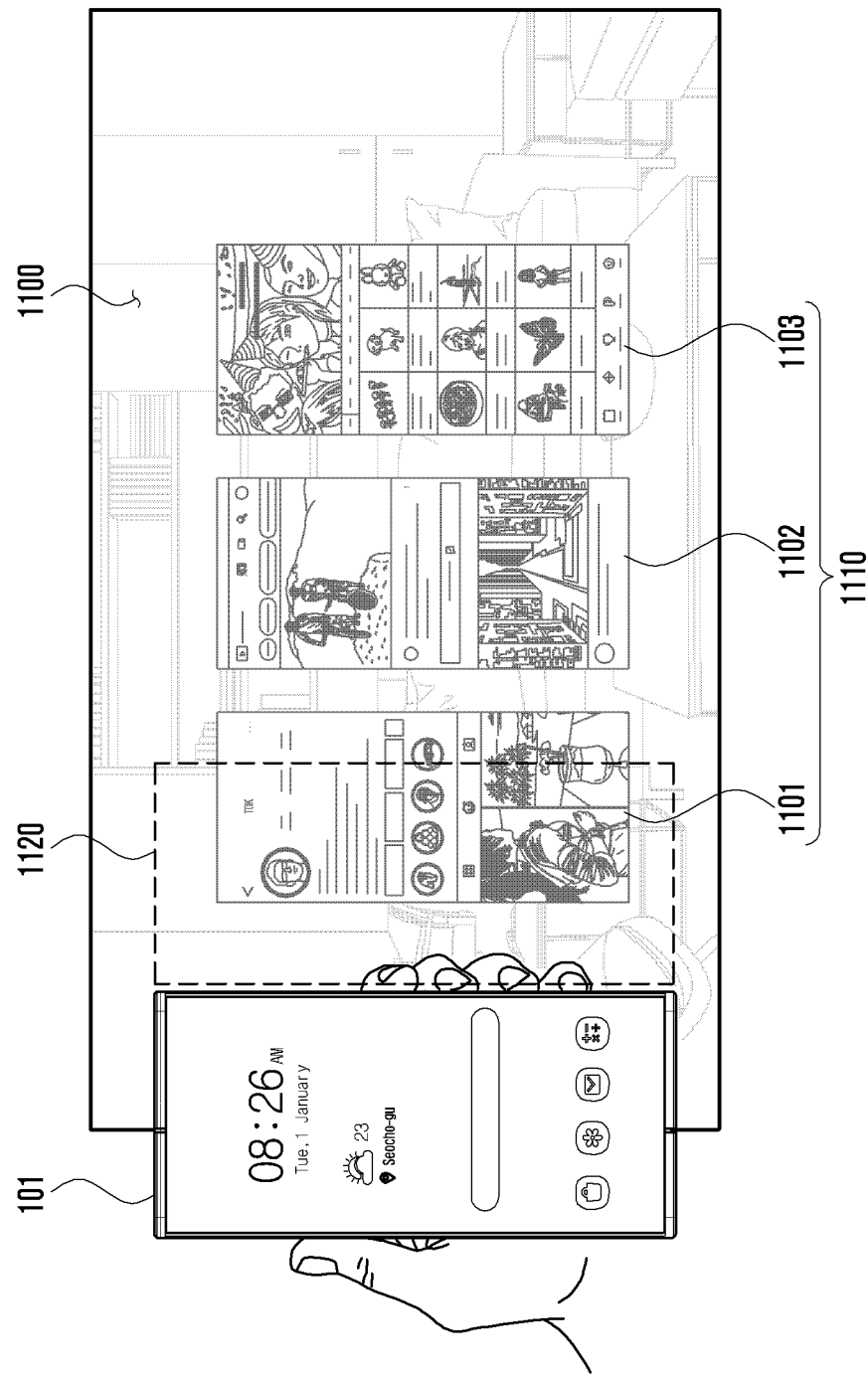

If the electronic device 101 is detected in operation 1003 (e.g., "Yes" in operation 1003), the AR providing device may provide an affordance (or guide) for a virtual area in operation 1005. If the AR providing device identifies the electronic device 101 on the AR screen and detects a specified interaction (e.g., a rollable activation interaction) for the electronic device 101, the AR providing device may provide an affordance (or guide) for a virtual area (e.g., the area expected by rollable extension) in response to the specified interaction. An example of this is shown in FIG. 11B. Referring to FIG. 11B, the AR providing device may provide an affordance 1120, based on the electronic device 101 or the display module 160 of the electronic device 101. The AR providing device may provide a virtual window guide corresponding to a default area and/or a substantial extension area of the electronic device 101 as the affordance 1120. The provision of the affordance 1120 will be described with reference to the drawings below.

Figure 11C:
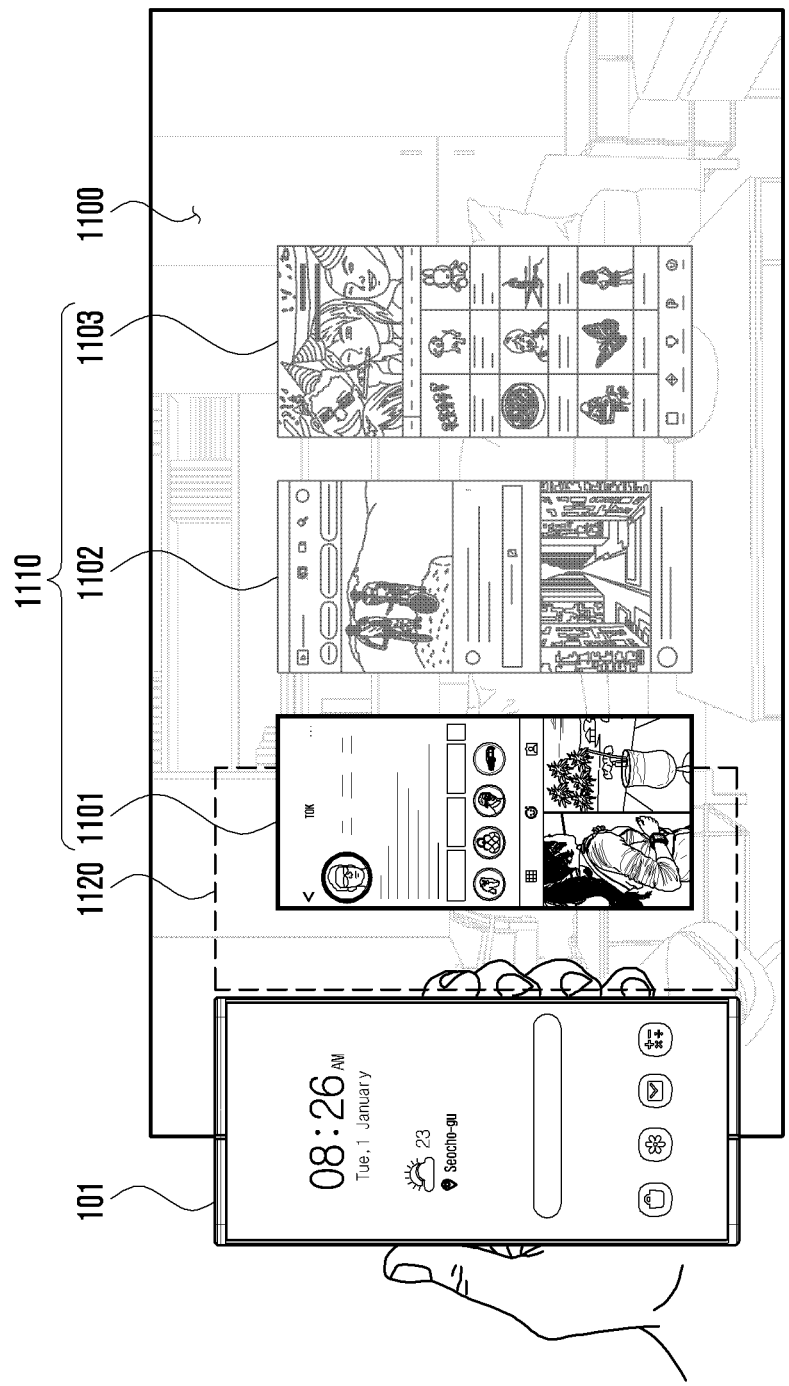

In operation 1007, the AR providing device may track whether or not the affordance overlaps content. The user may move the electronic device 101 such that the affordance at least partially overlaps content. The AR providing device may track the electronic device 101 in the AR screen (e.g., track an object) and move the affordance together in response to the movement of the electronic device 101. An example of this is shown in FIG. 11C. Referring to FIG. 11C, the affordance 1120 and at least a portion of the content 1110 (e.g., the first content 1101) may overlap each other on the AR screen 1100.

If the affordance 1120 and the content 1110 (e.g., the first content 1101) overlap, the AR providing device may activate the overlapping content 1110 (e.g., the first content 1101) (e.g., move and display the content forward of the affordance 1120), thereby distinguishing the overlapping content 1110 (e.g., the first content 1101) from the non-overlapping content 1110 (e.g., the second content 1102 and the third content 1103). For example, the AR providing device may highlight and provide the overlapping content 1110 (e.g., the first content 1101) to be associated with the affordance 1120 so that the user may intuitively recognize the overlapping content 1110.

The electronic device 101 may be a bar-type electronic device in which the display module 160 is not extended and has a fixed size, or may be a rollable type electronic device in which the display module 160 is extendable. For example, the electronic device 101 may include a smartphone, a tablet PC, a notebook computer, and/or a display device (e.g., a monitor or TV) including a display module 160 having a fixed size or a variable size.

If the electronic device 101 is a bar-type electronic device, an affordance may be provided based on a display area (e.g., a default area) of the display module 160 of the electronic device 101, and the affordance and content may be mapped in the display area. If the electronic device 101 is a rollable type electronic device and the display module 160 of the electronic device 101 is in an extended state, an affordance may be provided based on a display area (e.g., default area+extension area) of the display module 160, and the affordance and content may be mapped in the display area. If the electronic device 101 is a rollable type electronic device and if the display module 160 of the electronic device 101 is in a non-extended state, the display module 160 may provide an affordance, based on an extendable virtual area (e.g., a virtual area having a size corresponding to the extension area), and the affordance and content may be mapped in the virtual area.

The content in the AR screen provided through the display module 520 of the wearable electronic device 301 may include space-oriented content that is mapped to the real space and the position of which is adaptively movable according to the user's gaze or the user's movement (e.g., head movement) (e.g., the content is moved to always be visible within the user's gaze, that is, fixedly displayed in a specified area in the display module 520). As another example, the content in the AR screen provided through the display module 520 of the wearable electronic device 301 may include device-oriented (or object-oriented) content that is not mapped to the real space but fixedly mapped to a specific space (or an area where a corresponding object is located in the real space) on the AR screen of the display module 520 so as not to be movable according to the user's gaze or the user's movement.

An operation of mapping (e.g., overlapping) the affordance and the content may vary depending on, for example, whether the content is space-oriented content or device-oriented content. In the case of space-oriented content, the user may overlap content and the affordance by directly moving the electronic device 101 within the AR screen of the display module 520 of the wearable electronic device 301. In the case of device-oriented content, the user may move the user's gaze (e.g., move the head) to the display module 160 (e.g., the default area, the extension area, the entire area, or the virtual area) of the electronic device 101 within the AR screen of the display module 520 of the wearable electronic device 301, and the content may be moved on the AR screen in response to the movement of the user's gaze so that the content may overlap the affordance in the corresponding area of the electronic device 101. The movement of content on the AR screen is not limited to the user's gaze and may be performed, for example, by a user gesture on the AR screen (e.g., a user's gesture of selecting and moving content on the AR screen).

In operation 1009, the AR providing device may determine whether or not an overlap between the affordance and the content is detected. The AR providing device may determine whether or not the content overlaps the position of the affordance corresponding to the movement of the electronic device 101. The AR providing device may perform operations 1007 to 1009 for a specified period of time.

If no overlap between the affordance and the content is detected in operation 1009 (e.g., "No" in operation 1009), the AR providing device may perform a user-specified operation in operation 1011. If no overlap between the affordance and the content is detected for a specified period of time, the AR providing device may remove the affordance from the AR screen and continue to provide the content. The AR providing device may detect a specified input of the user on the AR screen, remove the affordance in response to the specified input, and perform an operation (or function) (e.g., change the content) corresponding to the specified input.

If an overlap between the affordance and the content is detected in operation 1009 (e.g., "Yes" in operation 1009), the AR providing device may detect a specified interaction (or an operation trigger) in operation 1013. If an overlap between the affordance and the content is detected, the AR providing device may determine an interaction of triggering an operation (e.g., an operation trigger) for displaying the corresponding content selected by the overlap with the affordance through a specified target device. An example of this is shown in FIG. 11D.

Figure 11D:
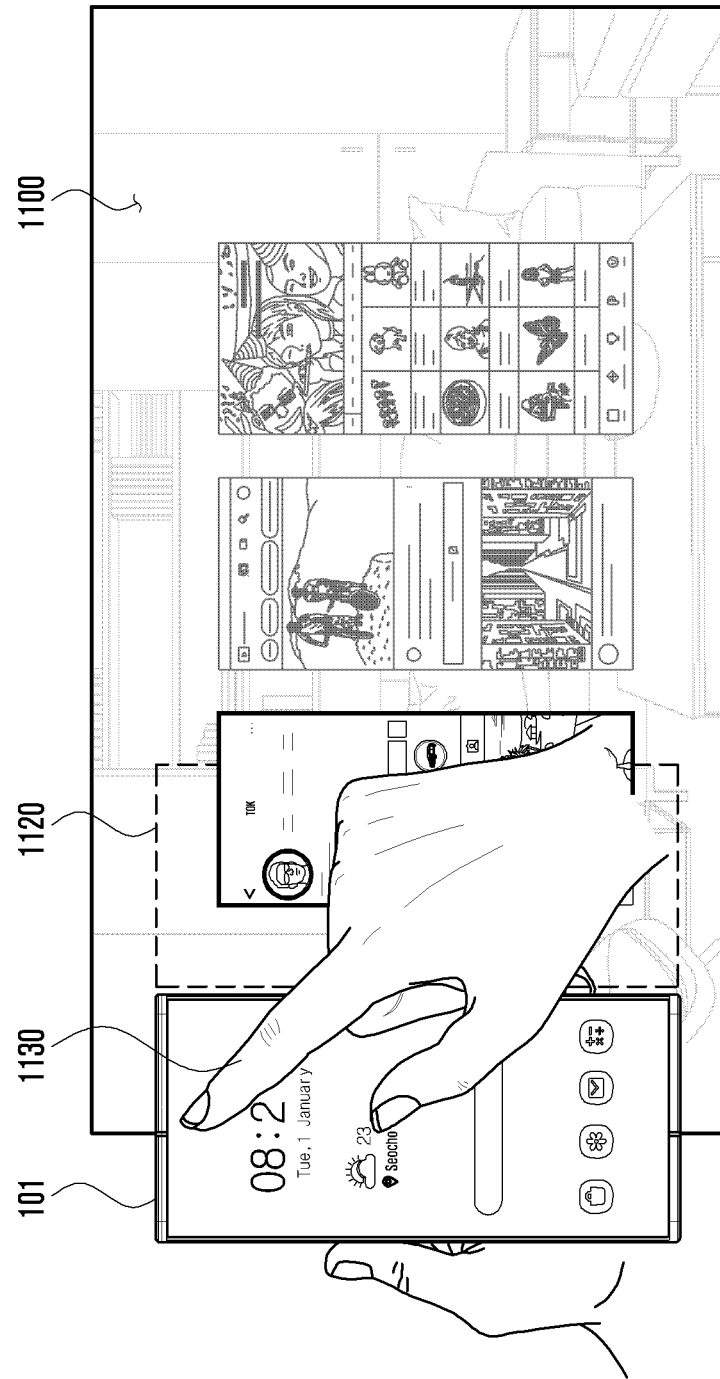

Referring to FIG. 11D, the user may input a specified interaction 1130 for selecting and determining the first content 1101, based on an overlap between the affordance 1120 and the first content 1101 on the AR screen 1100, and displaying the first content 1101 through a target device. The specified interaction may include, for example, a slide-out or rollable extension gesture, an input to a specified hardware button for an extension trigger, or an input to a specified software button for an extension trigger.

In operation 1015, the AR providing device may determine a target device for displaying content, based on detection of the specified interaction. The AR providing device may determine a display mode (e.g., a first display mode or a second display mode) corresponding to a target device for displaying the content selected by the overlap. For example, the AR providing device may determine a display mode and a target device corresponding thereto, based on a content processing entity and/or a specified profile of the content.

In operation 1017, the AR providing device may produce an active window for the content, based on the target device. According to an embodiment of the disclosure, if the target device is the electronic device 101, the AR providing device may configure an active window for the content, based on the display area of the electronic device 101. According to another embodiment of the disclosure, if the target device is the wearable electronic device 301, the AR providing device may configure an active window for the content, based on the display area of the electronic device 101 displayed on the AR screen of the wearable electronic device 301 and/or the virtual area adjacent to the display area.

When configuring an active window, the AR providing device may configure the active window in at least one of the default area, the extension area, or the entire area, based on the overlapping state (or overlapping area) of the affordance and the content according to the user's intention. For example, if the content (e.g., the first content 1101) overlaps the affordance, the AR providing device may configure an active window to display the content in the extension area. As another example, if the content (e.g., the first content 1101) overlaps both the electronic device 101 (e.g., the default area of the electronic device 101) and the affordance on the AR screen, the AR providing device may configure an active window to display the corresponding content in the entire area (e.g., default area+extension area (or virtual area)). As another example, if one piece of content (e.g., the first content 1101) is disposed in the affordance, the AR providing device may configure an active window to display the corresponding content in the entire area (e.g., default area+extension area).

As another example, if a plurality of content (e.g., the first content 1101 and the second content 1102) overlaps the affordance, the AR providing device may configure an active window in each of the default area and the extension area to display the plurality of pieces of content in the default area and the extension area, respectively. As another example, one piece of content (e.g., the first content 1101) among a plurality of pieces of content overlaps the affordance and if another piece of content (e.g., the second content 1102) thereof overlaps the electronic device 101 (e.g., the default area of the electronic device 101), for example, if each piece of content is disposed according to the user's intention, the AR providing device may configure an active window for the first content 1101 in the extension area and an active window for the second content 1102 in the default area so as to display the content to conform to the disposition according to the user's intention. For example, in the case of superimposing the second content on a first extension area by a user input, the AR providing device may map the second content to the first extension area of the display module 160 and provide the same. The active window may be divided corresponding to the number of pieces of content to be displayed.

As will be described later, the affordance may be variable (e.g., extended) by a user input (e.g., an affordance extension interaction). According to an embodiment of the disclosure, if one piece of content (e.g., the first content 1101) is disposed in (e.g., overlaps) the extended affordance, the AR providing device may extend the display module 160 of the electronic device 101 to correspond to the extended affordance and configure an active window so as to display one piece of content on the entire extended screen through the entire area of the extended extension area and the default area. According to another embodiment of the disclosure, if a plurality of pieces of content (e.g., the first content 1101 and the second content 1102) is disposed in (e.g., overlaps) the extended affordance, the AR providing device may configure an active window in each of the default area and the extension area so as to display the plurality of pieces of content in the default area and the extension area, respectively, or configure at least one active window in the extension area so as to display the plurality of pieces of content in the extension area corresponding to the extended affordance.

In operation 1019, the AR providing device provide content, based on the active window of the target device. The AR providing device may provide content to correspond to a first display mode or a second display mode through the target device. For example, the AR providing device may display content in a first display mode in which content is provided through an active window (e.g., a real display area of the electronic device 101) configure in the electronic device 101. As another example, the AR providing device may display the content in a second display mode in which content is virtually mapped and provided through an active window configure based on the electronic device 101 in the AR screen of the wearable electronic device 301. Examples of this are shown in FIGS. 11E and 11F.

Figure 11E:

FIG. 11E shows an example of providing content according to the first display mode. Referring to FIG. 11E, based on the determination of the first display mode, the AR providing device may perform processing to display the content 1110 selected and determined by the user on the AR screen 1100, based on a substantial display area (e.g., an extension area extended by sliding-out) corresponding to the display module 160 of the electronic device 101. If the electronic device 101 performs processing of content or an application corresponding to the content being executed in relation to AR services, the AR providing device may operate to stop displaying the current screen of the wearable electronic device 301 (e.g., turn off the display module 520 or the wearable electronic device 301 in the state in which the wearable electronic device 301 is taken off) and continuously display the first content 1101 selected and determined by the user among the content 1100, which is being displayed through the AR screen 1100, through the display module 160 of the electronic device 101 in the real space.

The content (e.g., the first content 1101) displayed through the display module 160 may be the same as the content (e.g., the first content 1101) being displayed on the AR screen 1100 or may be another piece of content obtained by processing (e.g., resizing) the content being displayed on the AR screen 1100 to correspond to the display area of the display module 160. The content being displayed on the AR screen 1100 and the content to be moved to the electronic device 101 and displayed through the display module 160 may include substantially the same execution screen (or content) and have continuity, and the display size thereof may vary depending on the display area.

FIG. 11F shows an example of providing content according to the second display mode. Referring to FIG. 11F, based on the determination of the second display mode, the AR providing device may perform processing to display the content 1110 based on a virtual area associated with the electronic device 101 on the AR screen 1100 provided through the display module 520 of the wearable electronic device 301. If the wearable electronic device 301 performs processing of content or an application corresponding to the content being executed in relation to AR services, or if the content to be provided corresponds to a specified profile, the AR providing device may perform the following operations.

For example, the AR providing device may operate to map (e.g., texture-map) the first content 1101 selected and determined by the user, among the content 1100 being displayed through the AR screen 1100, to the default area of the electronic device 101 positioned in the real space displayed on the AR screen 1100 through the display module 520 of the wearable electronic device 301, the extension area of the electronic device 101, and/or the virtual area produced adjacent to the electronic device 101 and display the same thereon.

For example, the AR providing device may display the first content 1101 selected and determined by the user through the entirety or at least a portion of the default area of the electronic device 101, the extension area thereof, and/or the virtual area in the AR screen 1100 (e.g., a virtual space) according to the second display mode, and maintain the existing display state of the remaining unselected content (e.g., the second content 1102 and the third content 1103) on the AR screen 1100.

The content (e.g., the first content 1101) displayed in a specified area through mapping may be the same as the content (e.g., the first content 1101) being displayed on the AR screen 1100 or may be another piece of content obtained by processing (e.g., resizing) the content being displayed on the AR screen 1100 to correspond to the specified area. The content being displayed on the AR screen 1100 and the content displayed through mapping may include substantially the same execution screen (or content) and have continuity, and the display size thereof may vary depending on the display area.

An element 1190 may show an example of a display state of the display module 160 of the electronic device 101 viewed in the real space, instead of the electronic device 101 on the AR screen 1100 provided through the display module 520 of the wearable electronic device 301. As illustrated, the electronic device 101 may maintain a screen display being executed (or operated) in the electronic device 101, as shown in FIG. 11A, through a default area and provide a blank screen or a specified screen to an extension area 1195 corresponding to extension of the display module 160 (e.g., an area extended by sliding-out).

For example, the electronic device 101 may provide, as a specified screen, a screen resulting from execution of a specified function in response to extension of the display module 160 (e.g., a split screen based on execution of a specified application or the entire screen of a running application (e.g., display the screen displayed in the default area into a full screen)). The display module 160 of the electronic device 101 in the real space may be in the state of being turned off.

For example, in the second display mode, the screen (e.g., the display screen of the first content 1101) displayed based on the display module 160 of the electronic device 101 on the AR screen 1100 and the screen displayed through the display module 160 of the electronic device 101 in the real space may be different, and the display module 160 of the electronic device 101 may not display the content (e.g., the first content 1101) on the AR screen 1200 in the real space.

FIGS. 12A to 12F are diagrams illustrating an example of operation scenarios of an electronic device or a wearable electronic device according to various embodiments of the disclosure.

FIGS. 12A to 12F show examples of changing a display area for providing content according to a user input, in addition to the operation described with reference to FIGS. 10, and 11A to 11F.

Figure 12A:
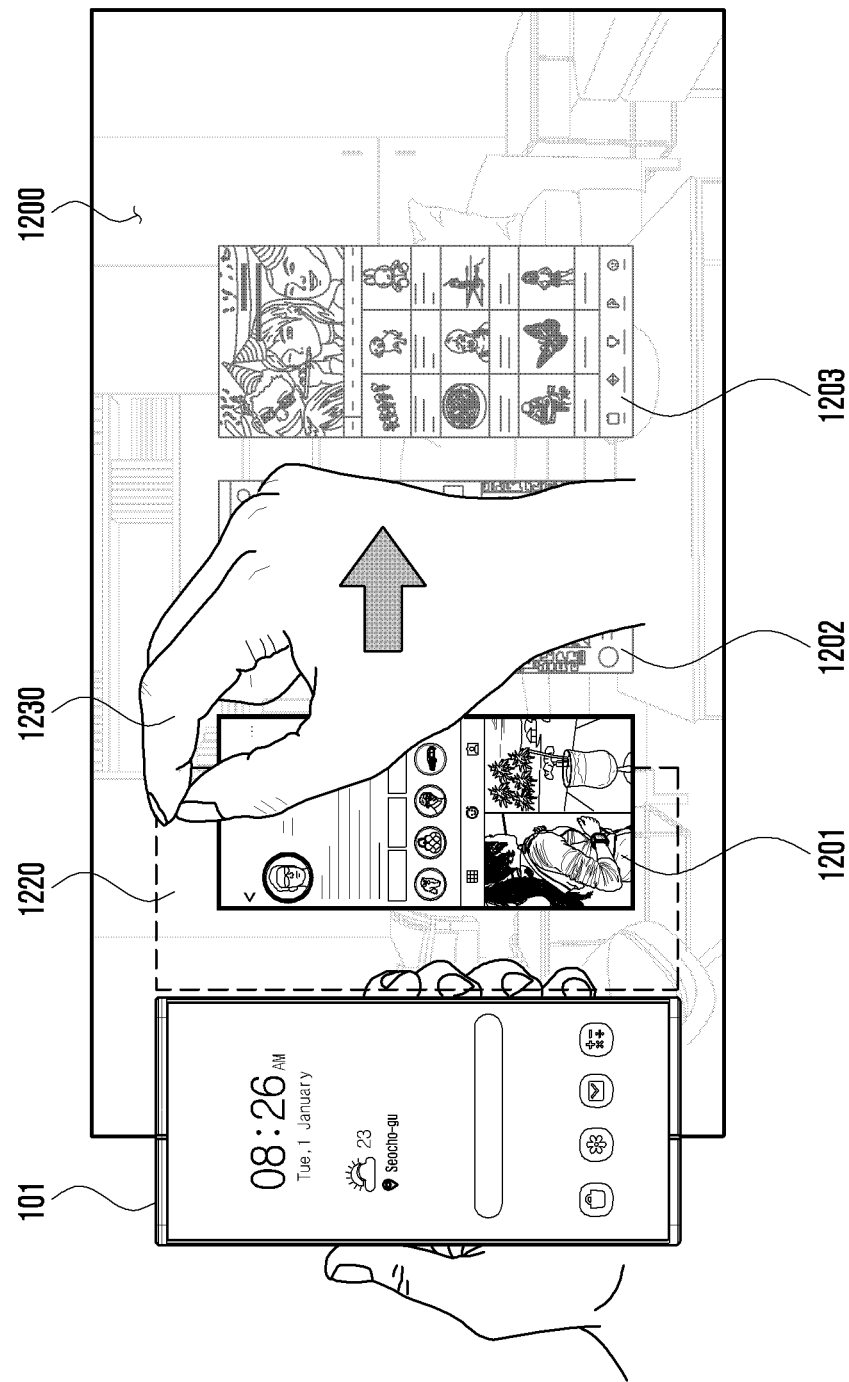

Referring to FIG. 12A, an AR providing device (e.g., an electronic device 101 or a wearable electronic device 301) may provide content (e.g., first content 1201, second content 1202, and third content 1203) to an AR screen 1200 through the display module 520 of the wearable electronic device 301. The wearable electronic device 301 may be worn on the user, and the AR providing device may display a portion of content (or virtual information) superimposed on at least a portion of a real space on the AR screen 1200 through the display module 520 of the wearable electronic device 301. For example, the AR providing device may superimpose at least one piece of content (e.g., first content 1201, second content 1202, and third content 1203) in the real space corresponding to the field of view of the user, thereby providing the content to the user.

In the above situation, the user may move an electronic device 101 into the AR screen 1200 provided through the display module 520 of the wearable electronic device 301. If the AR providing device detects a user's specified interaction (e.g., a rollable activation interaction) for the electronic device 101 on the AR screen 1200, the AR providing device may provide an affordance (or guide) 1220 for a virtual area (e.g., the area expected by rollable extension) in response to the specified interaction. The specified interaction may include, for example, a slide-out or rollable extension gesture, an input to a specified hardware button for an extension trigger, or an input to a specified software button for an extension trigger. The AR providing device may provide a virtual window guide corresponding to a default area and/or a substantial extension area of the electronic device 101 as the affordance 1220. The provision of the affordance 1220 according to an embodiment will be described with reference to the drawings to be described later.

The user may move the electronic device 101 such that the affordance 1220 at least partially overlaps the first content 1201 on the AR screen 1200. The AR providing device may track the electronic device 101 in the AR screen 1200 (e.g., track an object) and move the affordance 1220 together in response to the movement of the electronic device 101. In response to the movement of the electronic device 101 by the user, the affordance 1220 and the first content 1201 may overlap each other on the AR screen 1200. If the affordance 1220 and the first content 1201 overlap each other, the AR providing device may activate the overlapping first content 1201 (e.g., move and display the content forward of the affordance 1220), thereby providing the overlapping first content 1201 and the remaining non-overlapping content (e.g., the second content 1202 and the third content 1203) to be distinguished. For example, the AR providing device may highlight and provide the overlapping first content 1201 to be associated with the affordance 1220 so that the user may intuitively recognize the overlapping first content 1201.

The electronic device 101 may be a bar-type electronic device in which the display module 160 is not extended and has a fixed size, or may be a rollable type electronic device in which the display module 160 is extendable. For example, the electronic device 101 may include a smartphone, a tablet PC, a notebook computer, and/or a display device (e.g., a monitor or TV) including a display module 160 having a fixed size or a variable size.

According to an embodiment of the disclosure, if the electronic device 101 is a bar-type electronic device, an affordance may be provided based on a display area (e.g., a default area) of the display module 160 of the electronic device 101, and the affordance and content may be mapped in the display area.

According to another embodiment of the disclosure, if the electronic device 101 is a rollable type electronic device and if the display module 160 of the electronic device 101 is in an extended state, an affordance may be provided based on a display area (e.g., default area+extension area) of the display module 160, and the affordance and content may be mapped in the display area.

If the electronic device 101 is a rollable type electronic device and if the display module 160 of the electronic device 101 is in a non-extended state, the display module 160 may provide an affordance, based on an extendable virtual area (e.g., a virtual area having a size corresponding to the extension area), and the affordance and content may be mapped in the virtual area.

The content in the AR screen provided through the display module 520 of the wearable electronic device 301 may include space-oriented content that is mapped to the real space and the position of which is adaptively movable according to the user's gaze or the user's movement (e.g., head movement) (e.g., the content is moved to always be visible within the user's gaze, that is, fixedly displayed in a specified area in the display module 520). As another example, the content in the AR screen provided through the display module 520 of the wearable electronic device 301 may include device-oriented (or object-oriented) content that is not mapped to the real space but fixedly mapped to a specific space (or an area where a corresponding object is located in the real space) on the AR screen of the display module 520 so as not to be movable according to the user's gaze or the user's movement.

An operation of mapping (e.g., overlapping) the affordance and the content may vary depending on, for example, whether the content is space-oriented content or device-oriented content. For example, in the case of space-oriented content, the user may overlap content and the affordance by directly moving the electronic device 101 within the AR screen of the display module 520 of the wearable electronic device 301. As another example, in the case of device-oriented content, the user may move the user's gaze (e.g., move the head) to the display module 160 (e.g., the default area, the extension area, the entire area, or the virtual area) of the electronic device 101 within the AR screen of the display module 520 of the wearable electronic device 301, and the content may be moved on the AR screen in response to the movement of the user's gaze so that the content may overlap the affordance in the corresponding area of the electronic device 101.

The movement of content on the AR screen is not limited to the user's gaze and may be performed, for example, by a user gesture on the AR screen (e.g., a user's gesture of selecting and moving content on the AR screen). In addition to the selection by overlapping of the first content 1201, the user may input a first interaction 1230 (e.g., an affordance extension interaction) for varying (e.g., extending) the affordance 1220 in order to further select another piece of content (e.g., the second content 1202) by overlapping of the affordance 1220. In an embodiment, the AR providing device may extend the affordance 1220 in response to the first interaction and provide the same. An example of this is shown in FIG. 12B.

Although it is described that the affordance 1220 is extended (e.g., varied) based on the user's interaction, this example is intended only to help the understanding of the disclosure and is not intended to limit embodiments of the disclosure. For example, the affordance 1220, is not limited to the variation based on the user's interaction, and may automatically vary. For example, if the size of the extension area by the affordance 1220 is not suitable for displaying content (e.g., excessively larger or smaller than the displayable size of the content,) in displaying the content overlapping the affordance 1220, the AR providing device may calculate the size of the extension area capable of displaying the overlapping content and vary (e.g., extend) the affordance 1220 to conform to the size of the calculated extension area, thereby providing the same.

Figure 12B:
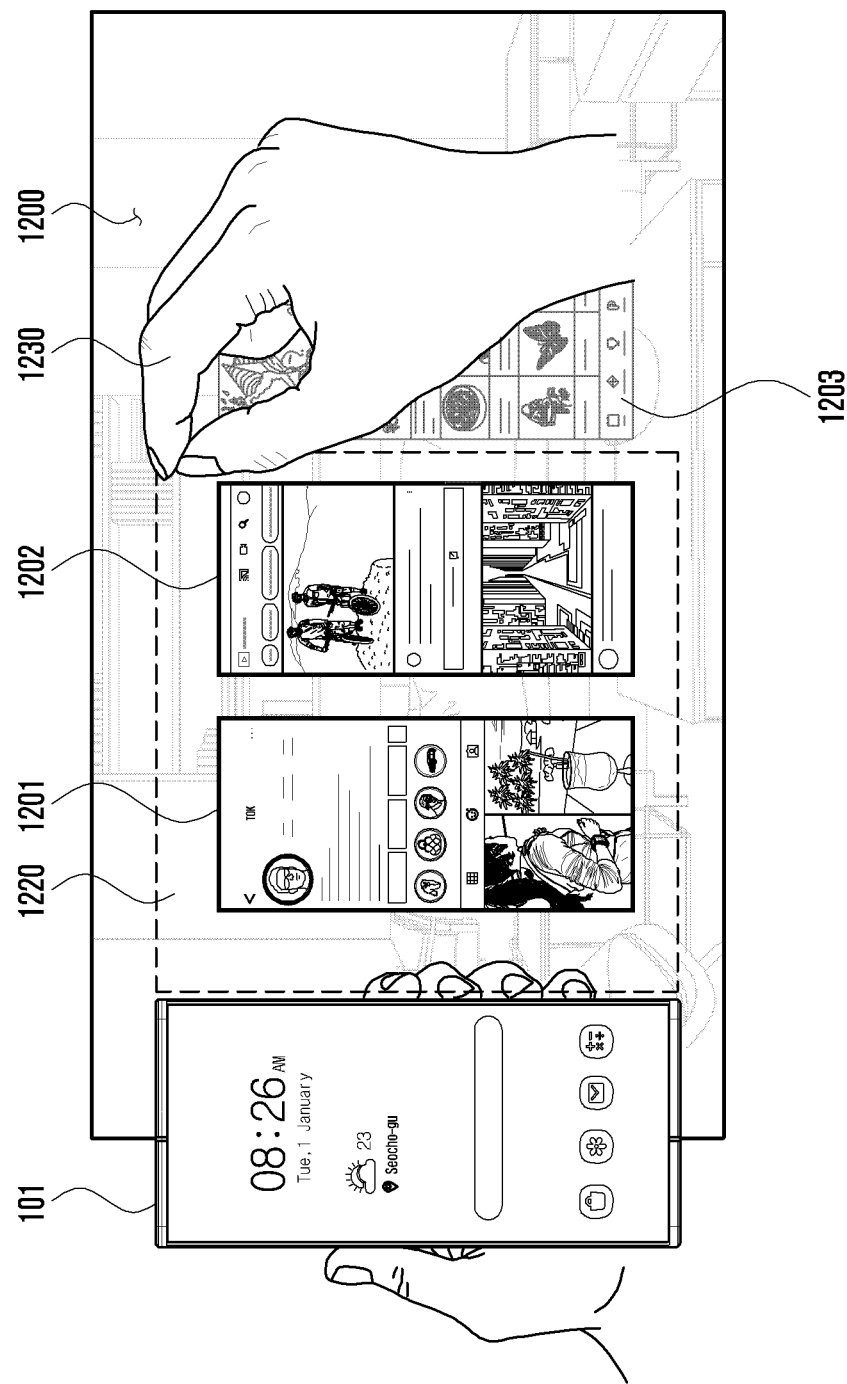

Referring to FIG. 12B, the AR providing device may vary (e.g., extend) the affordance 1220 to conform to the variable size (or movement distance) of the first interaction and provide the same to the AR screen 1200. As shown in FIG. 12B, as the affordance 1220 is extended, another piece of content (e.g., the second content 1202), as well as the first content 1201, may overlap the affordance 1220. If the affordance 1220 and the second content 1202 overlap in addition to the first content 1201, the AR providing device may further activate the overlapping second content 1202 (e.g., move and display the content forward of the affordance 1220), thereby providing the overlapping first content 1201 and second content 1202 to be distinguished from the remaining non-overlapping content (e.g., the third content 1203). For example, the AR providing device may highlight and provide the overlapping first content 1201 and second content 1202 to be associated with the affordance 1220 so that the user may intuitively recognize the overlapping first content 1201 and second content 1202.

Figure 12C:
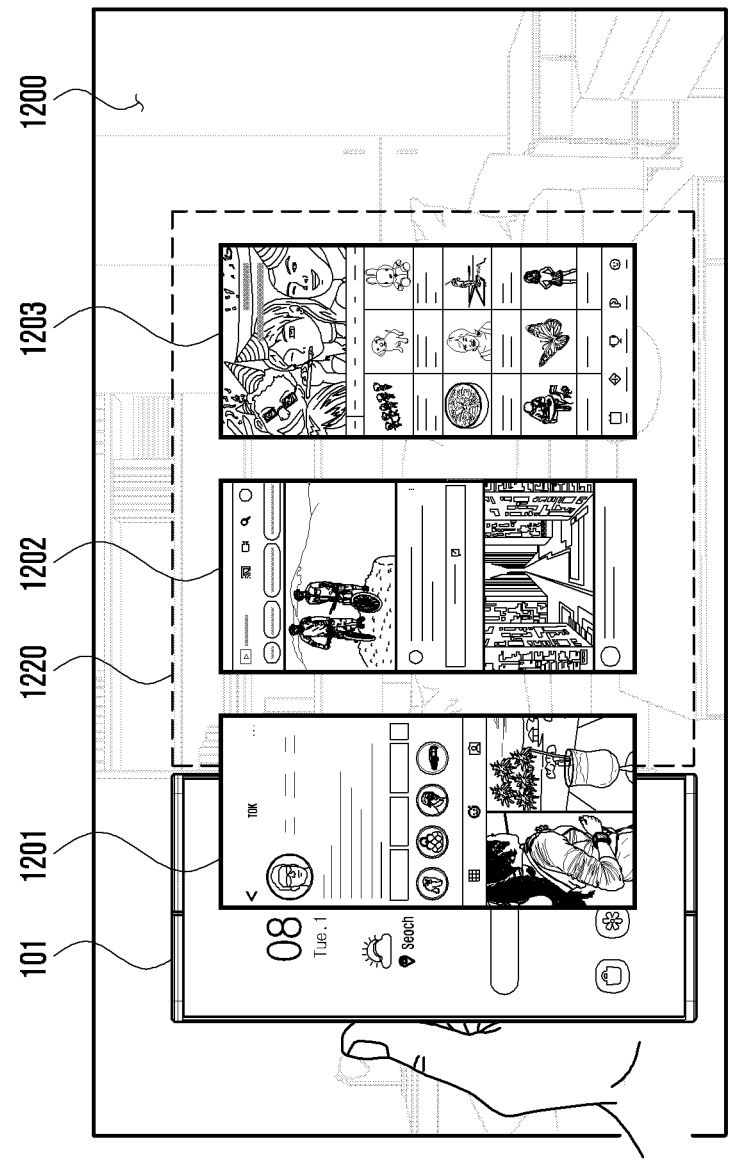

Referring to FIG. 12C, the user may move the electronic device 101 in order to further select another piece of content (e.g., the third content 1203) in addition to the selection by the overlapping of the first content 1201 and second content 1202. According to an embodiment, in order to select all of the content (e.g., the first content 1201, the second content 1202, and the third content 1203) disposed side by side on the AR screen 1200, the user may move the electronic device 101 such that the affordance 1220 at least partially overlaps the third content 1203 on the AR screen 1200.

Referring to the example in FIG. 12C, the electronic device 101 may move in the right direction, and the affordance 1220 may also move in response to the movement of the electronic device 101. The first content 1201, the second content 1202, and the third content 1203 may be fixed to be displayed without changing their positions. An overlapping portion of the first content 1201, the second content 1203, and the third content 1205 may vary in response to the movement of the electronic device 101. For example, the first content 1201 may be positioned on the display module 160 of the electronic device 101, the second content 1202 may be positioned in the area where the first content 1201 was positioned in the affordance 1220 by replacing the same, and the third content 1203 may be further positioned in the area where the second content 1202 was positioned in the affordance 1220.

Figure 12D:
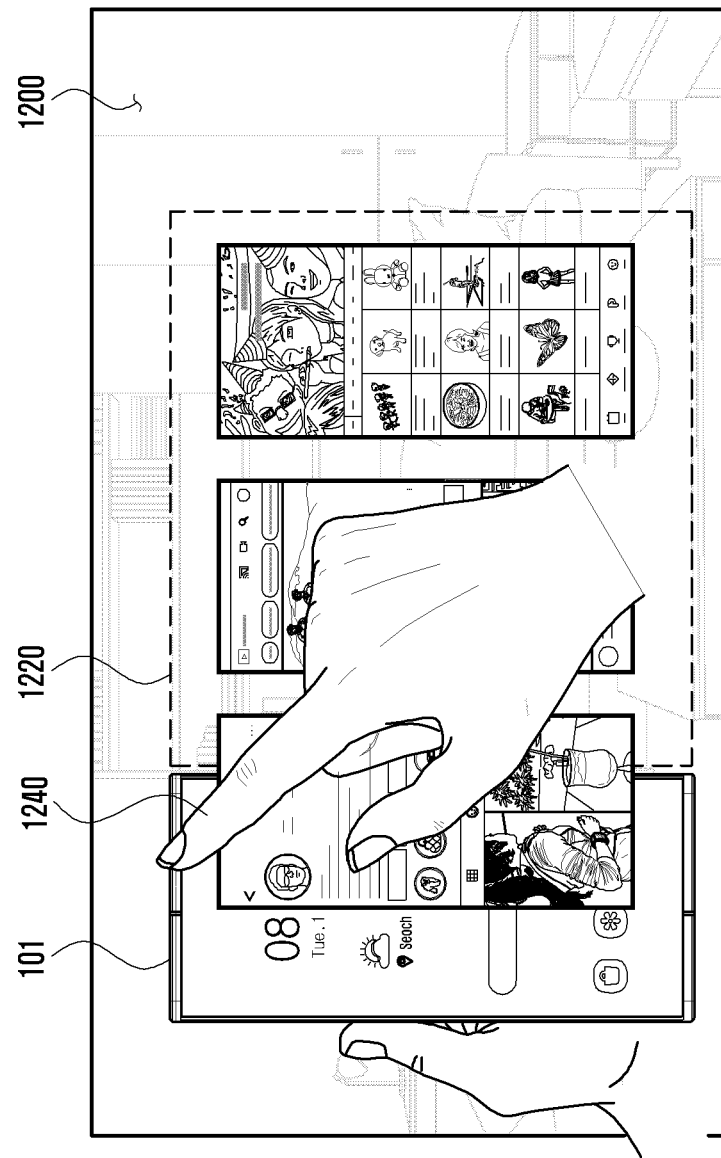

Referring to FIG. 12D, the AR providing device may detect a second interaction 1240 of triggering an operation (e.g., an operation trigger) of displaying at least one piece of content (e.g., the first content 1201, the second content 1202, or the third content 1203) selected by the user through a specified target device. For example, the user may select and determine the first content 1201, the second content 1202, and the third content 1203 on the AR screen 1200 and input a specified second interaction 1240 (e.g., a rollable extension gesture, another specified touch gesture, or a voice-based command) for displaying the selected first content 1201, second content 1202, and third content 1203 through the target device.

The AR providing device may determine a target device for displaying content, based on the detection of the second interaction 1240. The AR providing device may determine a display mode (e.g., a first display mode or a second display mode) corresponding to a target device for displaying the content selected by the user. For example, the AR providing device may determine a display mode and a target device corresponding thereto, based on a content processing entity and/or a specified profile of the content.

The AR providing device may provide content through the target device to conform to the first display mode or the second display mode. For example, the AR providing device may display content in a first display mode in which content is provided through a real display area based on the display module 160 of the electronic device 101. As another example, the AR providing device may display content in a second display mode in which content is mapped and provided through a virtual display area configure based on the electronic device 101 in the AR screen 1200 of the wearable electronic device 301. Examples of this are shown in FIGS. 12E and 12F.

Figure 12E:
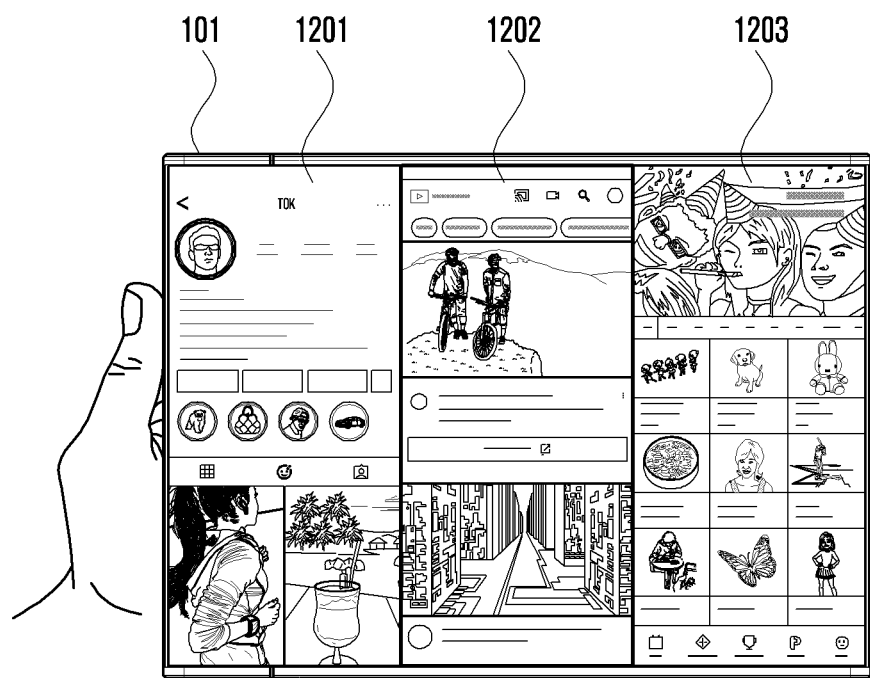

FIG. 12E shows an example of providing content according to the first display mode.

Referring to FIG. 12E, based on the determination of the first display mode, the AR providing device may perform processing to display the content (e.g., the first content 1201, the second content 1202, and the third content 1203) selected and determined by the user on the AR screen 1200, based on a substantial display area (e.g., a default area and an extension area that is extended by sliding-out) corresponding to the display module 160 of the electronic device 101.

If the electronic device 101 performs processing of content or an application corresponding to the content being executed in relation to AR services, the AR providing device may operate to stop displaying the current screen of the wearable electronic device 301 (e.g., turn off the display module 520 or the wearable electronic device 301 in the state in which the wearable electronic device 301 is taken off) and continuously display the first content 1201, the second content 1202, and the third content 1203 selected and determined by the user on the AR screen through the display module 160 of the electronic device 101 in the real space.

The AR providing device may display the content on the display module 160 to conform to the position where each piece of content 1201, 1202, or 1203 overlaps the electronic device 101 on the AR screen 1200. For example, the first content 1201 may overlap the default area of the electronic device 101 on the AR screen 1200, and the first content 1201 may be provided through the default area of the display module 160 of the electronic device 101 in the real space. For example, the second content 1202 may overlap the first extension area of the electronic device 101 on the AR screen 1200, and the second content 1202 may be provided through the first extension area of the display module 160 of the electronic device 101 in the real space. For example, the third content 1203 may overlap the second extension area of the electronic device 101 on the AR screen 1200, and the third content 1203 may be provided through the second extension area of the display module 160 of the electronic device 101 in the real space.

FIG. 12F shows an example of providing content according to the second display mode.

Referring to FIG. 12F, based on the determination of the second display mode, the AR providing device may perform processing to display the content (e.g., the first content 1201, the second content 1202, and the third content 1203), based on a virtual area associated with the electronic device 101 on the AR screen 1200 provided through the display module 520 of the wearable electronic device 301.

If the wearable electronic device 301 performs processing of content or an application corresponding to the content being executed in relation to the AR service, or if the content to be provided corresponds to a specified profile, the AR providing device may perform the following operations. For example, the AR providing device may operate to map (e.g., texture-map) the first content 1201, the second content 1202, and the third content 1203 selected and determined by the user from the AR screen 1200 to the default area of the electronic device 101 positioned in the real space displayed on the AR screen 1200 through the display module 520 of the wearable electronic device 301, the extension area of the electronic device 101, and/or the virtual area produced adjacent to the electronic device 101 and display the same thereon. The AR providing device may display the first content 1201, the second content 1202, and the third content 1203 selected and determined by the user through the entirety or at least a portion of the default area of the electronic device 101, the extension area thereof, and/or the virtual area in the AR screen 1200 (e.g., a virtual space) according to the second display mode.

An element 1290 may show an example of a display state of the display module 160 of the electronic device 101 viewed in the real space, instead of the electronic device 101 on the AR screen 1200 provided through the display module 520 of the wearable electronic device 301. As illustrated, the electronic device 101 may maintain a screen display being executed (or operated) in the electronic device 101, as shown in FIG. 12A, through a default area and provide a blank screen or a specified screen to an extension area 1295 corresponding to extension of the display module 160 (e.g., an area extended by sliding-out). For example, the electronic device 101 may provide, as a specified screen, a screen resulting from execution of a specified function in response to extension of the display module 160 (e.g., a split screen based on execution of a specified application or the entire screen of a running application (e.g., display the screen displayed in the default area into a full screen)). According to an embodiment, the display module 160 of the electronic device 101 in the real space may be in the state of being turned off.

In the second display mode, the screen (e.g., the display screen of the first content 1201, the second content 1202, and the third content 1203) displayed based on the display module 160 of the electronic device 101 on the AR screen 1200 and the screen displayed through the display module 160 of the electronic device 101 in the real space may be different, and the display module 160 of the electronic device 101 may not display the content (e.g., the first content 1201, the second content 1202, and the third content 1203) on the AR screen 1200 in the real space.

The AR providing device may dispose and display the content to correspond to the position where each piece of content 1201, 1202, or 1203 overlaps the electronic device 101 on the AR screen 1200. For example, the first content 1201 may overlap the default area of the electronic device 101 on the AR screen 1200, and the first content 1201 may be mapped and provided to the default area of the display module 160 of the electronic device 101. The second content 1202 may overlap the first extension area (or first virtual area) of the electronic device 101 on the AR screen 1200, and the second content 1202 may be mapped and provided to the first extension area (or first virtual area) of the display module 160 of the electronic device 101. The third content 1203 may overlap the second extension area (or second virtual area) of the electronic device 101 on the AR screen 1200, and the third content 1203 may be mapped and provided to the second extension area (or second virtual area) of the display module 160 of the electronic device 101.

Figure 13A:
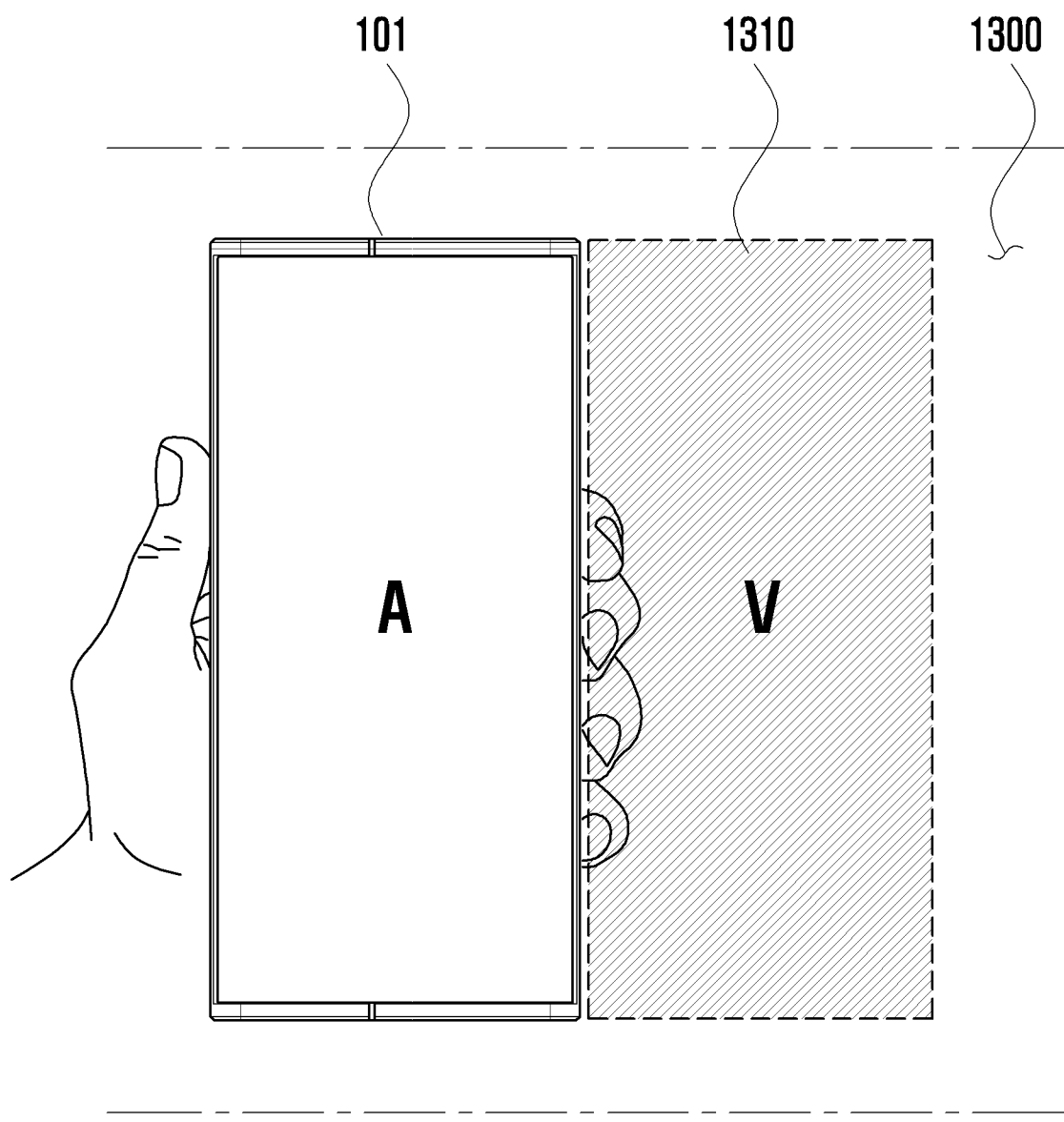
FIGS. 13A, 13B, and 13C are diagrams illustrating an example of configuring an active window in association with an electronic device provided through an AR screen according to various embodiments of the disclosure.
Figure 13B:
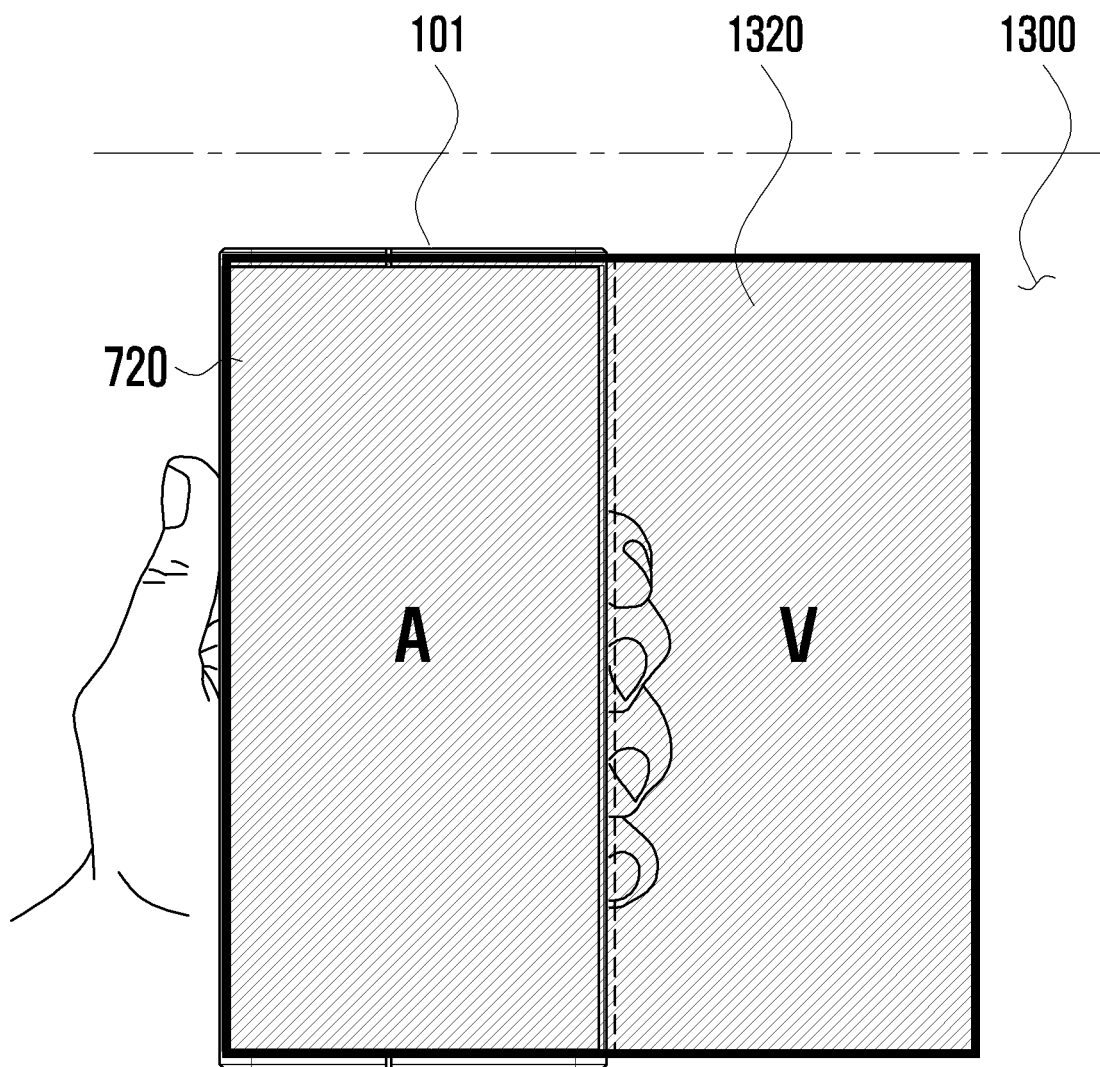
Figure 13C:
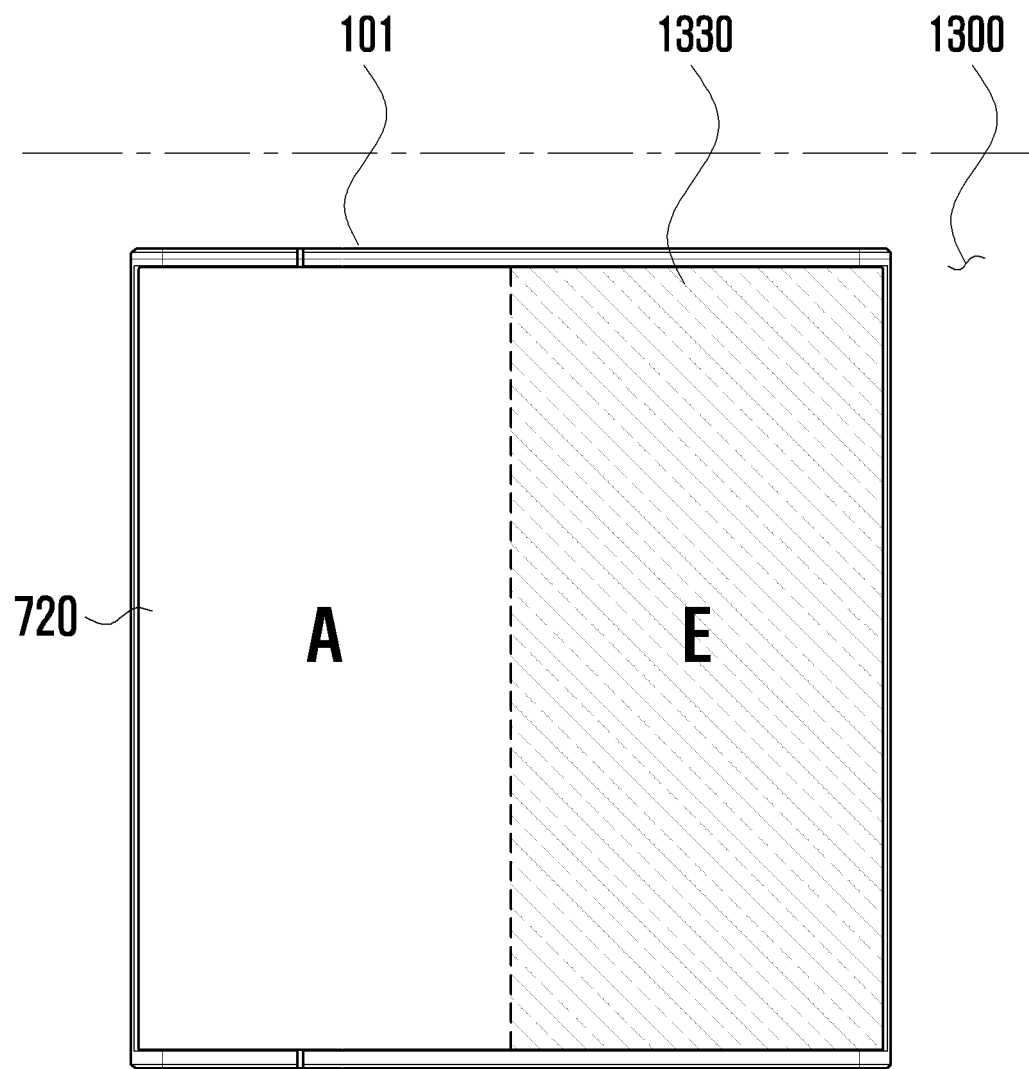

FIGS. 13A to 13C are diagrams illustrating an example of configuring an active window in association with an electronic device provided through an AR screen according to various embodiments of the disclosure.

FIGS. 13A, 13B, and 13C show various examples of providing an affordance for an expected screen in which the content selected by the user on an AR screen 1300 is to be displayed according to a first display mode or a second display mode to the AR screen 1300. An active window may be configured to correspond to a given affordance in the first display mode or the second display mode. For example, according to the disclosure, it is possible to guide the user in advance about an expected screen in which the content selected by the user on the AR screen 1300 is to be displayed in a corresponding display mode using affordance.

Referring to FIG. 13A, an affordance 1310 for an active window may be provided to a virtual area V while a default area A of the electronic device 101 is maintained. The virtual area V may be produced according to the size (or ratio) corresponding to the default area A or may be produced according to the size (or ratio) corresponding to the extendable extension area of the electronic device 101. If the size of the extension area by the affordance 1310 is not suitable for displaying content (e.g., excessively larger or smaller than the displayable size of the content,) in displaying the content, the AR providing device may calculate the size of the extension area capable of displaying the overlapping content and vary (e.g., extend) the affordance 1310 to conform to the size of the calculated extension area so as to provide the content. Accordingly, the virtual area V may vary depending on the size (or ratio) of the variable affordance 1310.

Referring to FIG. 13B, since a user interaction (e.g., a rollable activation gesture) reflects a clear intention of the user for screen extension of the electronic device 101, an affordance 1320 for an active window may be provided to the entire area including the default area A of the electronic device 101 and the virtual area V. For example, the entire area (e.g., default area+extension area) including the default area and the extension area of the display module 160 of the electronic device 101 may be configured as an active window for displaying content.

Referring to FIG. 13C, in FIG. 13C, an affordance 1330 for an active window may be provided based on an extension area E in which the electronic device 101 is substantially extended on the AR screen 1300. For example, if the display module 160 of the electronic device 101 is substantially extended, the extension area E may be configured as an active window for displaying content.

Referring to FIGS. 13A to 13C, affordances 1310, 1320, and 1330 may be varied (e.g., extended) by a user input (e.g., an affordance extension interaction). According to an embodiment of the disclosure, if one piece of content (e.g., first content) is disposed in (e.g., overlaps) the extended affordance, the AR providing device may extend the display module 160 of the electronic device 101 to correspond to the extended affordance and configure an active window so as to display one piece of content on the entire extended screen through the entire area of the extended extension area and the default area. According to another embodiment of the disclosure, if a plurality of pieces of content (e.g., first content and second content) is disposed in (e.g., overlaps) the extended affordance, the AR providing device may configure an active window in each of the default area and the extension area so as to display the plurality of pieces of content in the default area and the extension area, respectively, or configure at least one active window in the extension area so as to display the plurality of pieces of content in the extension area corresponding to the extended affordance.

When configuring an active window, the AR providing device may configure the active window in at least one of the default area, the extension area, or the entire area, based on the overlapping state (or overlapping area) of the affordance and the content according to the user's intention.

For example, if the content overlaps the affordance, the AR providing device may configure an active window to display the content in the extension area. As another example, if the content overlaps both the electronic device 101 (e.g., the default area of the electronic device 101) and the affordance on the AR screen, the AR providing device may configure an active window to display the corresponding content in the entire area (e.g., default area+extension area (or virtual area)). As another example, if a plurality of pieces of content (e.g., first content and second content) overlaps the affordance, the AR providing device may configure an active window in each of the default area and the extension area to display the plurality of pieces of content in the default area and the extension area, respectively.

As another example, if one piece of content (e.g., first content) among a plurality of pieces of content overlaps the affordance and another piece of content (e.g., second content) thereof overlaps the electronic device 101 (e.g., the default area of the electronic device 101), for example, if each piece of content is disposed according to the user's intention (e.g., a user input of selecting and moving content to a certain area), the AR providing device may configure an active window for the first content in the extension area and an active window for the second content in the default area so as to display the content to conform to the disposition according to the user's intention. In the case of superimposing the second content on a first extension area by a user input, the AR providing device may map the second content to the first extension area of the display module 160 and provide the second content. The active window may be divided corresponding to the amount of content to be displayed.

FIGS. 14A to 14F are diagrams illustrating an example of operation scenarios of an electronic device or a wearable electronic device according to various embodiments of the disclosure.

Referring to FIGS. 14A to 14F, the illustrated operations may be performed by the wearable electronic device 301 according to the standalone method of providing an AR service. For example, FIGS. 14A to 14F show examples in which the electronic device 101 is unable to process content or an application corresponding to the content being executed in relation to an AR service. FIGS. 14A to 14F show examples of mapping and displaying content displayed on an AR screen provided through the display module 520 of the wearable electronic device 301 on the AR screen in association with the electronic device 101 and processing a user input for the content displayed to be mapped to the electronic device 101. FIGS. 14A to 14F include an example of manipulating content being executed through the wearable electronic device 301 in the standalone method using the electronic device 101 after the display module 160 of the electronic device 101 is extended (e.g., slides out). In FIGS. 14A to 14F, content is implemented (or used) by the wearable electronic device 301 in the standalone method and may be, for example, content that is unable to be processed by the electronic device 101.

Figure 14A:
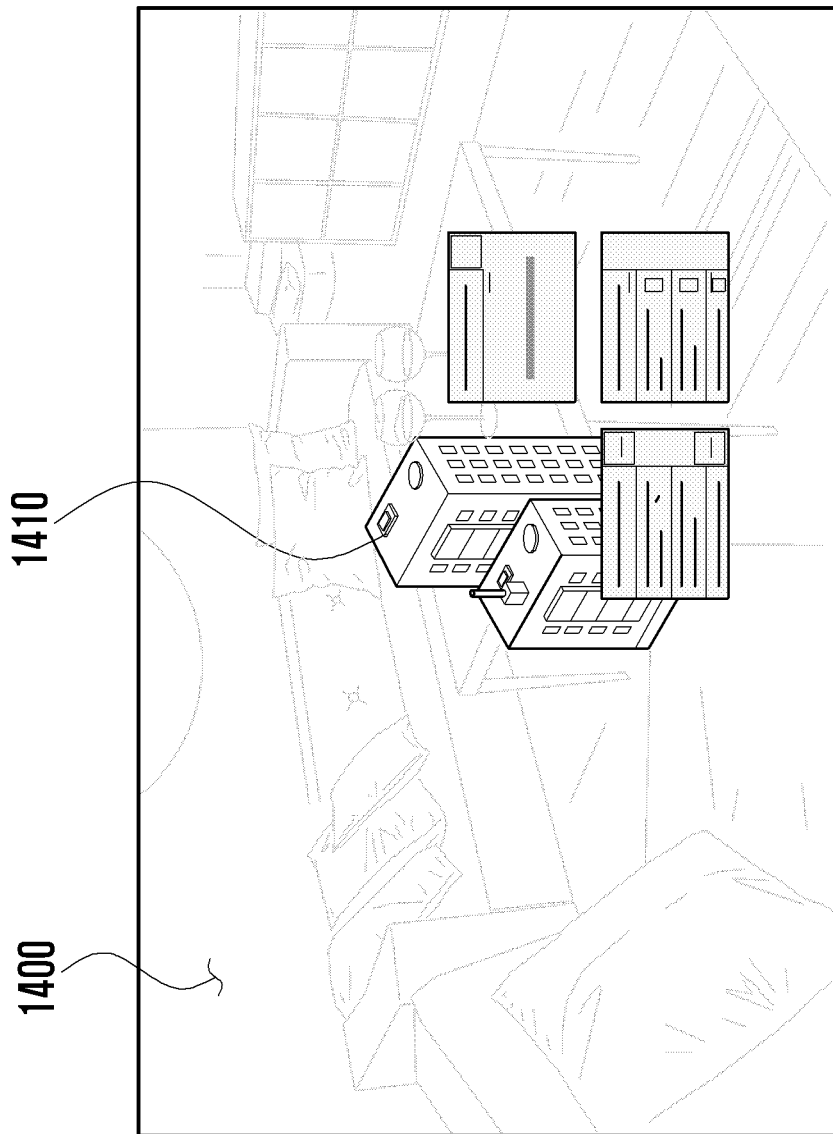

Referring to FIG. 14A, the wearable electronic device 301 may provide content 1410 to an AR screen 1400 through the display module 520 of the wearable electronic device 301. The wearable electronic device 301 may be worn on the user, and at least one piece of content (or virtual information) superimposed on at least a portion of a real space may be displayed on the AR screen 1400 through the display module 520 of the wearable electronic device 301. For example, the wearable electronic device 301 may superimpose at least one piece of content 1410 in the real space corresponding to the field of view of the user, thereby providing the same to the user.

Figure 14B:
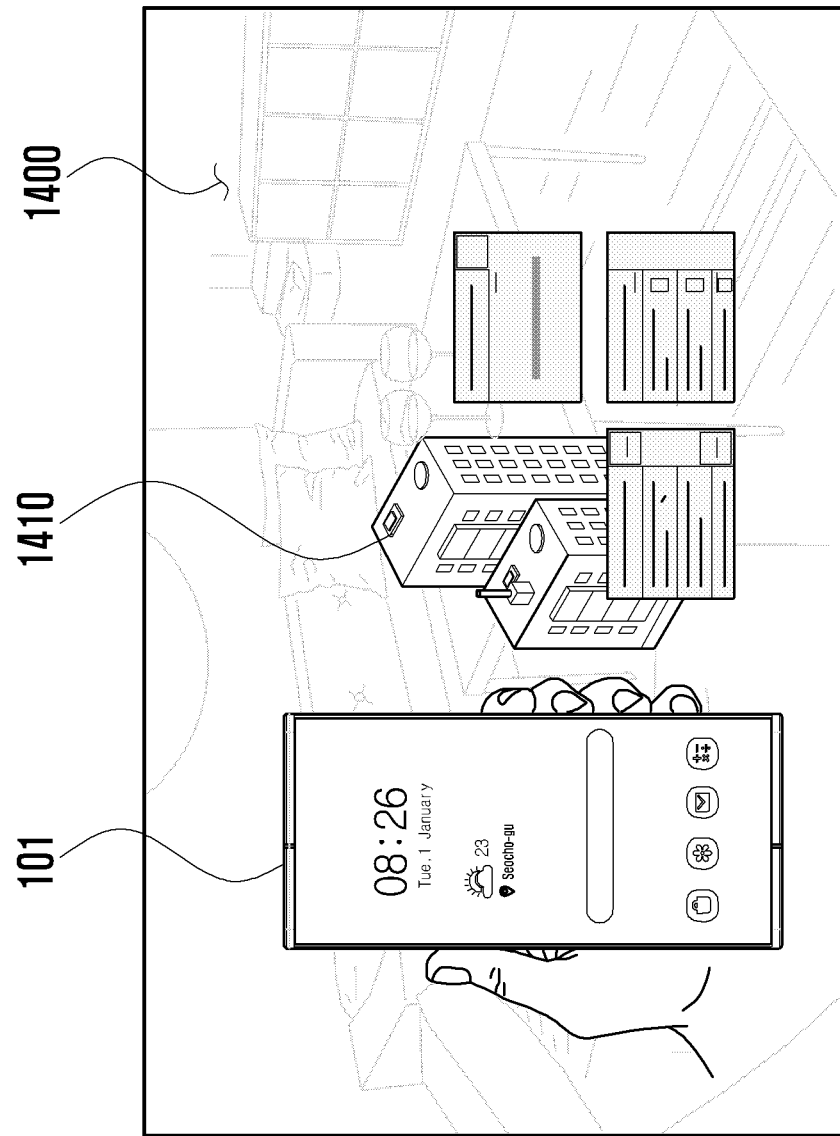

Referring to FIG. 14B, in the above situation, the user may move the electronic device 101 into the AR screen 1400 provided through the display module 520 of the wearable electronic device 301.

Figure 14C:
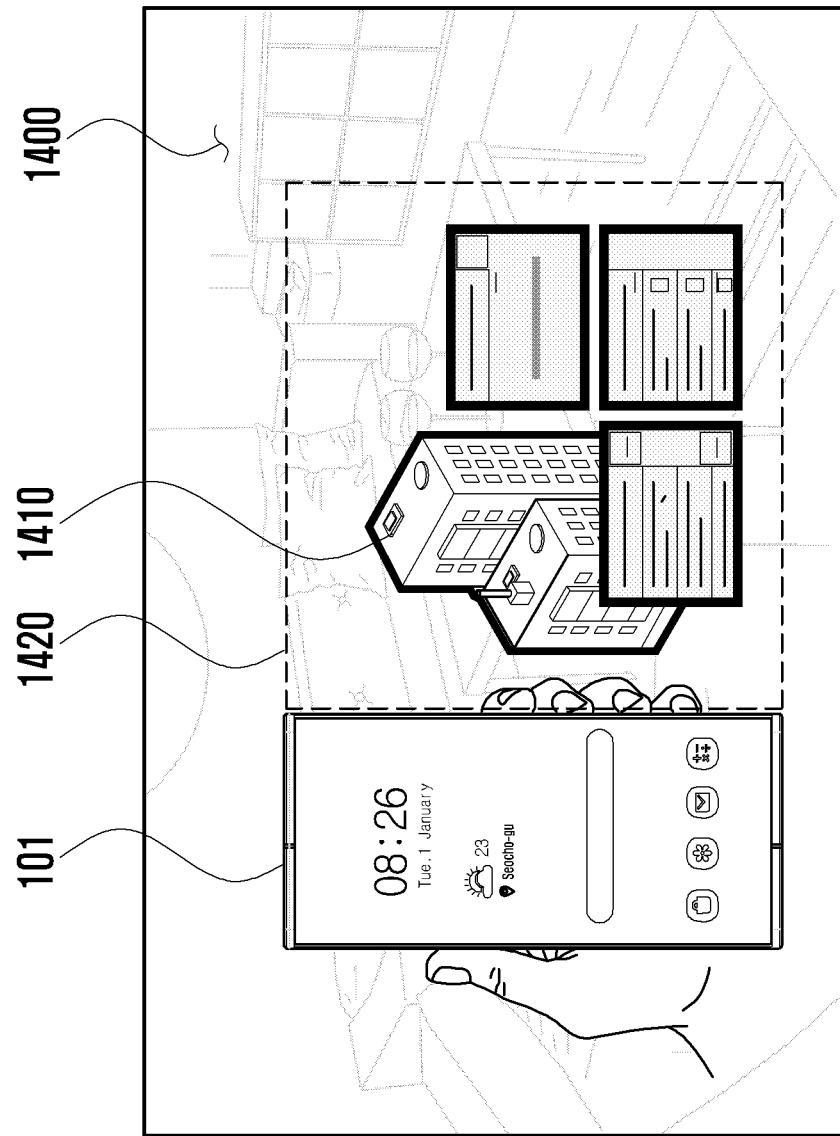

Referring to FIG. 14C, if the wearable electronic device 301 detects a user's specified interaction (e.g., a rollable activation interaction) for the electronic device 101 on the AR screen 1400, the wearable electronic device 301 may provide an affordance (or guide) 1420 for a virtual area (e.g., the area expected by rollable extension or the area calculated to conform to the size of the content 1410) in response to the specified interaction. The wearable electronic device 301 may provide a virtual window guide corresponding to a default area and/or a substantial extension area of the electronic device 101 as the affordance 1420.

The user may move the electronic device 101 such that the affordance 1420 overlaps the content 1410 on the AR screen 1400. According to an embodiment, the wearable electronic device 301 may track the electronic device 101 in the AR screen 1400 (e.g., track an object), and the affordance 1420 may also move in response to the movement of the electronic device 101. In response to the movement of the electronic device 101 by the user, the affordance 1420 and the content 1410 may overlap each other on the AR screen 1400. If the affordance 1420 and the content 1410 overlap, the wearable electronic device 301 may activate the overlapping content 1401 (e.g., move and display the content forward of the affordance 1420), thereby providing the overlapping content 1401 to be distinguished. For example, the wearable electronic device 301 may highlight and provide the overlapping content 1410 to be associated with the affordance 1420 so that the user may intuitively recognize the overlapping (or user-selected) content 1410.

The wearable electronic device 301 may vary (e.g., extend) the affordance 1420, based on the variable size (or movement distance) corresponding to an additional interaction by the user, and provide the same to the AR screen 1400. For example, the user may further extend the affordance 1420 such that all of the content 1410 on the AR screen 1400 is to be included in the affordance 1420, so that the content 1410 may overlap the affordance 1420 according to the additional extension of the affordance 1420.

The AR providing device may determine the size of the affordance 1420 capable of displaying the content 1410, based on the size of the content 1410, and the additional extension of the affordance 1420 may be automatically performed according to the determined size. For example, if the size of the extension area by the affordance 1420 is not suitable for displaying content (e.g., excessively larger or smaller than the displayable size of the content,) in displaying the content, the size of the extension area capable of displaying the overlapping content 1410 may be calculated, and the affordance 1420 may be varied (e.g., extended) to conform to the size of the calculated extension area and then provided. Accordingly, the extension area V of the electronic device 101 may vary according to the size (or ratio) of the variable affordance 1420.

Figure 14D:
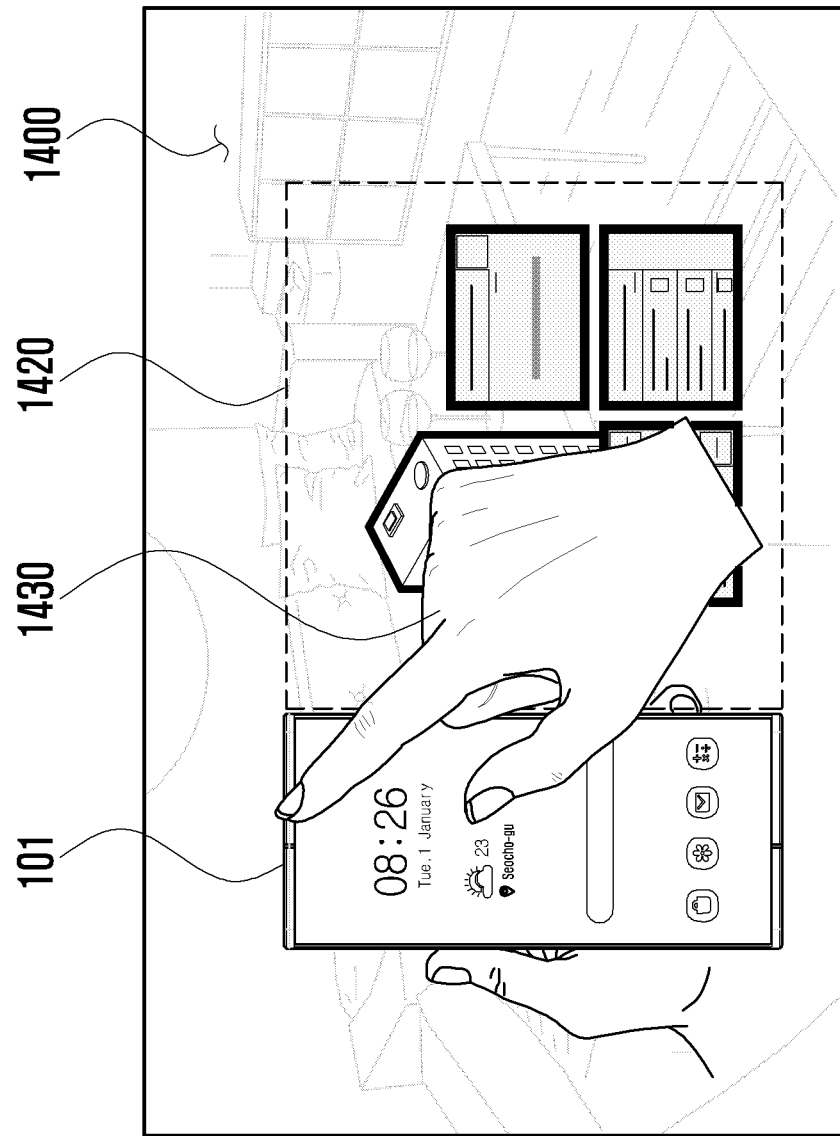

Referring to FIG. 14D, the wearable electronic device 301 may detect an interaction 1430 of triggering an operation (e.g., an operation trigger) for displaying the content 1410 selected by the user through a specified target device. For example, the user may select and determine the content 1401 from the AR screen 1400 and input a specified interaction 1430 (e.g., a rollable extension gesture, another specified touch gesture, or a voice-based command) for displaying the selected content 1410 through the target device.

The wearable electronic device 301 may determine a target device for displaying the content 1410, based on the detection of the interaction 1430. The AR providing device may determine a display mode (e.g., a first display mode or a second display mode) corresponding to a target device for displaying the content 1410 selected by the user. For example, the wearable electronic device 301 may determine a display mode and a target device corresponding thereto, based on a processing entity of the content 1410 and/or a specified profile of the content 1410.

The wearable electronic device 301 may provide content to correspond to the first display mode or the second display mode through the target device. For example, the wearable electronic device 301 may display the content 1410 in a first display mode in which content is provided through a real display area based on the display module 160 of the electronic device 101. The content 1410 may include content implemented (or used) by the wearable electronic device 301 in the standalone method. For example, the content 1410 may indicate content that is unable to be processed by the electronic device 101. Therefore, when providing the content 1410 in the first display mode, the wearable electronic device 301 may operate to mirror and provide the content 1410 to the electronic device 101. As another example, the wearable electronic device 301 may display the content 1410 in a second display mode in which content is mapped and provided through a virtual display area configure based on the electronic device 101 in the AR screen 1400 of the wearable electronic device 301. Examples of this are shown in FIGS. 14E and 14F.

Figure 14E:
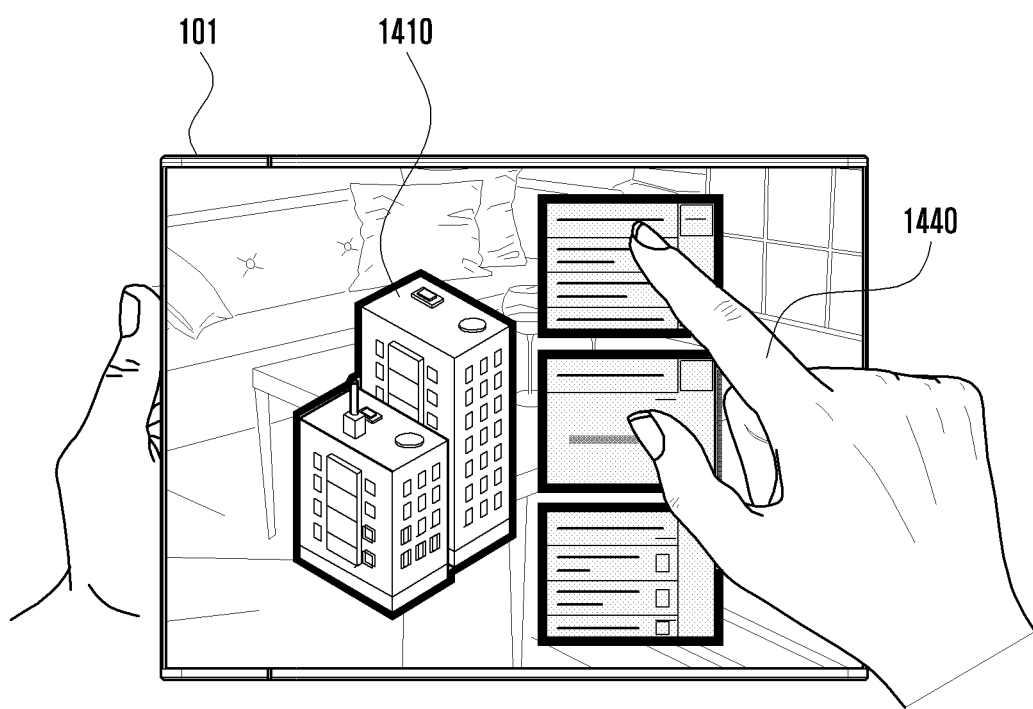

FIG. 14E shows an example of providing content of the wearable electronic device 301 through the electronic device 101 according to the first display mode. Referring to FIG. 14E, based on the determination of the first display mode, the wearable electronic device 301 may perform processing to display the content 1410 selected and determined by the user on the AR screen 1400, based on a substantial display area (e.g., a default area and an extension area that is extended by sliding-out) corresponding to the display module 160 of the electronic device 101.

If the wearable electronic device 301 processes content or an application corresponding to the content is being executed in relation to AR services, the wearable electronic device 301 may operate to mirror and transmit the content 1410 selected by the user from the AR screen 1400 to the electronic device 101 and continuously display the content through the display module 160 of the electronic device 101 in the real space. For example, the wearable electronic device 301 may perform processing of content or an application corresponding to the content being executed in relation to AR services, and the electronic device 101 may receive (e.g., mirroring) the content 1410 selected and determined by the user on the wearable AR screen 1400 from the wearable electronic device 301 through specified communication and display the mirrored content 1410 through the display module 160 of the electronic device 101.

The wearable electronic device 301 may transmit the content 1410 of the display module 520 that is being processed to the electronic device 101 so as to be displayed on the display module 160 of the electronic device 101. For example, a transmission entity and a processing entity of the content 1410 may be the wearable electronic device 301. According to an embodiment, the electronic device 101 may serve to display the content 1410 or related information transmitted from the wearable electronic device 301.

The electronic device 101 may extend the display module 160 to correspond to the size of the content 1410 being processed on the AR screen 1400 of the wearable electronic device 301 or the size of the affordance 1420 and display the content 1410 received from the wearable electronic device 301, based on the default area and the extension area. For example, the content 1410 may overlap the affordance 1420 having a further extended size on the AR screen 1400, and in the real space, the display module 160 of the electronic device 101 may be extended (slides out) to correspond to the size of the affordance 1420 so that the content 1410 may be provided through the default area and the extension area or through the extension area having a corresponding size, excluding the default area. The size of the extension area of the electronic device 101 may be determined based on a predetermined ratio specified by the user through the affordance 1420 on the AR screen 1400.

The electronic device 101 may operate to detect a user input (or interaction) 1440 for controlling a function related to the content 1410 displayed through the display module 160 and process a function corresponding to the user input 1440. The electronic device 101 may recognize a point (e.g., a touch point) at which the user input 1440 is detected in the content 1410 and transmit related information about the detected point (e.g., coordinates and/or spatial information) to the wearable electronic device 303 such that the wearable electronic device 301 processes a function related to the related information.

The wearable electronic device 301 may recognize the point (e.g., a touch point) at which the user input 1440 is detected in the electronic device 101, based on the related information received from the electronic device 101, perform processing to execute a related function based on the recognition result, and transmit content data resulting from the processing to the electronic device 101. The electronic device 101 may receive the processing result (e.g., content data) from the wearable electronic device 301, reflect the received processing result on the content 1410 on the display module 160, and display a result screen thereof through the display module 160.

An example of manipulating the content being executed through the wearable electronic device 301 in the standalone method using the electronic device 101 after the display module 160 of the electronic device 101 is extended (e.g., slides out) will be described with reference to the drawings to be described later.

FIG. 14F shows an example of providing content according to the second display mode.

Referring to FIG. 14F, based on the determination of the second display mode, the wearable electronic device 301 may perform processing to display the content 1410, based on a virtual area associated with the electronic device 101, on the AR screen 1400 provided through the display module 520 of the wearable electronic device 301. If the wearable electronic device 301 processes content or an application corresponding to the content is being executed in relation to AR services, or if the content to be provided corresponds to a specified profile, the wearable electronic device 301 may perform the following operations. The wearable electronic device 301 may operate to map (e.g., texture-map) the content 1410 selected and determined by the user on the AR screen 1400 to the default area of the electronic device 101 positioned in the real space displayed on the AR screen 1400 through the display module 520 of the wearable electronic device 301, the extension area of the electronic device 101, and/or the virtual area produced adjacent to the electronic device 101 and display the same thereon. The wearable electronic device 301 may display the content 1410 selected and determined by the user through the entirety or at least a portion of the default area of the electronic device 101, the extension area thereof, and/or the virtual area in the AR screen 1400 (e.g., a virtual space) according to the second display mode.

The wearable electronic device 301 may disposed and display the content 1410 in a virtual area having a size corresponding to the affordance 1420 associated with the electronic device 101 on the AR screen 1400. For example, the content 1410 may overlap a virtual area corresponding to the affordance 1420 in the AR screen 1400, and the AR providing device may produce an active window (e.g., a virtual area) having a corresponding size based on the affordance 1420 and map the content 1410 to the active window, thereby providing the same.

Sn element 1490 may show an example of a display state of the display module 160 of the electronic device 101 viewed in the real space, instead of the electronic device 101 on the AR screen 1400 provided through the display module 520 of the wearable electronic device 301. As illustrated, the electronic device 101 may display a screen being executed (or operated) in the electronic device 101 shown in FIG. 14A through a default area or the entire area or maintain the display in the default area and provide a blank screen or a specified screen to an extension area 1495 corresponding to extension of the display module 160 (e.g., an area extended by sliding-out). For example, the electronic device 101 may provide, as a specified screen, a screen resulting from execution of a specified function in response to extension of the display module 160 (e.g., a split screen based on execution of a specified application or the entire screen of a running application (e.g., display the screen displayed in the default area into a full screen)). According to an embodiment, the display module 160 of the electronic device 101 in the real space may be in the state of being turned off.

For example, in the second display mode, the screen (e.g., the display screen of the first content 1410) displayed based on the display module 160 of the electronic device 101 on the AR screen 1400 and the screen displayed through the display module 160 of the electronic device 101 in the real space may be different, and the display module 160 of the electronic device 101 may not display the content (e.g., the first content 1410) on the AR screen 1400 in the real space.

The wearable electronic device 301 may operate to track and detect a user input (or interaction) 1450 for controlling a function related to the content 1410 on the AR screen 1400 and process a function corresponding to the user input 1450. When displaying the content 1410 based on the second display mode, the wearable electronic device 301 in the standalone method may perform processing to track and detect the user input 1450, based on technologies such as gaze tracking and object detection, calculate a point (e.g., a touch point) where the user input 1450 is detected in the content 1410, and execute a related function.

The wearable electronic device 301 may detect a user input (or interaction) for the content 1410 on the AR screen 1400, and the processing of the user input may be performed in the wearable electronic device 301. The wearable electronic device 301 may receive information related to a user input from the electronic device 101 and cause the electronic device 101 to process a user input made by the electronic device 101.

FIGS. 15A to 15F are diagrams illustrating an example of operation scenarios of an electronic device or a wearable electronic device according to various embodiments of the disclosure.

Referring to FIGS. 15A to 15F, the illustrated operations may be performed by the electronic device 101 or the wearable electronic device 301 depending on the tethered method or the standalone method for providing an AR service. The electronic device 101 or the wearable electronic device 301 will be referred to as an AR providing device for convenience of description.

Figure 15A:
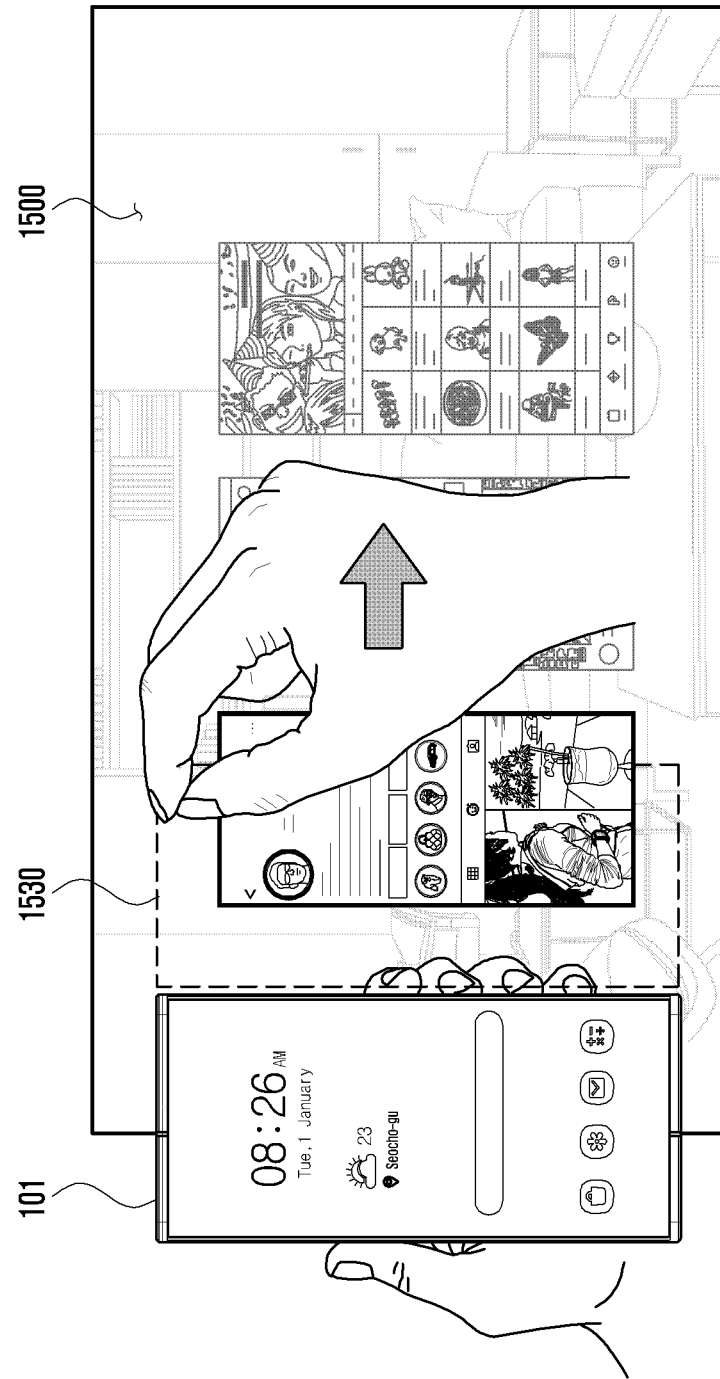

FIGS. 15A to 15F show examples in which the content (e.g., protected content or privacy content) according to a specified profile or user setting (e.g., protection configuration by the user), among the content displayed in an AR screen provided through the display module 520 of the wearable electronic device 301, is not displayed on the display module 160 of the electronic device 101 in the real space. Referring to FIG. 15A, the AR providing device (e.g., the electronic device 101 or the wearable electronic device 301) may provide content (e.g., first content 1510 and second content 1520) to an AR screen 1500 through the display module 520 of the wearable electronic device 301. The wearable electronic device 301 may be worn on the user, and the AR providing device may display at least one piece of content (or virtual information) superimposed on at least a portion of a real space on an AR screen 1500 through the display module 520 of the wearable electronic device 301. For example, the AR providing device may superimpose at least one piece of content (e.g., first content 1510 and second content 1520) in the real space corresponding to the field of view of the user, thereby providing the content to the user.

In the above situation, the user may move the electronic device 101 into the AR screen 1500 provided through the display module 520 of the wearable electronic device 301. If the AR providing device detects a specified interaction (e.g., a rollable activation interaction) for the electronic device 101 on the AR screen 1500, the AR providing device may provide an affordance (or guide) 1530 for a virtual area (e.g., the area expected by rollable extension) in response to the specified interaction. The AR providing device may provide a virtual window guide corresponding to a default area and/or a substantial extension area of the electronic device 101 as the affordance 1530.

The user may move the electronic device 101 such that the affordance 1530 at least partially overlaps the first content 1510 on the AR screen 1500. The AR providing device may track the electronic device 101 in the AR screen 1500 (e.g., track an object) and move the affordance 1530 together in response to the movement of the electronic device 101. In response to the movement of the electronic device 101 by the user, the affordance 1530 and the first content 1510 may overlap each other on the AR screen 1500. If the affordance 1530 and the first content 1510 overlap each other, the AR providing device may activate the overlapping first content 1510 (e.g., move and display the content forward of the affordance 1530), thereby providing the overlapping first content 1510 and the remaining non-overlapping content (e.g., the second content 1520) to be distinguished. For example, the AR providing device may highlight and provide the overlapping first content 1510 to be associated with the affordance 1530 so that the user may intuitively recognize the overlapping first content 1510.

In addition to the selection by overlapping of the first content 1510, the user may vary (e.g., extend) the affordance 1530 in order to select another piece of content (e.g., the second content 1520) by overlapping of the affordance 1530. The AR providing device may extend the affordance 1530 in response to a user input and provide the affordance 1530. An example of this is shown in FIG. 15B.

Figure 15B:
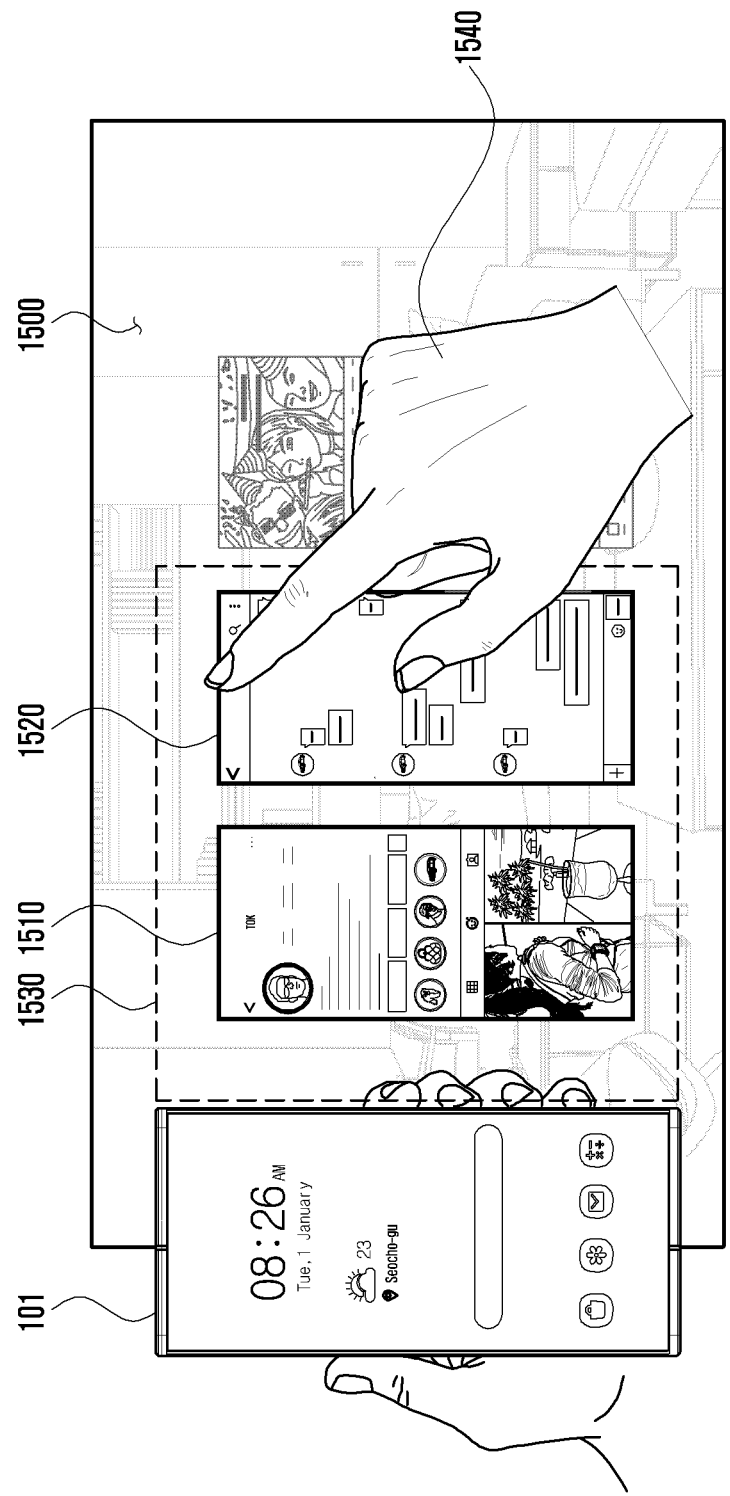

Referring to FIG. 15B, the AR providing device may vary (e.g., extend) the affordance 1530 and provide the affordance 1530 to the AR screen 1500. As shown in FIG. 15B, as the affordance 1530 is extended, the first content 1510 and the second content 1520 may overlap the affordance 1530. If the affordance 1530 and the second content 1520 overlap in addition to the first content 1510, the AR providing device may further activate the overlapping second content 1520 (e.g., move and display the content forward of the affordance 1530), thereby highlighting the first content 1510 and second content 1520 to be associated with the affordance 1530 and providing the first content 1510 and the second content 1520.

In the above situation, the user may configure at least one piece of content to be protected (or hidden). For example, as shown in FIG. 15B, the user may input a first interaction 1540 (e.g., a protection configuration interaction) in association with the second content 1520 to configure the second content 1520 to be protected. The first interaction 1540 on the content of the AR screen 1500 may include a specified touch gesture (e.g., a long-press gesture) for protection of specified content, an interaction of calling and selecting a menu for protection of specified content, or a voice-based command capable of instructing protection of specified content. The protected (or hidden) content may be released from the protection, based at least on an input corresponding to the interaction for protecting the content or another interaction specified to release the protection.

The AR providing device may detect a first interaction 1540 and, based on the detection of the first interaction 1520, provide a protection object 1550 representing (or informing) that the content (e.g., the second content 1520) was configured to be protected (or hidden) in association (or mapping) with the corresponding content. An example of this is shown in FIG. 15C.

FIG. 15B shows an example of configuring content (e.g., the second content 1520) to be protected (or hidden), based on the first interaction 1540 by the user. With regard to the protection (or hiding) configuration of the content, if a profile of the content belongs to a specified profile, the content may be automatically configured to be protected (or hidden) without user intervention (e.g., input of the first interaction 1540). The AR providing device may identify whether or not the content (e.g., the second content 1520) has a specified profile and, based on identifying that the content has a specified profile, automatically provide a protection object 1550 indicating (or informing) that the content (e.g., the second content 1520) was configured to be protected (or hidden) in association (or mapping) with the content. An example of this is shown in FIG. 15C.

Figure 15C:
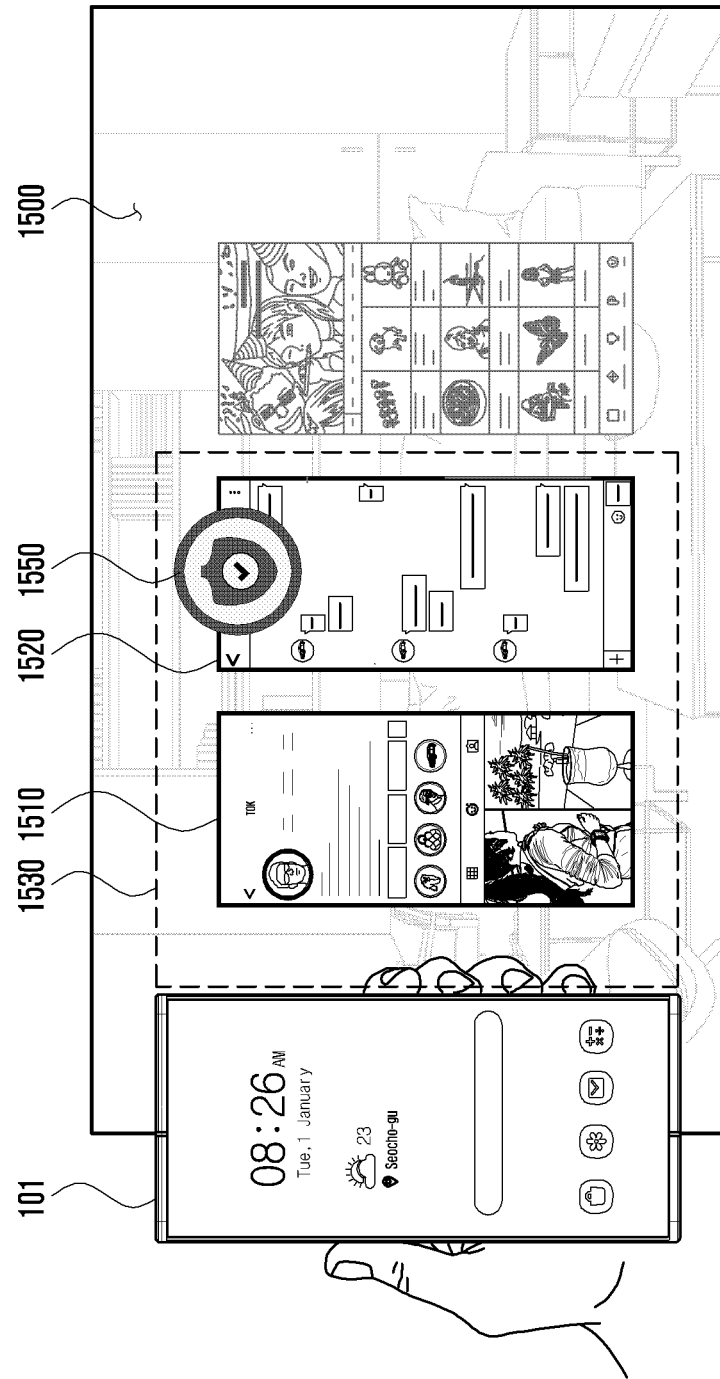

Referring to FIG. 15C, the AR providing device may display the protection object 1550 in association with the second content 1520, which is the corresponding content, based on the detection of the first interaction 1540 or the detection of a specified profile. For example, the AR providing device may provide the protection object 1550 to be associated with the second content 1520 so that the user may intuitively recognize the protection-specified content among a variety of content provided on the AR screen 1500. The protection object 1550 may be provided in various forms to intuitively indicate that the corresponding content is configured to be protected (or hidden) and is invisible in the real space. For example, the protection object 1550 may include static or dynamic text and/or images, and may be provided in various shapes. The protection object 1550 may be provided to at least partially overlap the corresponding content.

Figure 15D:
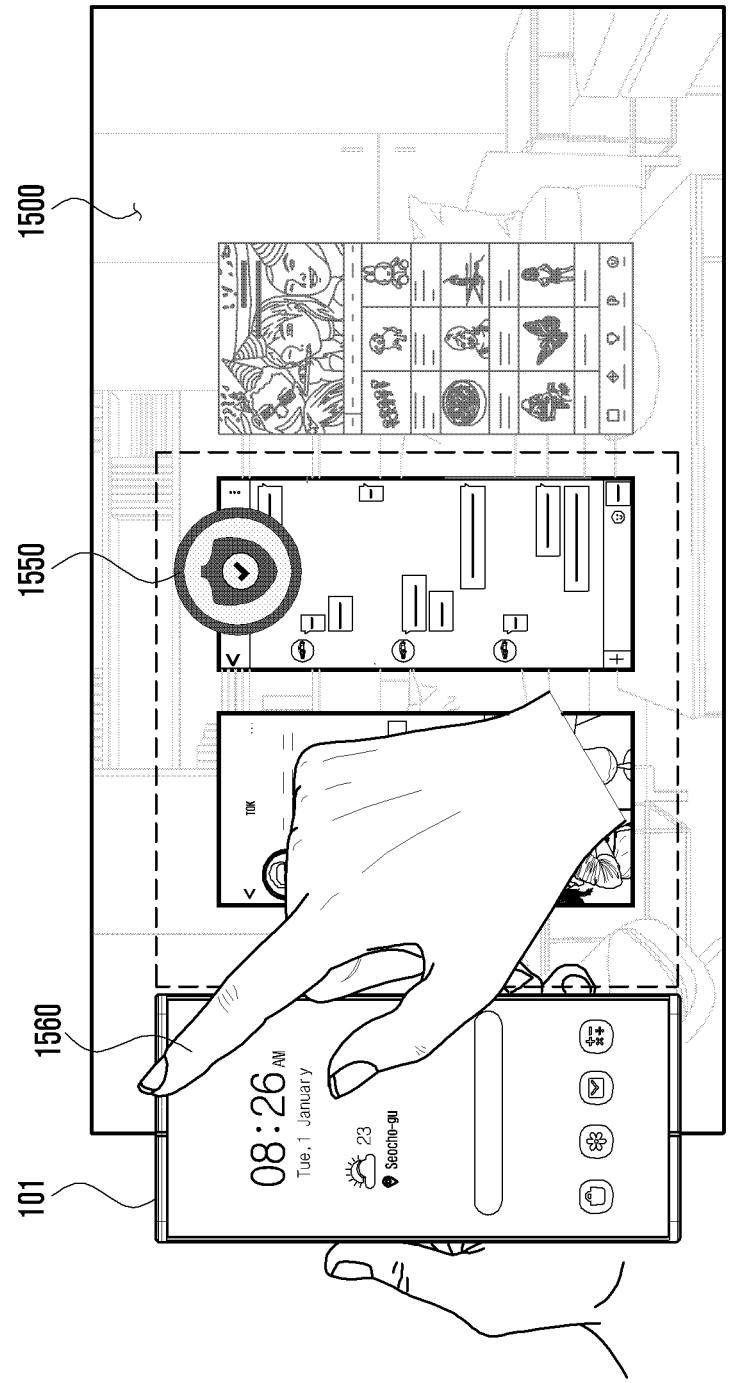

Referring to FIG. 15D, the AR providing device may detect a second interaction 1560 of triggering an operation (e.g., an operation trigger) of displaying at least one piece of content (e.g., the first content 1510 or the second content 1520) selected by the user through a specified target device. For example, the user may select and determine the first content 1510 and the second content 1520 on the AR screen 1500 and input a specified second interaction 1560 (e.g., a rollable extension gesture, another specified touch gesture, or a voice-based command) for displaying the selected first content 1510 and second content 1520 through the target device.

The AR providing device may determine a target device for displaying content, based on the detection of the second interaction 1560. The AR providing device may determine a display mode (e.g., a first display mode or a second display mode) corresponding to a target device for displaying the content selected by the user. For example, the AR providing device may determine a display mode and a target device corresponding thereto, based on a processing entity of the content.

The AR providing device may provide content to correspond to the first display mode or the second display mode through the target device. For example, the AR providing device may display content in a first display mode in which the content is provided through a real display area based on the display module 160 of the electronic device 101 in the real space. As another example, the AR providing device may display content in a second display mode in which the content is mapped and provided through a virtual display area configure based on the electronic device 101 in the AR screen 1500 of the wearable electronic device 301. Examples of this are shown in FIGS. 15E and 15F.

Figure 15E:
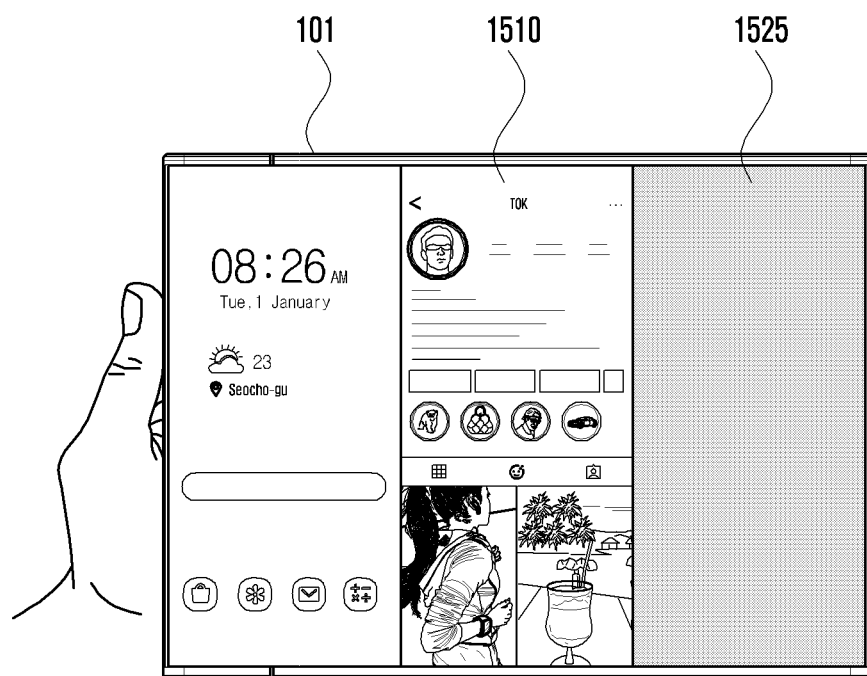

FIG. 15E shows an example of providing content according to the first display mode. Referring to FIG. 15E, based on the determination of the first display mode, the AR providing device may perform processing to display the first content 1510 not configured to be protected and to not display the second content 1520 configured to be protected (e.g., protected content or hidden content), among the content (e.g., the first content 1510 and the second content 1520) selected and determined by the user on the AR screen 1500, based on a substantial display area (e.g., a default area and an extension area that is extended by sliding-out) corresponding to the display module 160 of the electronic device 101.

According to the first display mode, the AR providing device may operate to continuously display the first content 1510 and the second content 1520 selected and determined by the user on the AR screen 1500 through the display module 160 of the electronic device 101 in the real space such that only the first content 1510 is displayed on the display module 160, instead of displaying the second content 1520 configured to be protected in the AR screen 1500.

Referring to FIG. 15E, the electronic device 101 may turn on and extend the display module 160, display the first content 1510 in the area (e.g., the first extension area) for first content 1510, instead of displaying the second content 1520 in the area (e.g., the second extension area) for the second content 1520, among specified areas (e.g., the default area and/or the extension area) of the display module 160, and provide the second extension area as an empty space 1525 or by inactivating (or turning off).

FIG. 15F shows an example of providing content according to the second display mode.

Referring to FIG. 15F, based on the determination of the second display mode, the AR providing device may display the content (e.g., the first content 1510 and the second content 1520), based on a virtual area associated with the electronic device 101, on the AR screen 1500 provided through the display module 520 of the wearable electronic device 301. For example, the AR providing device may display both the first content 1510 not configured to be protected and the second content 1520 configured to be protected (e.g., protected content or hidden content) according to the second display mode.

According to the second display mode, the AR providing device may operate to map (e.g., texture-map) the first content 1510 and the second content 1520 selected and determined by the user from the AR screen 1500 to the default area of the electronic device 101 positioned in the real space displayed on the AR screen 1500, the extension area of the electronic device 101, and/or the virtual area produced adjacent to the electronic device 101 and display the same thereon.

Referring to FIG. 15F, the electronic device 101 may turn on and extend the display module 160, display the first content 1510 in the area (e.g., the first extension area) for first content 1510, and display the second content 1520 in the area (e.g., the second extension area) for the second content 1520, among specified areas (e.g., the default area and/or the extension area) of the display module 160. For example, the AR providing device may map and display the first content 1510 and the second content 1520 selected and determined by the user through the entirety or at least a portion of the default area of the electronic device 101, the extension area thereof, and/or the virtual area within the AR screen 1500 (e.g., a virtual space) according to the second display mode.

The element 1590 may show an example of a display state of the display module 160 of the electronic device 101 viewed in the real space, instead of the electronic device 101 on the AR screen 1500 provided through the display module 520 of the wearable electronic device 301. As illustrated, the electronic device 101 may display a screen being executed (or operated) in the electronic device 101 shown in FIG. 15A through a default area or the entire area or maintain the display in the default area and provide a blank screen or a specified screen to an extension area 1595 corresponding to extension of the display module 160 (e.g., an area extended by sliding-out). For example, the electronic device 101 may provide, as a specified screen, a screen resulting from execution of a specified function in response to extension of the display module 160 (e.g., a split screen based on execution of a specified application or the entire screen of a running application (e.g., display the screen displayed in the default area into a full screen)). The display module 160 of the electronic device 101 in the real space may be in the state of being turned off.

For example, in the second display mode, the screen (e.g., the display screen of the first content 1410) displayed based on the display module 160 of the electronic device 101 on the AR screen 1500 and the screen displayed through the display module 160 of the electronic device 101 in the real space may be different, and the display module 160 of the electronic device 101 may not display the content (e.g., the first content 1410) on the AR screen 1500 in the real space.

The AR providing device may provide the display based on the electronic device 101 and the display based on the wearable electronic device 301 to be different depending on whether or not the content (e.g., the first content 1510 and the second content 1520) selected and determined on the AR screen 1500 is configured to be protected. For example, as shown in FIG. 15E, the content (e.g., the second content 1520) configured to be protected may not be displayed through the display module 160 of the electronic device 101 in the real space. For example, as shown in FIG. 15F, the content (e.g., the second content 1520) configured to be protected may be mapped and displayed onto the display module 160 of the electronic device 101 only in the user's virtual space of the AR screen 1500 so that only the user wearing the wearable electronic device 301 is able to see the same.

Figure 16:
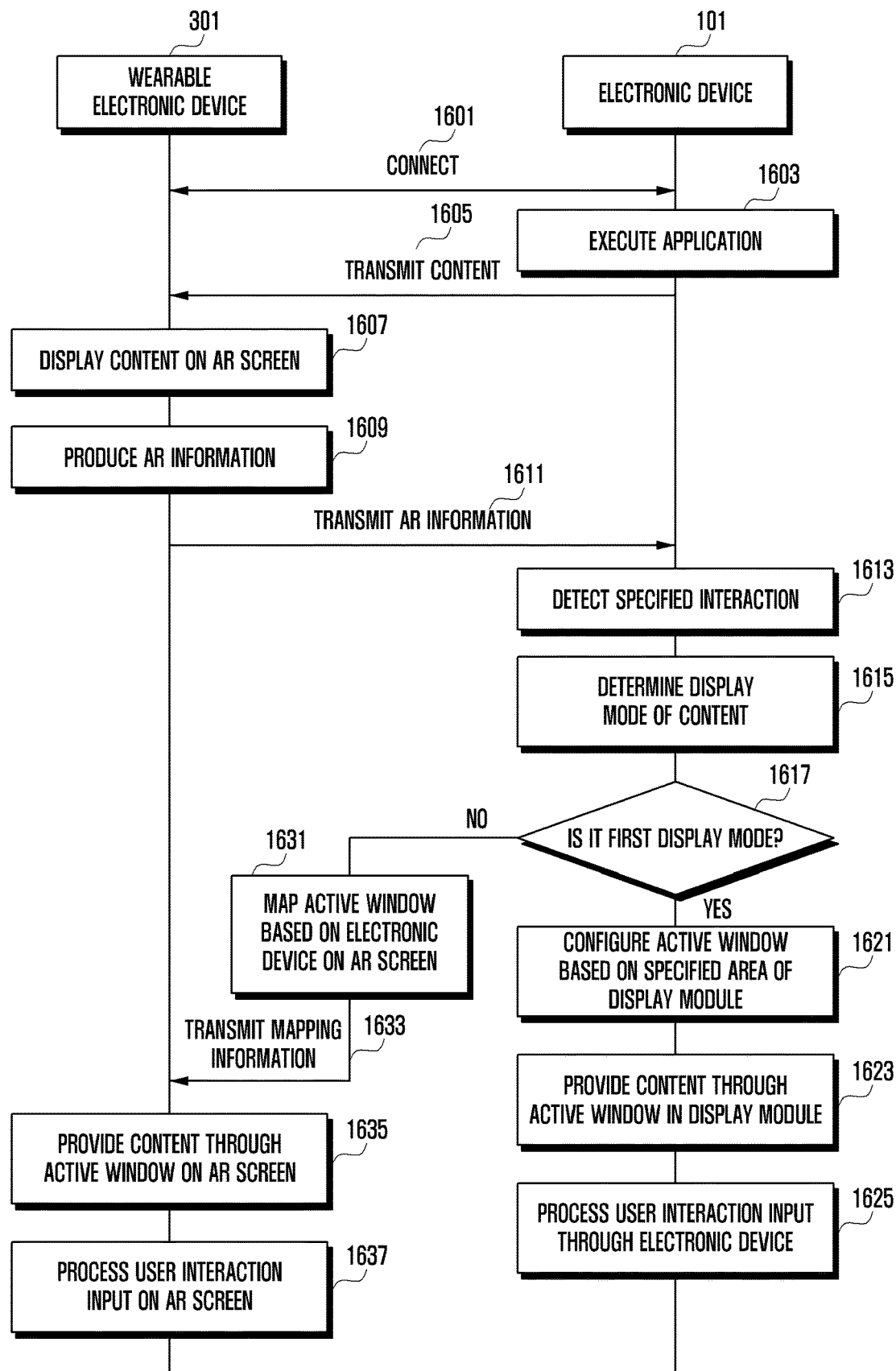
FIG. 16 is a diagram illustrating an operation method between an electronic device and a wearable electronic device according to an embodiment of the disclosure.

FIG. 16 is a diagram illustrating an operation method between an electronic device and a wearable electronic device according to an embodiment of the disclosure.

Referring to FIG. 16, the illustrated operations show an example of providing content through the electronic device 101 or the wearable electronic device 301, based on a display mode (e.g., a first display mode or a second display mode), in an environment in which the electronic device 101 and the wearable electronic device 301 provide AR services based on the tethered method.

Operations performed by the electronic device 101 to be described below may be executed by the processor 120 of the electronic device 101 including various processing circuits and/or executable program elements of the electronic device 101. Operations performed by the wearable electronic device 301 to be described below may be executed by the processor 590 of the wearable electronic device 301 including various processing circuits and/or executable program elements of the wearable electronic device 301.

Referring to FIG. 16, in operation 1601, the electronic device 101 and the wearable electronic device 301 may be connected through a specified communication method. For example, the electronic device 101 and the wearable electronic device 301 may be connected (e.g., paired) by wired or wireless communication. For example, the electronic device 101 and the wearable electronic device 301 may be connected to each other through short-range wireless communication such as Bluetooth, Bluetooth Low Energy, Wi-Fi, Wi-Fi Direct, or ultra-wide band (UWB), or wired communication such as USB. The electronic device 101 may include a smartphone, a tablet personal computer (PC), and/or a notebook computer. The wearable electronic device 301 may include AR glasses, smart glasses, or a head mounted display (HMD).

In operation 1603, the electronic device 101 (or the processor 120 of the electronic device 101) may execute a related application for an AR service. For example, the electronic device 101 may execute an application, based on a user input for manipulating execution of the application in the electronic device 101 or reception of a request for instructing execution of the application from the wearable electronic device 301.

In operation 1605, the electronic device 101 may transmit content to the wearable electronic device 301, based on the execution of the application. For example, the electronic device 101 may process content for an AR service. The electronic device 101 may transmit related content data to the wearable electronic device 301 through specified communication to display the content on the wearable electronic device 301.

In operation 1607, the wearable electronic device 301 (or the processor 590 of the wearable electronic device 301) may display the content on an AR screen. For example, the wearable electronic device 301 may be in the state of being worn on the user's body (e.g., a face), and the content received from the electronic device 101 may be superimposed on the real world and displayed through the display module 520 as a single image (e.g., an AR screen). The wearable electronic device 301 may receive content (e.g., image data or AR images) from the electronic device 101 and display the received content together with various objects in the real world through the display module 520.

In operation 1609, the wearable electronic device 301 may produce AR information. For example, the AR information may include information about a target object recognized by the wearable electronic device 301 on the AR screen, interaction information related to the user's action according to the user's gesture input and/or eye tracking on the AR screen, object information about an object recognized on the AR screen, position information (e.g., coordinates and/or spatial information) about an object recognized on the AR screen, and/or position information about content displayed on the AR screen.

The interaction may include a first interaction of recognizing the electronic device 101 entering the real space of the AR screen provided through the display module 520 of the wearable electronic device 301, a second interaction of recognizing a specified gesture (e.g., a slide-out gesture or a rollable extension gesture) input by the user using the electronic device 101 after the entry of the electronic device 101, or a third interaction of recognizing a specified menu manipulation gesture (e.g., a touch input) input by the user through the electronic device 101 onto the AR screen after the entry of the electronic device 101.

The second interaction may include a gesture of substantially extending an extension area of the electronic device 101. In another embodiment, the second interaction may not be a substantial extension of the extension area of the electronic device 101. For example, the user may input only an extending gesture without substantially extending the electronic device 101, and the wearable electronic device 301 may recognize the user's gesture to identify the second interaction. In an embodiment, the wearable electronic device 301 may detect a user's gesture according to the second interaction and/or the third interaction, based on the user hand detecting and/or hand tracking on the AR screen.

In operation 1611, the wearable electronic device 301 may transmit AR information to the electronic device 101. For example, the wearable electronic device 301 may transmit AR information to the electronic device 101 through specified communication. The AR information may be transmitted in real time, periodically, or based at least on the time of obtaining new information according to various state changes on the AR screen.

In operation 1613, the electronic device 101 may detect a specified interaction. For example, the electronic device 101 may receive AR information from the wearable electronic device 301 and analyze the received AR information to detect a specified interaction. The specified interaction may indicate an operation trigger for determining a display mode for displaying the content. The electronic device 101 may identify a specified interaction (or trigger) in which the electronic device 101 is positioned on the user's gaze, based on AR information, while the content is displayed on the AR screen through the wearable electronic device 301.

The electronic device 101, based on the AR information, may identify a first interaction in which the electronic device 101 enters the real space of the AR screen provided through the display module 520 of the wearable electronic device 301, a second interaction related to a specified gesture (e.g., a slide-out gesture or a rollable extension gesture) input by the user using the electronic device 101 after the entry of the electronic device 101, or a third interaction related to a specified menu manipulation gesture (e.g., a touch input) input by the user through the electronic device 101 onto the AR screen after the entry of the electronic device 101.

In operation 1615, the electronic device 101 may determine a display mode of the content, based on the detection of a specified interaction. For example, the electronic device 101 may detect (or recognize) a specified interaction and, in response to the detection of the specified interaction, determine a display mode to display content to correspond to at least one specified condition. The electronic device 101 may determine a display mode for displaying content, based at least on a processing entity for processing content being executed in relation to an AR service and/or a specified profile.

If the electronic device 101 detects a specified interaction, the electronic device 101 may determine a display mode (e.g., a first display mode or a second display mode) for displaying information on content depending on a processing entity for processing content being executed in relation to an AR service. According to various embodiments of the disclosure, the display mode may include a first display mode (e.g., including a mirroring-based display mode) of displaying content on the AR screen through the display module 160 of the electronic device 101 or a second display mode of mapping the content on the AR screen to the electronic device 101 on the AR screen in a virtual space (e.g., an AR screen) through the display module 520 of the wearable electronic device 301 and displaying the same therein, depending on the processing entity of content.

For example, in the case of the tethered method, the processing entity of content or an application of the content may be the electronic device 101, and the first display mode may be determined as the display mode of the content. Even in the tethered method, if the wearable electronic device 301 is able to perform processing (e.g., switching of a processing entity) according to the properties of content, or if a target device to display content is explicitly designated as the wearable electronic device 301 according to the user's intention (e.g., the AR environment continues to be used), the second display mode may be determined as the display mode of the content.

In the case of the standalone method, the processing entity of content or an application of the content may be the wearable electronic device 301, and the second display mode may be determined as the display mode of the content. For example, even in the standalone method, if the electronic device 101 is able to perform processing (e.g., switching of a processing entity) according to the properties of content, or if a target device to display content is explicitly designated as the electronic device 101 according to the user's intention (e.g., mirroring or substantial extension of the display module 160 of the electronic device 101 in the real space), the first display mode may be determined as the display mode for displaying the content.

The display mode determined according to the processing entity may vary depending on whether a profile of the content corresponds to a profile specified in advance. For example, if the content corresponds to a specified profile, a display mode (e.g. the second display mode) using a virtual space for the corresponding content (e.g., content of the specified profile) may be determined, regardless of whether the processing entity is the electronic device 101 or the wearable electronic device 301.

In operation 1617, based on the determination result, the electronic device 101 may determine whether the display mode is the first display mode or the second display mode. Based on the determined display mode (e.g., the first display mode or the second display mode), the electronic device 101 may operate to display the content through the display module 160 of the electronic device 101 (e.g., the first display mode) or display the content on an AR screen through the display module 520 of the wearable electronic device 301 (e.g., the second display mode).

If the display mode is determined to be the first display mode in operation 1617, the electronic device 101 may configure an active window, based on a specified area of the display module 160 of the electronic device 101, in operation 1621. For example, the electronic device 101 may determine an area corresponding to the position and/or size determined for the content on the AR screen, among a substantial display area (e.g., a default area and/or an extension area extended according to sliding-out) in the display module 160, as a specified area for displaying the content. The electronic device 101 may identify a specified area in the display module 160 (e.g., identify the default area and/or the extension area) and configure the specified area as an active window for content.

If the display mode is determined to be the first display mode, the electronic device 101 may operate to provide information indicating operation in the first display mode to the wearable electronic device 301 and display the same through the wearable electronic device 301. For example, based on the determination of the first display mode, the electronic device 101 may operate to display, through the wearable electronic device 301, a guide stating that the content is to be displayed through the electronic device 101 due to switching to the first display mode so that the wearable electronic device 301 is to be taken off, thereby providing the same to the user.

Based on the determination of the first display mode, the electronic device 101 may transmit a related command instructing to stop displaying the screen of the wearable electronic device 301 (e.g., turn off the display module 520 or the wearable electronic device 301) to the wearable electronic device 301 together with the guide or subsequently thereto. For example, the wearable electronic device 301 may operate to receive a guide and a control command from the electronic device 101, display the guide for a predetermined period of time, and then stop displaying the screen according to the control command. As another example, the wearable electronic device 301 may operate to automatically stop displaying the screen if it is taken off by the user.

In operation 1623, the electronic device 101 may provide (e.g., display) the content through the active window in the display module 160.

In operation 1625, the electronic device 101 may process a user interaction (e.g., a user's touch input based on the displayed content) input through the electronic device 101.

The electronic device 101 may operate to detect a user interaction for controlling a function related to the content displayed through the display module 160 and process a function corresponding to the user interaction. The electronic device 101 may recognize a point (e.g., a touch point) where a user interaction is detected in the content, process the user interaction to execute a related function, based on the recognized result (e.g., touch input coordinates), and display content according to the processing result through the display module 160.

If the display mode is determined to be the second display mode in operation 1617, the electronic device 101 may map the active window, based on the electronic device 101 of the AR screen, in operation 1631. For example, the electronic device 101 may identify the state of the electronic device 101 on the AR screen (e.g., position, whether it is extended, and/or whether it is virtually extended), based on the AR information, and determine information (e.g., a position and/or size) of a virtual area for displaying the content on the AR screen, based on the identification result. According to an embodiment, the electronic device 101 may map the active window, based on the determined information on the virtual area.

In operation 1633, the electronic device 101 may transmit mapping information to the wearable electronic device 301. For example, the electronic device 101 may produce mapping information related to mapping of an active window and transmit the mapping information to the wearable electronic device 301 through specified communication.

In operation 1635, the wearable electronic device 301 may provide content through the active window on the AR screen. For example, the wearable electronic device 301 may receive mapping information from the electronic device 101 and, based on the mapping information, map the active window, based on the electronic device on the AR screen. The wearable electronic device 301 may operate to map and display the content, based on the active window of the AR screen.

In operation 1637, the wearable electronic device 301 may process a user interaction input onto the AR screen (e.g., a user's gesture input based on the content displayed on the AR screen). The wearable electronic device 301 may track and detect a user interaction for controlling a function related to the content on the AR screen. The wearable electronic device 301 may track and detect the user input, based on technologies such as gaze tracking and object recognition, calculate a point (e.g., a touch point) where the user interaction is detected in the content on the AR screen, and transmit related information (or interaction input information) (e.g., coordinates and/or spatial information) to the electronic device 101.

The electronic device 101 may recognize a point (e.g., a touch point) where a user interaction is detected in the content of the AR screen, based on the related information received from the wearable electronic device 301, perform processing to execute a related function, based on the recognized result, and transmit content data according to the processing result to the wearable electronic device 301. The wearable electronic device 301 may receive the content data from the electronic device 101 and reflect the received content data to content on the AR screen, thereby displaying a result screen thereof (e.g., a screen in which the content data is mapped to the electronic device 101 on the AR screen).

The wearable electronic device 301 may perform a user interaction for the content on the AR screen by the electronic device 101 even in the second display mode. For example, the user may perform user interaction through the electronic device 101 in the real space even in the second display mode, and the electronic device 101 may process a function corresponding to the user interaction and may transmit related content data to the wearable electronic device 301 through specified communication connecting the wearable electronic device 301 and the electronic device 101. The wearable electronic device 301 may operate to receive and display the content data processed according to the user interaction from the electronic device 101, thereby providing a processing result of the user interaction in the electronic device 101.

Figure 17:
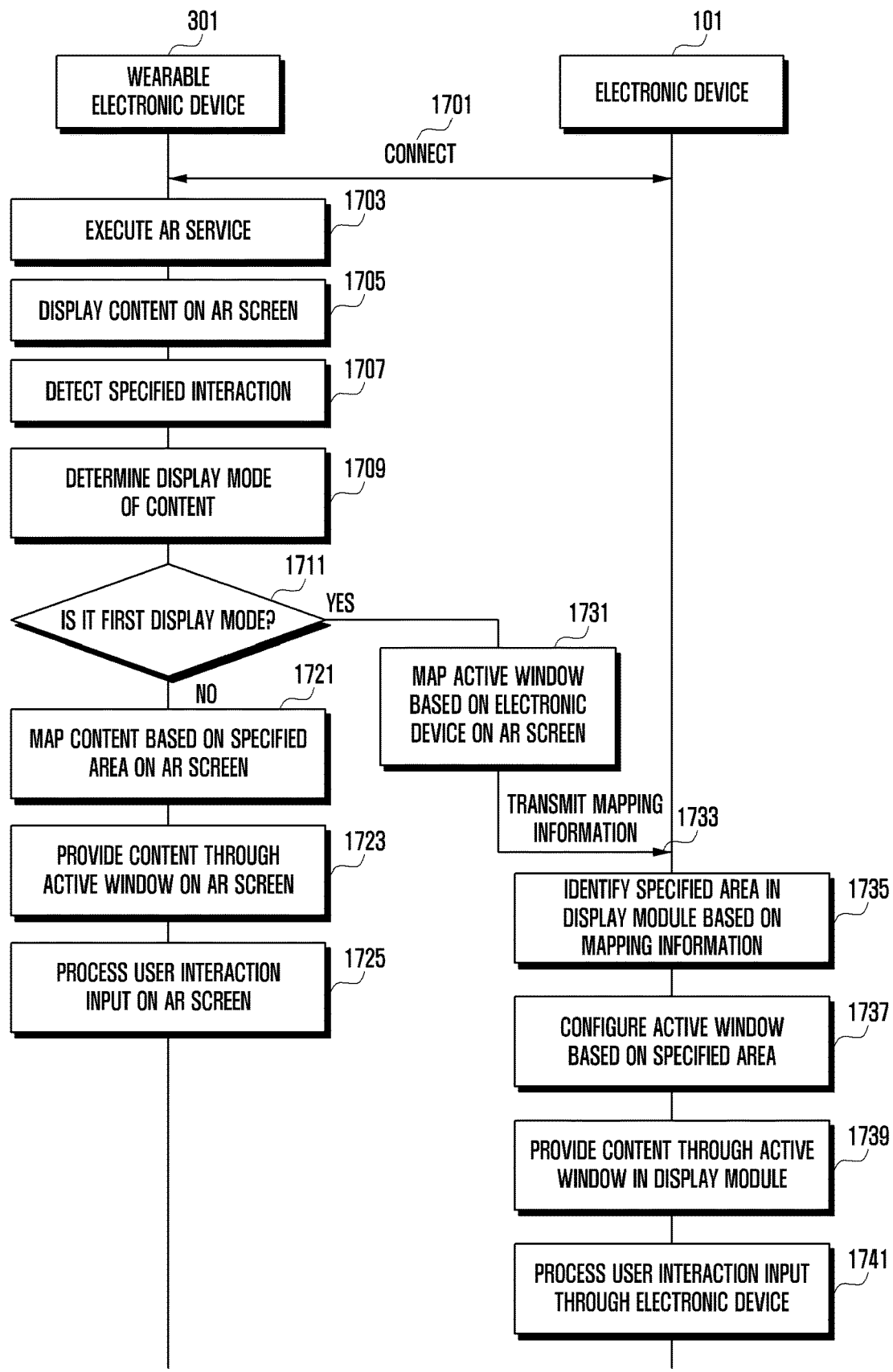
FIG. 17 is a diagram illustrating an operation method between an electronic device and a wearable electronic device according to an embodiment of the disclosure.

FIG. 17 is a diagram illustrating an operation method between an electronic device and a wearable electronic device according to an embodiment of the disclosure.

Referring to FIG. 17, the illustrated operations show an example of providing content through the electronic device 101 or the wearable electronic device 301, based on a display mode (e.g., a first display mode or a second display mode), in an environment in which the wearable electronic device 301 provide AR services based on the standalone method.

Operations performed by the wearable electronic device 301 to be described below may be executed by the processor 590 of the wearable electronic device 301 including various processing circuits and/or executable program elements of the wearable electronic device 301. Operations performed by the electronic device 101 to be described below may be executed by the processor 120 of the electronic device 101 including various processing circuits and/or executable program elements of the electronic device 101.

Referring to FIG. 17, in operation 1701, the electronic device 101 and the wearable electronic device 301 may be connected through a specified communication method. For example, the electronic device 101 and the wearable electronic device 301 may be connected (e.g., paired) by wired or wireless communication. The electronic device 101 and the wearable electronic device 301 may be connected to each other through short-range wireless communication such as Bluetooth, Bluetooth Low Energy, Wi-Fi, Wi-Fi Direct, or ultra-wide band (UWB), or wired communication such as USB. The electronic device 101 may include a smartphone, a tablet PC, and/or a notebook computer. The wearable electronic device 301 may include AR glasses, smart glasses, or a head mounted display (HMD).

In operation 1703, the wearable electronic device 301 (or the processor 590 of the wearable electronic device 301) may execute an AR service. For example, the wearable electronic device 301 may execute an application related to an AR service, based on a user input for manipulating execution of the application in the wearable electronic device 301 or reception of a request for instructing execution of an AR service from the electronic device 101.

In operation 1705, the wearable electronic device 301 may display content on the AR screen, based on the execution of the AR service. For example, the wearable electronic device 301 may process content for an AR service. According to an embodiment, the wearable electronic device 301 may be in the state of being worn on the user's body (e.g., a face) and display content (e.g., image data or AR images) through the display module 520 together with various objects in the real world.

In operation 1707, the wearable electronic device 301 may detect a specified interaction. The specified interaction may indicate an operation trigger for determining a display mode for displaying content. The wearable electronic device 301 may identify a specified interaction (or trigger) in which the electronic device 101 is positioned on the user's gaze while the content is displayed on the AR screen. For example, the wearable electronic device 301 may identify a first interaction in which the electronic device 101 enters the real space of the AR screen provided through the display module 520 of the wearable electronic device 301, a second interaction related to a specified gesture (e.g., a slide-out gesture or a rollable extension gesture) input by the user using the electronic device 101 after the entry of the electronic device 101, or a third interaction related to a specified menu manipulation gesture (e.g., a touch input) input by the user through the electronic device 101 onto the AR screen after the entry of the electronic device 101.

In operation 1709, the wearable electronic device 301 may determine a display mode of content, based on the detection of the specified interaction. For example, the wearable electronic device 301 may detect (or recognize) a specified interaction and, in response to the detection of the specified interaction, determine a display mode for displaying content corresponding to at least one specified condition. The wearable electronic device 301 may determine a display mode for displaying content, based at least on a processing entity for processing content being executed in relation to an AR service and/or a specified profile.

If the wearable electronic device 301 detects a specified interaction, the wearable electronic device may determine a display mode (e.g., a first display mode or a second display mode) for displaying information on content depending on a processing entity for processing content being executed in relation to an AR service. According to various embodiments of the disclosure, the display mode may include a first display mode (e.g., including a mirroring-based display mode) of displaying content on the AR screen through the display module 160 of the electronic device 101 or a second display mode of mapping the content on the AR screen to the electronic device 101 on the AR screen in a virtual space (e.g., an AR screen) through the display module 520 of the wearable electronic device 301 and displaying the content therein, depending on the processing entity of content For example, in the case of the tethered method, the processing entity of content or an application of the content may be the electronic device 101, and the first display mode may be determined as the display mode of the content. As another example, even in the tethered method, if the wearable electronic device 301 is able to perform processing (e.g., switching of a processing entity) according to the properties of content, or if a target device to display content is explicitly designated as the wearable electronic device 301 according to the user's intention (e.g., the AR environment continues to be used), the second display mode may be determined as the display mode of the content.

In the case of the standalone method, the processing entity of content or an application of the content may be the wearable electronic device 301, and the second display mode may be determined as the display mode of the content. As another example, even in the standalone method, if the electronic device 101 is able to perform processing (e.g., switching of a processing entity) according to the properties of content, or if a target device to display content is explicitly designated as the electronic device 101 according to the user's intention (e.g., mirroring or substantial extension of the display module 160 of the electronic device 101 in the real space), the first display mode may be determined as the display mode for displaying the content.

The display mode determined according to the processing entity may vary depending on whether or not a profile of the content corresponds to a profile specified in advance. For example, if the content corresponds to a specified profile, a display mode (e.g. the second display mode) using a virtual space for the corresponding content (e.g., content of the specified profile) may be determined, regardless of whether the processing entity is the electronic device 101 or the wearable electronic device 301.

In operation 1711, based on the determination result, the wearable electronic device 301 may determine whether the display mode is the first display mode or the second display mode. Based on the determined display mode (e.g., the first display mode or the second display mode), the wearable electronic device 301 may operate to display the content through the display module 160 of the electronic device 101 (e.g., the first display mode) or display the content on an AR screen through the display module 520 of the wearable electronic device 301 (e.g., the second display mode).

If the display mode is determined to be the second display mode in operation 1711, the wearable electronic device 301 may map the content, based on a specified area on the AR screen, in operation 1721. For example, the wearable electronic device 301 may determine an area corresponding to the position and/or size determined for the content on the AR screen, among a display area (e.g., a default area and/or an extension area extended according to sliding-out) associated with the electronic device 101 and/or a virtual display area on the AR screen, as a specified area for displaying the content. The wearable electronic device 301 may identify a specified area (e.g., identify the default area, the extension area, and/or the virtual area), configure an active window for the content, based on the specified area, and map the content to the active window.

In operation 1723, the wearable electronic device 301 may provide (e.g., display) the content through the active window on the AR screen.

In operation 1725, the wearable electronic device 301 may process a user interaction (e.g., a user gesture input based on the content displayed on the AR screen) input onto the AR screen. The wearable electronic device 301 may track and detect a user interaction for controlling a function related to the content on the AR screen. The wearable electronic device 301 may track and detect a user interaction, based on technologies such as gaze tracking and object recognition, recognize a point (e.g., a touch point) where a user interaction is detected in the content of the AR screen (e.g., recognize interaction input information), perform processing to execute a related function, based on the recognized result (e.g., touch input coordinates), and map the content according to the processing result to the AR screen (e.g., the active window), thereby displaying the content.

The wearable electronic device 301 may perform user interaction for the content on the AR screen by the electronic device 101 even in the second display mode. For example, the user may perform user interaction through the electronic device 101 in the real space even in the second display mode, and the electronic device 101 may calculate a point (e.g., a touch point) where the user interaction is detected and transmit related information (or interaction input information) (e.g., coordinates and/or spatial information) to the wearable electronic device 301 through specified communication connecting the wearable electronic device 301 and the electronic device 101. The wearable electronic device 301 may operate to receive related information from the electronic device 101, recognize a point (e.g., a touch point) where the user interaction is detected in the content on the AR screen, based on the received related information, execute a related function, based on the recognized result, reflect the processing result to the content, and display a result screen thereof (e.g., a screen in which the content is mapped to the electronic device 101 on the AR screen).

If the display mode is determined as the first display mode in operation 1711, the wearable electronic device 301 may map the content, based on the electronic device 101 of the AR screen in operation 1731. For example, the wearable electronic device 301 may identify the state of the electronic device 101 on the AR screen (e.g., position, whether it is extended, and/or whether it is virtually extended) or identify a specified user's intention (e.g., execute mirroring) and, based on the identification result, determine information (e.g., a position and/or size) about the display area for displaying the content in the electronic device 101 of the AR screen. The wearable electronic device 301 may map the content, based on the determined information on the display area.

If the display mode is determined as the first display mode, the wearable electronic device 301 may operate to provide information indicating the operation in the first display mode to the AR screen. For example, based on the determination of the first display mode, the wearable electronic device 301 may display, on the AR screen, a guide stating that the content is to be displayed through the electronic device 101 due to switching to the first display mode so that the wearable electronic device 301 is to be taken off, thereby providing the guide to the user.

Based on the determination of the first display mode, the wearable electronic device 301 may stop displaying the screen of the wearable electronic device 301 (e.g., turn off the display module 520) together with the guide or subsequently thereto. For example, the wearable electronic device 301 may operate to stop displaying the screen after displaying the guide for a predetermined period of time. As another example, the wearable electronic device 301 may operate to automatically stop displaying the screen if it is taken off by the user. While stopping the screen display, the wearable electronic device 301 may continue to perform, as an internal (or background) operation, communication related to the processing of the content with the electronic device 101 through specified communication connecting the wearable electronic device 301 and the electronic device 101. For example, the wearable electronic device 301 may an operation of receiving interaction input information from the electronic device 101 through specified communication, processing content corresponding thereto, and transmitting processing results to the electronic device 101.

In operation 1733, the wearable electronic device 301 may transmit mapping information to the electronic device 101. For example, the wearable electronic device 301 may produce mapping information related to content mapping and transmit the mapping information to the electronic device 101 through specified communication.

In operation 1735, the electronic device 101 may identify a specified area on the display module 160, based on the mapping information. For example, the electronic device 101 may receive mapping information from the wearable electronic device 301 and analyze the mapping information to identify a specified area for displaying content in the display module 160 of the electronic device 101. The electronic device 101 may determine a display area (e.g., a default area and/or an extension area) for displaying content in the display module 160 of the electronic device 101, based on the mapping information.

In operation 1737, the electronic device 101 may configure an active window for content, based on the specified area in the display module 160.

In operation 1739, the electronic device 101 may provide (e.g., display) content through an active window in the display module 160.

In operation 1741, the electronic device 301 may process a user interaction input through the electronic device 101 (e.g., a user's touch input based on the displayed content). The electronic device 101 may operate to detect a user interaction for controlling a function related to the content displayed through the display module 160 and process a function corresponding to the user interaction.

The electronic device 101 may recognize a point (e.g., a touch point) where a user interaction is detected in the content and execute a related function, based on the recognized result. The electronic device 101 may display the content according to the processing result through the display module 160. The electronic device 101 may detect a user interaction (e.g., a touch input) through the display module 160 and calculate a point (e.g., a touch point) where the user interaction is detected in the content provided through the display module 160. The electronic device 101 may transmit related information (or interaction input information) (e.g., coordinates and/or spatial information) about the point where the user interaction is detected to the wearable electronic device 301.

The wearable electronic device 301 may recognize the point (e.g., a touch point) where the user interaction is detected in the content of the AR screen, based on the related information received from the electronic device 101, and perform processing to execute a related function, based on the recognized result. The wearable electronic device 301 may transmit content data according to the processing result to the electronic device 101.

The electronic device 101 may receive the content data from the wearable electronic device 301. The electronic device 101 may reflect the received content data to the content on the display module 160, thereby displaying a result screen thereof (e.g., a screen on which content data is reflected).

Figure 18A:
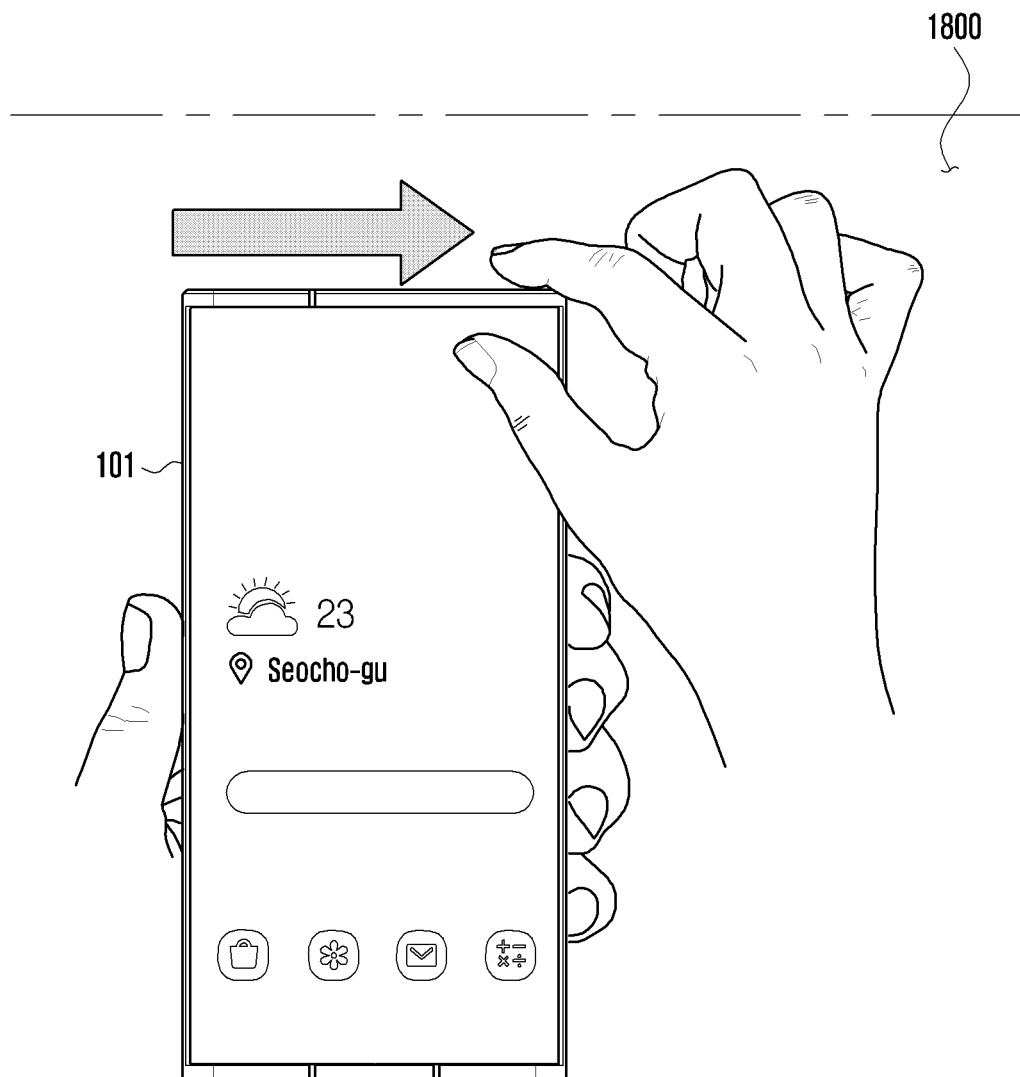
FIGS. 18A, 18B, and 18C are diagrams illustrating an example of operating a display mode between an electronic device and a wearable electronic device according to various embodiments of the disclosure.
Figure 18B:
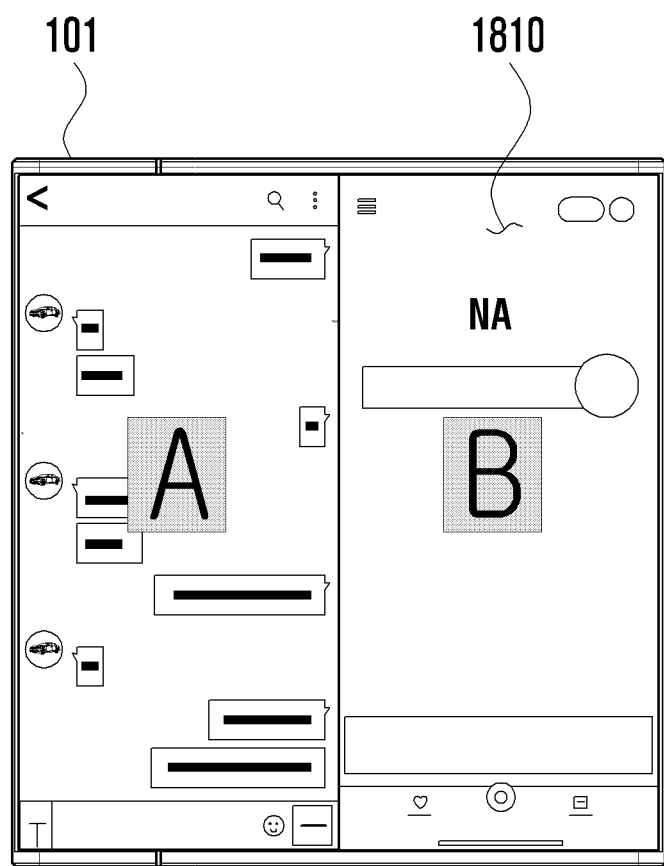
Figure 18C:
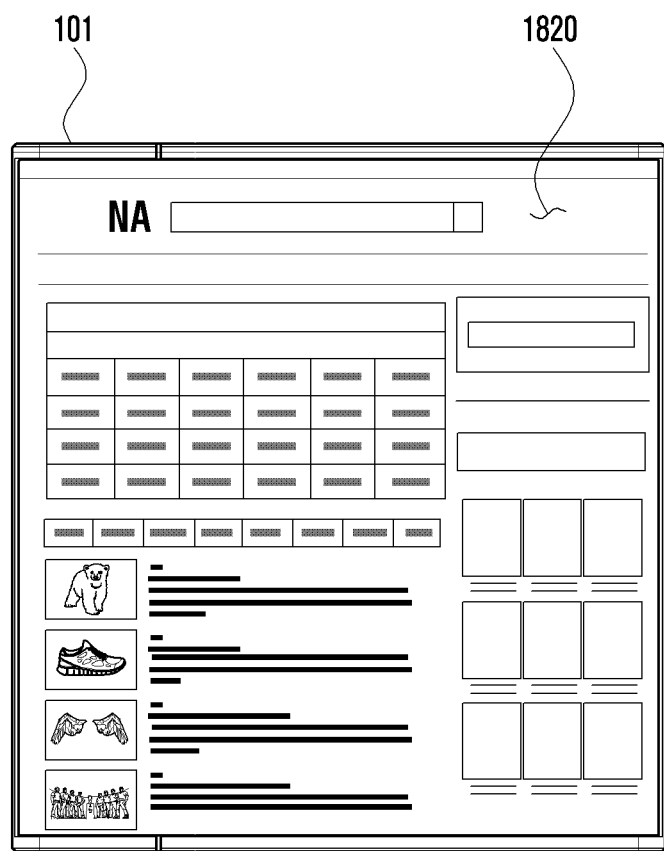

FIGS. 18A to 18C are diagrams illustrating examples of operating a display mode between an electronic device and a wearable electronic device according to various embodiments of the disclosure.

FIGS. 18A, 18B, and 18C show examples of providing content through an electronic device 101, based on determination of a first display mode, in an environment in which an electronic device 101 and a wearable electronic device 301 provide an AR service, based on a tethered method or a standalone method. FIGS. 18A, 18B, and 18C show examples in which the form factor of the electronic device 101 is a rollable type.

FIG. 18A shows an example in which the electronic device 101 enters an AR screen 1800 through the display module 520 of the wearable electronic device 301 and in which the user performs specified interaction (e.g., a rollable activation interaction) for the electronic device 101 on the AR screen 1800. For example, the user may move the electronic device 101 into the AR screen 1800, and then input a specified gesture (e.g., a slide-out gesture or a rollable extension gesture) using the electronic device 101.

Referring to FIG. 18A, the specified gesture may include a gesture of substantially extending the extension area of the electronic device 101 (e.g., substantially sliding out the display module 160 of the electronic device 101). The specified gesture may not be a substantial extension of the extension area of the electronic device 101. For example, the user may input only an extending gesture without substantially extending the electronic device 101. In an embodiment, the specified gesture may be detected based on the user's hand detection and/or hand tracking on the AR screen 1800.

FIGS. 18B and 18C show examples of providing content, which is being operated (e.g., displayed) through the AR screen 1800, through the actual display module 160 of the electronic device 101 in the real space (e.g., a first display mode), based on the display mode determined as a first display mode.

FIG. 18B shows an example in which the display module 160 of the electronic device 101 is extended in response to a specified interaction and in which the content 1810 being operated on the AR screen 1800 is displayed through an extension area B of the display module 160. The electronic device 101 may maintain the existing state of a default area A of the display module 160 and provide the extension area B that is extended according to a specified interaction as an active window for displaying the content 1810.

FIG. 18C shows an example in which the display module 160 of the electronic device 101 is extended in response to a specified interaction and in which the content 1820 being operated on the AR screen 1800 is displayed through the entire area including the default area A and the extension area B of the display module 160. For example, the specified interaction by the user may reflect a clear intention of the user for extension of a screen. Accordingly, the electronic device 101 may provide the entire area (e.g., default area A+extension area B) including the default area A and the extension area B of the display module 160 as an active window to display the content 1820.

An active window may be configured in at least one of the default area A, the extension area B, or the entire area (e.g., default area A+extension area B) of the electronic device 101, based on the overlapping state (or overlapping area) of an affordance according to the user's intention and the content. If the content 1810 and 1820 overlaps the affordance, an active window may be configured based on the extension area B such that the corresponding content is to be displayed in the extension area B of the electronic device 101. If the content 1810 and 1820 overlaps both the electronic device 101 (e.g., the default area A of the electronic device 101) and the affordance on the AR screen, an active window may be configured based on the entire area (e.g., default area A+extension area B) of the electronic device 101 such that the corresponding content is to be displayed in the entire area. If one piece of content 1810 or 1820 is disposed in the affordance, the active window may be configured based on the entire area (e.g., default area A+extension area B) of the electronic device 101 such that the corresponding content is to be displayed in the entire area.

If a plurality of pieces of content (e.g., first content and second content) overlaps the affordance, an active window may be configured based on each of the default area A and the extension area B such that the plurality of pieces of content is to be separately displayed in the default area A and the extension area B of the electronic device 101. One piece of content (e.g., first content) among a plurality of pieces of content overlaps the affordance and if another piece of content (e.g., second content) thereof overlaps the electronic device 101 (e.g., the default area A of the electronic device 101), for example, if each piece of content is disposed according to the user's intention, a first active window for the first content may be configured in the extension area B and a second active window for the second content may be configured in the default area A so as to display the first content and the second content to conform to the disposition according to the user's intention.

The affordance may be varied (e.g., extended) by a user input (e.g., an affordance extension interaction). If one piece of content (e.g., first content) is disposed in (e.g., overlaps) the extended affordance, the display module 160 of the electronic device 101 may be extended to correspond to the extended affordance and an active window may be configured so as to display one piece of content on the entire extended screen through the entire area (e.g., default area A+extension area B) including the extended extension area B and the default area A. If a plurality of pieces of content (e.g., first content and second content) is disposed in (e.g., overlaps) the extended affordance, an active window may be configured in each of the default area A and the extension area B so as to display the plurality of pieces of content in the default area A and the extension area B, respectively, or at least one active window may be configured in the extension area so as to display the plurality of pieces of content in the extension area B corresponding to the extended affordance.

If the electronic device 101 and/or the wearable electronic device 301 determines to display content, based on the first display mode, during operation for the AR service, it may operate to stop displaying the AR screen 1800 of the wearable electronic device 301, configure a specified active window for the content being displayed on the AR screen through the default area and/or the extension area of the display module 160 of the electronic device 101, and display content based on the configured active window.

Figure 19A:
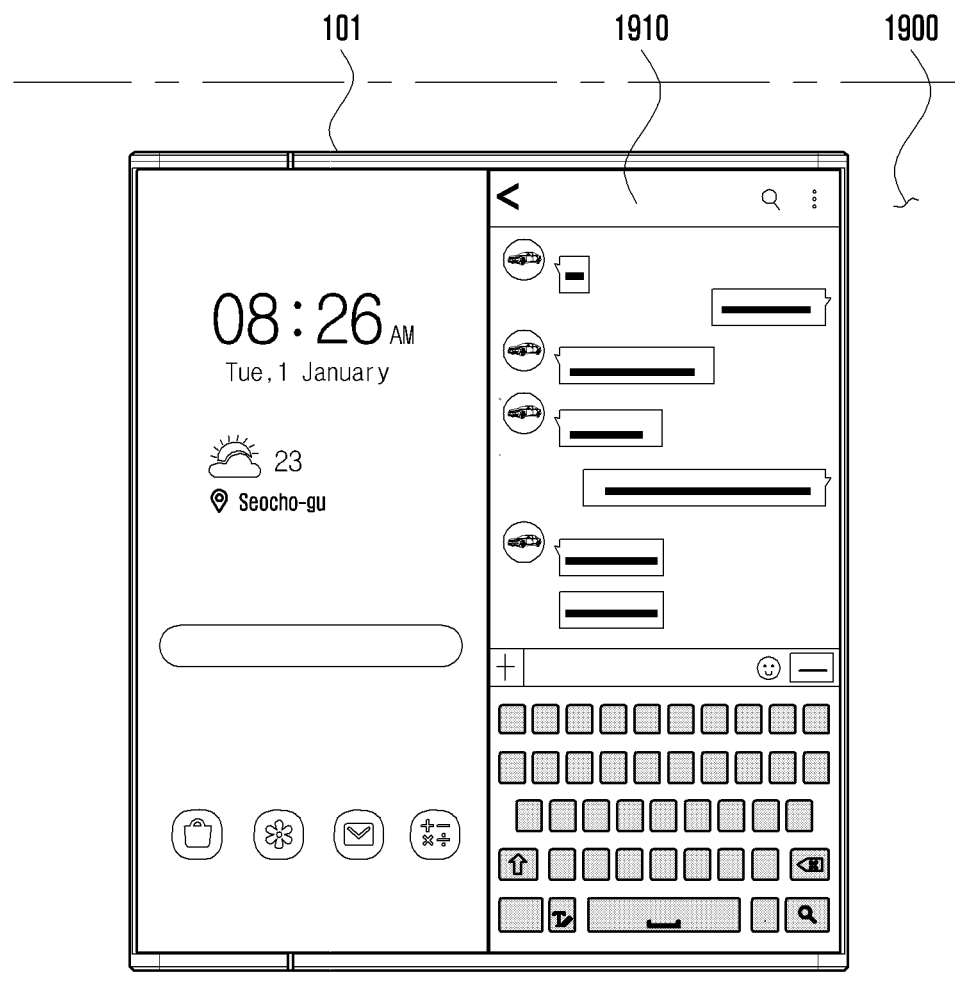
FIGS. 19A and 19B are diagrams illustrating an example of operating a display mode between an electronic device and a wearable electronic device according to various embodiments of the disclosure.
Figure 19B:
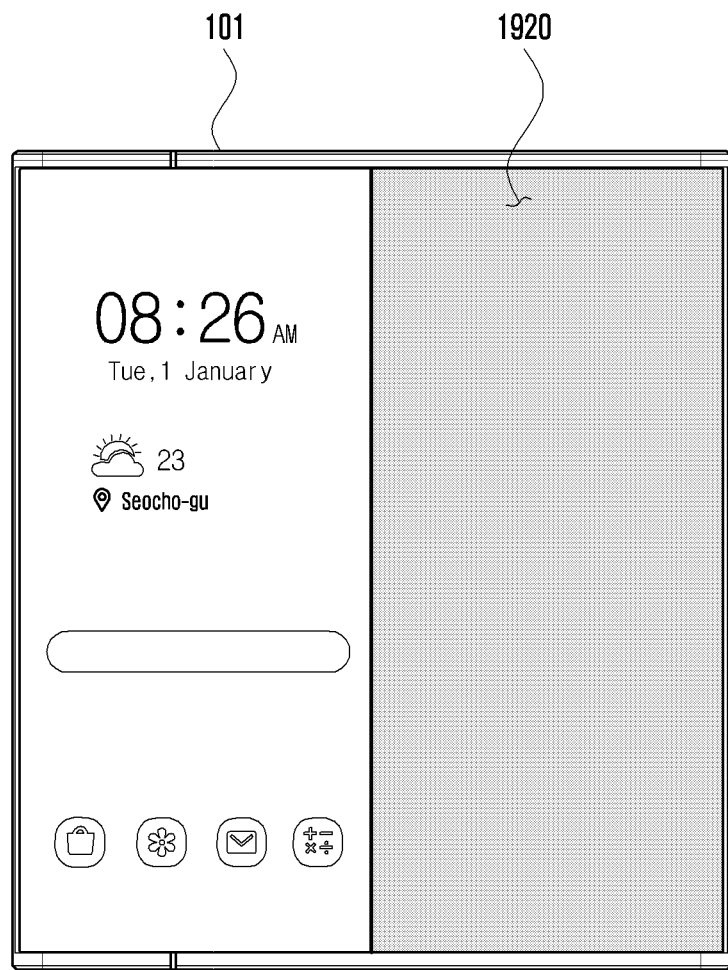

FIGS. 19A and 19B are diagrams illustrating an example of operating a display mode between an electronic device and a wearable electronic device according to various embodiments of the disclosure.

FIGS. 19A and 19B show examples of providing content through a wearable electronic device 301, based on determination of a second display mode, in an environment in which an electronic device 101 and a wearable electronic device 301 provide an AR service, based on a tethered method or a standalone method. FIGS. 19A and 19B show examples in which the form factor of the electronic device 101 is a rollable type.

FIG. 19A, shows an example of mapping (e.g., texture-mapping) content 1910 to the extension area of the electronic device 101 on the AR screen 1900 and displaying the same. Referring to FIG. 19B, FIG. 19B shows a state of the electronic device 101 viewed in the real space, which may, as shown, show an example of the state in which content is not displayed in the extension area of the electronic device 101 in the real space.

Referring to FIGS. 19A and 19B, if the electronic device 101 and/or the wearable electronic device 301 determines to display content, based on the second display mode, during operation for an AR service, content 1910 may be displayed in association with the electronic device 101 only through the AR screen 1900 of the wearable electronic device 301, for example, through the extension area of the display module 160 of the electronic device 101 on the AR screen 1900. Unlike this, the electronic device 101 in the real space may provide a corresponding area 1920 (e.g., the extension area) as an empty space or inactive space (or to be turned off), instead of displaying the content 1910 displayed through the AR screen 1900.

As shown in FIGS. 19A and 19B, a first user wearing the wearable electronic device 301 may check and control the content 1910 on the AR screen 1900, whereas at least one second user in the real space is unable to check the content 1910 through the electronic device 101.

When providing the content 1910 to the AR screen 1900 based on the second display mode, the electronic device 101 and/or the wearable electronic device 301 may further provide graphic processing for an area to which the content 1910 is mapped in the display module 160 of the electronic device 101 on the AR screen 1900. For example, in order to secure the user's visibility, the color (e.g., background color) of the area to which the content 1910 is mapped in the display module 160 of the electronic device 101 on the AR screen 1900 may be virtually changed. It is possible to provide a graphic effect of providing the background of the area where the content 1910 is mapped and displayed as a color contrasting to a representative color of the content 1910 (e.g., a dominant color).

Figure 20A:
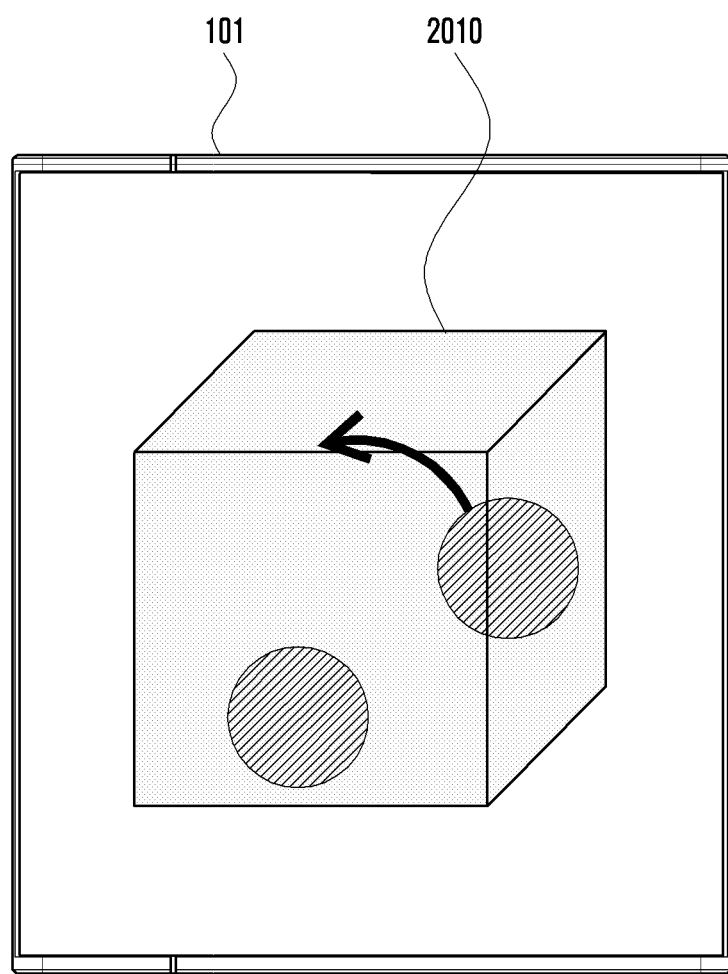
FIGS. 20A, 20B, and 20C are diagrams illustrating an example of operating content mirroring and interaction between an electronic device and a wearable electronic device according to various embodiments of the disclosure.
Figure 20B:
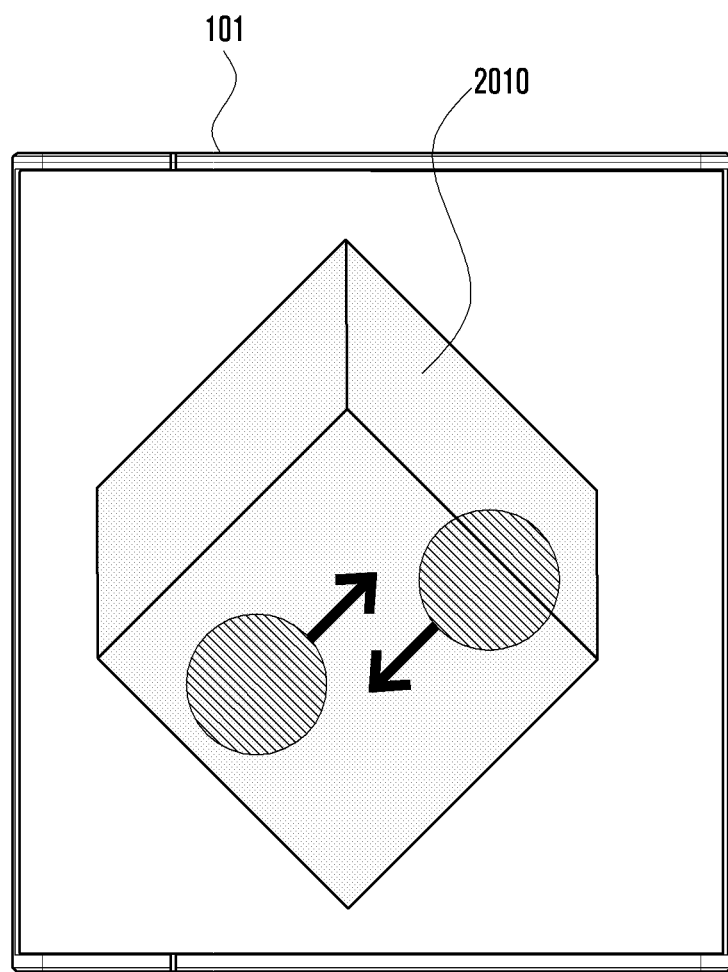
Figure 20C:
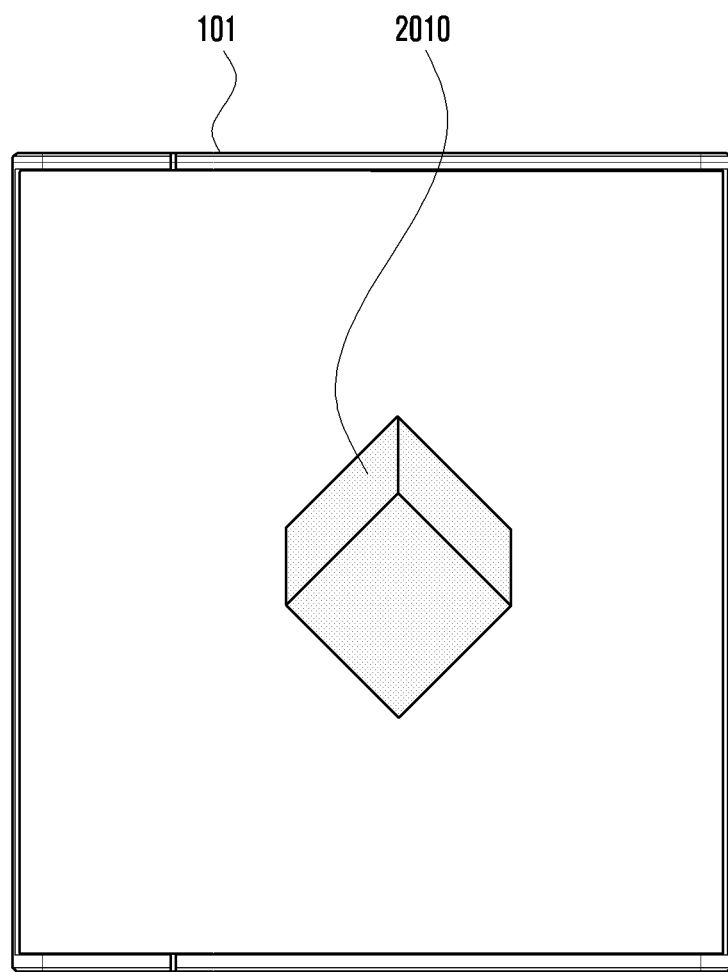

FIGS. 20A to 20C are diagrams illustrating an example of operating content mirroring and interaction between an electronic device and a wearable electronic device according to various embodiments of the disclosure.

FIGS. 20A, 20B, and 20C show examples of performing mirroring of at least one piece of content on an AR screen to an electronic device 101 through a wearable electronic device 301 and controlling at least one piece of content on the AR screen, based on an interaction input through the electronic device 101, in an environment in which the electronic device 101 and the wearable electronic device 301 provide an AR service, based on a tethered method or a standalone method.

Referring to FIGS. 20A to 20C, the electronic device 101 and/or the wearable electronic device 301 may execute a mirroring function based on a user's intention while displaying content through the AR screen according to the second display mode. For example, the user may be in the state of using an AR service by an application that is operable only in the wearable electronic device 301. The user may activate a mirroring function to display the content on the AR screen through the display module 160 of the electronic device 101. In an embodiment, the mirroring function may include, for example, a function of mirroring content (e.g., mirror content) according to an application operable in the wearable electronic device 301 on the electronic device 101 while displaying the content through the AR screen, thereby displaying the content through the display module 160 of the electronic device 101 as well.

The wearable electronic device 301 may mirror a variety of control information (e.g., components, objects, and/or windows) that the user may check and control through the wearable electronic device 301 on the electronic device 101 to be displayed thereon.

The mirroring function may enable the wearable electronic device 301 to perform processing on the content and the electronic device 101 to display the content transmitted (or mirrored) from the wearable electronic device 301.

Referring to FIGS. 20A to 20C, the electronic device 101 may display content 2010 transmitted from the wearable electronic device 301 through the display module 160. The user may use the electronic device 101 to control content displayed on the AR screen of the wearable electronic device 301. For example, the user may input various gestures (e.g., touch gestures) related to control of the content on the AR screen, based on the content 2010 displayed on the display module 160 of the electronic device 101.

The user may perform, with respect to the content 2010 displayed on the display module 160 of the electronic device 101, a first gesture input (e.g., FIG. 20A) for rotating the content 2010 by a screen touch operation, a second gesture input (e.g., FIG. 20B) for enlarging the content 2010 by a screen zoom-in operation (e.g., pinch zoom-in), or a third gesture input (e.g., FIG. 20C) for reducing the content 2010 by a screen zoom-out operation (e.g., pinch zoom-out).

Various gestures related to content control in the disclosure are not limited thereto. The various gestures may include a gesture of moving the content 2010 up, down, left, and right by a screen move operation or a gesture of moving the content 2010 back and forth by a screen multi-touch move operation may be included.

The electronic device 101 may detect a user input shown in FIGS. 20A, 20B, and/or 20C, calculate a point (e.g., a touch point) where the user input is detected in the content on the display module 160, and transmit related information (e.g., coordinates and/or spatial information) to the electronic device 101. The wearable electronic device 301 may convert the related information received from the electronic device 101 into coordinate information on the AR screen and process the converted coordinate information as a user input for controlling the content of the AR screen.

The wearable electronic device 301 may perform processing of controlling the content of the AR screen (e.g., execute a related function) to correspond to the user input based on the electronic device 101 and reflect the same on the content on the AR screen, thereby displaying a result screen thereof. For example, the wearable electronic device 301 may recognize a user input shown in FIGS. 20A, 20B, and/or 20C and, in response thereto, rotate, enlarge, or reduce the content on the AR screen, thereby displaying a result screen thereof.

Figure 21A:
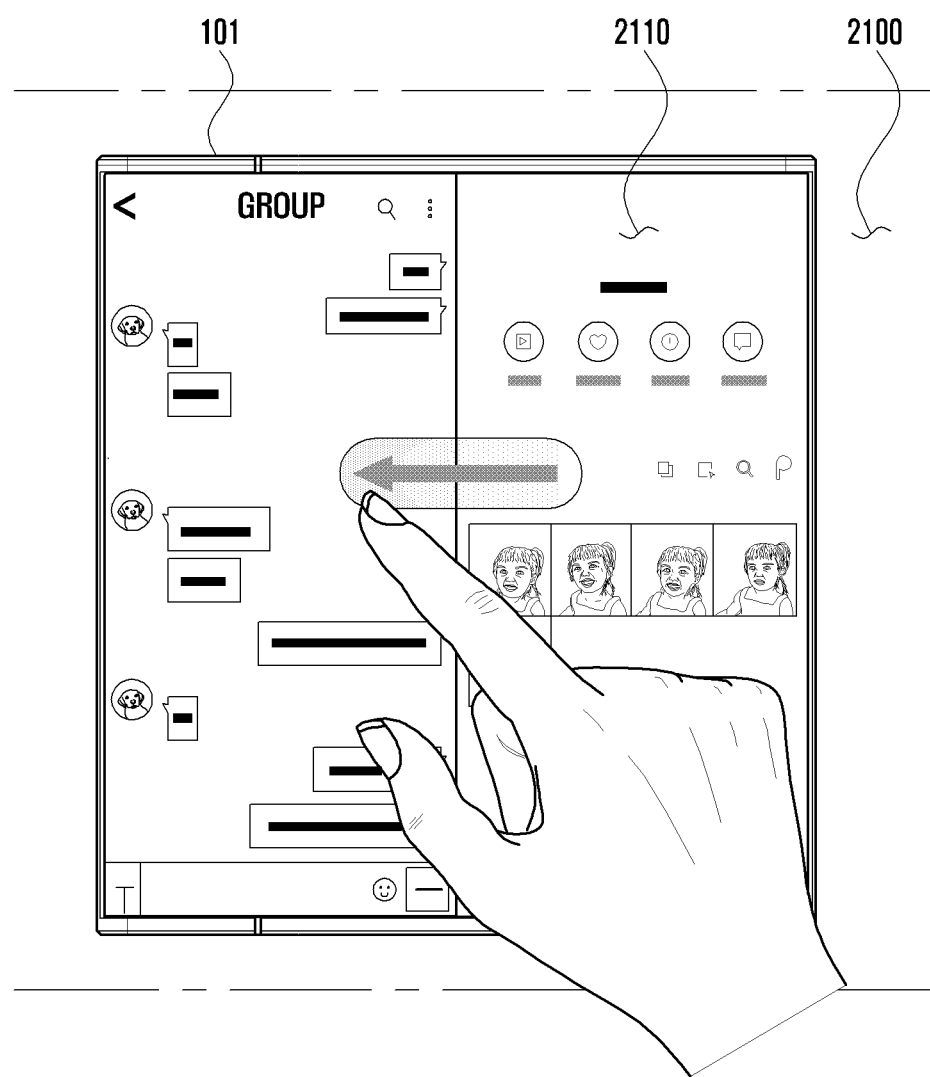
FIGS. 21A, 21B, and 21C are diagrams illustrating an example of an operation of sharing content between an electronic device and a wearable electronic device according to various embodiments of the disclosure.
Figure 21B:
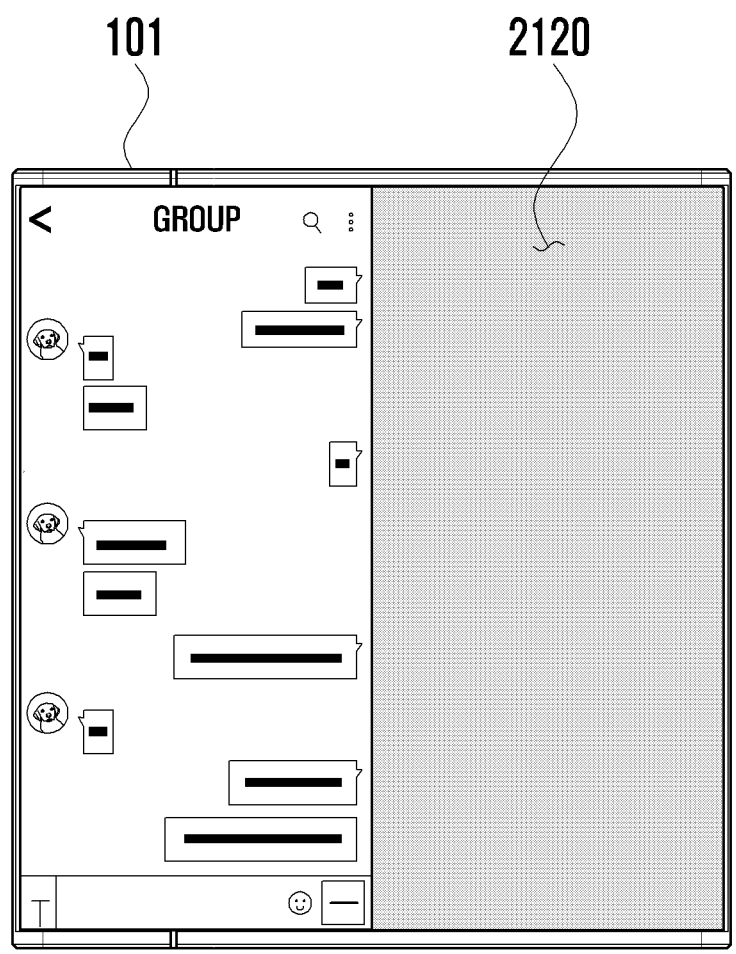
Figure 21C:
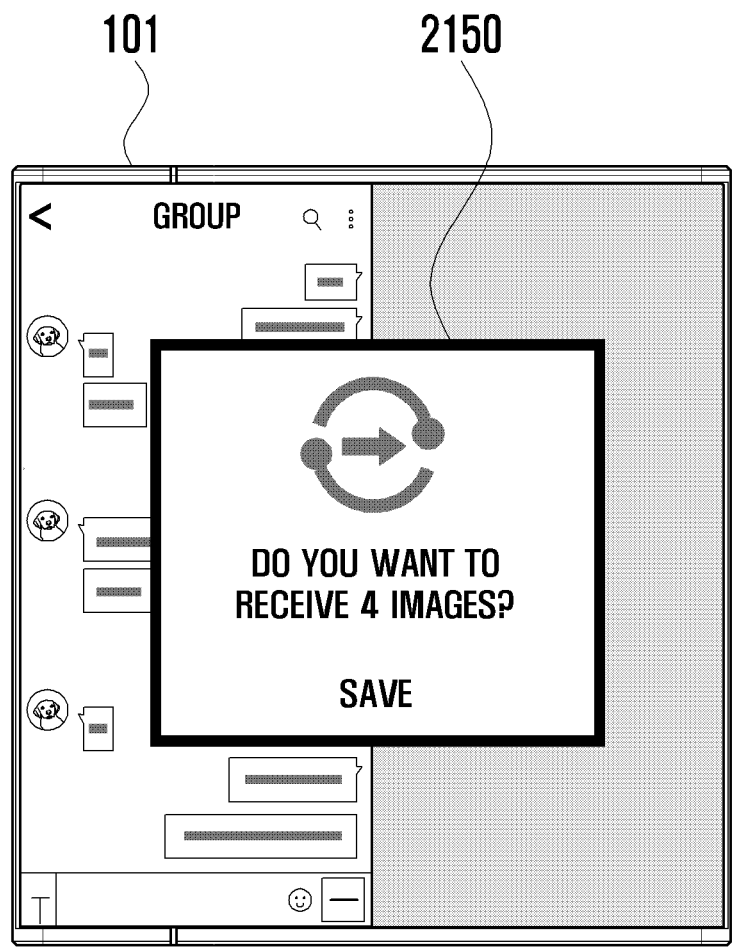

FIGS. 21A to 21C are diagrams illustrating an example of an operation of sharing content between an electronic device and a wearable electronic device according to various embodiments of the disclosure.

FIGS. 21A, 21B, and 21C show examples of providing content through an wearable electronic device 301, based on determination of a second display mode, and sharing at least a portion of content provided through the wearable electronic device 301 with an electronic device 101 in the real space in an environment in which the electronic device 101 and the wearable electronic device 301 provide an AR service, based on a tethered method or a standalone method. According to an embodiment, FIGS. 21A, 21B, and 21C may show an example in which the form factor of the electronic device 101 is a rollable type.

Referring to FIG. 21A, shows an example of mapping (e.g., texture-mapping) content 2110 to an extension area of the electronic device 101 on an AR screen 2100 and displaying the content. Referring to FIG. 21B, FIG. 21B shows a state of the electronic device 101 viewed in the real space, which may, as shown, show an example of the state in which content is not displayed in the extension area of the electronic device 101 in the real space.

Referring to FIGS. 21A and 21B, if the electronic device 101 and/or the wearable electronic device 301 determines to display content, based on the second display mode, during operation for an AR service, content 2110 may be displayed in association with the electronic device 101 only through the AR screen 2100 of the wearable electronic device 301, for example, through the extension area of the display module 160 of the electronic device 101 on the AR screen 2100. Unlike this, the electronic device 101 in the real space may provide a corresponding area 2120 (e.g., the extension area) as an empty space or inactive space (or to be turned off), instead of displaying the content 2110 displayed through the AR screen 2100.

Referring to FIGS. 21A and 21B, a first user wearing the wearable electronic device 301 may check and control the content 2110 on the AR screen 2100, whereas at least one second user in the real space is unable to check the content 2110 through the electronic device 101.

In the environment referring to FIGS. 21A and 21B, the electronic device 101 and/or the wearable electronic device 301 may execute a sharing function based on the user's intention while displaying the content 2110 through the AR screen 2110. The user may activate a sharing function that enables the content 2110 (or at least a portion (e.g., content data) of the content 2110) on the AR screen 2100 to be shared with the electronic device 101 (e.g., transmission of content data of the content 2110 (or file transmission) or partial disclosure thereof through the display module 160 of the electronic device 101). In an embodiment, the sharing function may include, for example, a function in which the wearable electronic device 301 transmits the content 2110 (or at least a portion of the content 2110) to the electronic device 101 while displaying the content 2110 on the AR screen 2100 to be shared with the electronic device 101.

Referring to FIG. 21A, the electronic device 101 and/or the wearable electronic device 301 may process a user interaction for the content 2110 mapped to the electronic device 101 on the AR screen 2100 (e.g., a user's gesture input based on the content displayed on the AR screen 2100). The electronic device 101 and/or the wearable electronic device 301 may operate to track and detect a user interaction for executing a sharing function to share the content 2110 (e.g., at least a portion of the content 2110) on AR screen 2100 and process a function of sharing the content 2110 with the electronic device 101 in response to the user interaction.

The user may input a gesture of selecting a specific object (e.g., text and/or an image) from the content 2110 mapped to a second area (e.g., the extension area) of the electronic device 101 on the AR screen 2100 and dragging the same to a first area (e.g., the default area) (e.g., a gesture of dragging from the right area to the left area with reference to the example in FIG. 21A). The wearable electronic device 301 may track and detect a user input related to a gaze sharing function and transmit the content 2110 (e.g., a selected specific object) at a point (e.g., a touch point) where the user input is detected on the AR screen 2100 to the electronic device 101 through specified communication.

The electronic device 101 may operate to detect reception of the content 2110 (e.g., at least a portion of the content 2110) from the wearable electronic device 301, store the received content 2110 in the memory 130 of the electronic device 101, and/or display the same through the display module 160. If the content 2110 is received from the wearable electronic device 301, as shown in FIG. 21C, the electronic device 101 may provide information from the wearable electronic device 301, stating that the content 2110 is to be shared, to the user in a specified form (e.g., in a pop-up form). For example, the electronic device 101 may provide a guide window 2150 in the form of a pop-up, which informs that there is content 2110 to be shared with the wearable electronic device 301 and enables receiving and storing the shared content 2110 or rejecting (cancelling) the reception of the shared content 2110.

When providing the guide window 2150 related to the content 2110 shared by the user, as shown in FIG. 21C, the electronic device 101 may provide the guide window 2150 as a pop-up while maintaining the state shown in FIG. 21B (e.g., the inactive state of the extension area). If reception and storage of the shared content 2110 is selected by the user, the electronic device 101 may receive the shared content 2110 from the wearable electronic device 301 and store the same in the memory 130. The electronic device 101 may provide (e.g., display) the content 2110, which is received and stored, through a default area (e.g., the left area in FIG. 21A) of the display module 160. For example, the electronic device 101 may display the shared content 2110 through the default area while maintaining the inactive state of the extension area. Assuming a state in which the electronic device 101 displays a chat window through the default area, the electronic device 101 may operate to reflect the shared content 2110 from the wearable electronic device 301 on the chatting window in the form of an attached file and display the same within the chat window of the default area.

A method of providing an augmented reality (AR) service according to an embodiment of the disclosure may include providing content through an AR screen, detecting a specified external object through the AR screen while providing the content, determining a display mode for providing the content, based on the detection of the specified external object, and, based on the determined display mode, performing control to display the content through a display module of the specified external object (e.g., the display module 160 of the electronic device 101) or performing control to display the content through a virtual display area associated with the specified external object on the AR screen.

The detecting of the external object may include detecting a specified interaction through the AR screen.

The determining of the display mode may include determining whether a target device processing the content is an electronic device 101 or a wearable electronic device 301, based on the detection of the specified interaction, if the target device is determined to be the electronic device 101, determining a first display mode in which the content on the AR screen switches to be displayed through the electronic device 101, and if the target device is determined to be the wearable electronic device 301, determining a second display mode in which the content is mapped to the electronic device 101 and displayed on the AR screen.

The performing control to display the content may include, based on the determination of the first display mode, performing control to stop displaying a screen of the wearable electronic device 301 and controlling the display of the content being displayed through the AR screen, based on a display area corresponding to the display module 160 of the electronic device 101.

The performing control to display the content may include configuring a specified active window for the content being displayed on the AR screen through the default area and/or the extension area of the display module 160 of the electronic device 101, and controlling display of content based on the configured active window.

The performing control to display the content may include, based on the determination of the second display mode, controlling display of content based on a virtual display area associated with the electronic device 101 on an AR screen provided through the display module 590 of the wearable electronic device 301.

The performing control to display the content may include, based on the determination of the second display mode, configuring a virtual area corresponding to the extension area of the display module 160 of the electronic device 101 to correspond to the extension area of the electronic device 101, configuring a specified active window for the content being displayed on the AR screen, based at least on the default area, the extension area, and/or the virtual area of the display module 160 of the electronic device 101, and controlling display of the content through content mapping based on the configured active window.

If the content is provided according to the second display mode, the content mapped to the AR screen may be provided only through a display area associated with the electronic device 101 on the AR screen, instead of being displayed through the display module 160 of the electronic device 101 in the real space.

The method may further indicate determining whether or not the content corresponds to a specified profile when determining the target device processing the content and, if the content corresponds to the specified profile, determining the second display mode so as to provide content of the specified profile through the AR screen, regardless of the target device processing the content.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An augmented reality (AR) device, the AR device comprising:
    a display;
    communication circuitry;
    a camera;
    at least one processor comprising processing circuitry; and
    memory storing instructions that, when executed by the at least one processor, individually and/or collectively, cause the AR device to:
        connect, through the communication circuitry, with an external device,
        display a first content on an execution screen provided through the display,
        while displaying the first content via the display, detect the external device from an image obtained through the camera,
        determine a display mode for displaying a second content, based on the detection of the external device, and
        based on the determined display mode, control to display the second content through a specified display area,
    wherein the first content and the second content are provided by the external device, and
    wherein the second content is displayed based on the display of the AR device or a display of the external device, based on the determined display mode.

2. The AR device of claim 1,
    wherein the first content and the second content are produced by the external device, and are displayed through the display of the external device or the display of the AR device.

3. The AR device of claim 2, wherein the instructions that, when executed by the at least one processor, cause the AR device to:
    if the content corresponds to a specified profile, determine the display mode as a second display mode,
    receive content data related to the content from the external device connected through specified communication, and
    display the content on the execution screen provided through the display of the AR device.

4. The AR device of claim 3, wherein the specified profile comprises identification information related to whether or not the content is information related to privacy and/or whether the content is an application category specified to be protected by a user.

5. The AR device of claim 3, wherein the instructions that, when executed by the at least one processor, cause the AR device to:
    determine whether or not the content corresponds to the specified profile, and
    in case that the content corresponds to the specified profile, determine the second display mode so as to provide content of the specified profile through the display of the AR device.

6. The AR device of claim 1,
    wherein the display mode includes a first display mode for displaying content on an execution screen in the display of the external device and a second display mode for displaying content on an execution screen in the display of the AR device.

7. The AR device of claim 6,
    wherein the first display mode includes a display mode in which the content is displayed on the execution screen of the external device, and
    wherein the second display mode includes a display mode in which the content is mapped and displayed to the external device displayed on the execution screen of the AR device.

8. The AR device of claim 6, wherein the instructions that, when executed by the at least one processor, cause the AR device to:
    based on the determination of the first display mode, control to display the content via a specified display area based on a state of the external device in the display of the external device, and
    based on the determination of the second display mode, control to display the content via a specified display area based on a state of the external device in the display of the AR device.

9. The device of claim 6, wherein the instructions that, when executed by the at least one processor, cause the AR device to:
    based on the determination of the second display mode, control to display the content based on a virtual area associated with the external device on an execution screen provided through the display of the AR device, and
    based on the determination of the second display mode, control to stop displaying an execution screen of the external device.

10. The AR device of claim 1, wherein the instructions that, when executed by the at least one processor, cause the AR device to:
    detect an input that changes a state of the display of the external device,
    based on the input detection, determine a display area for the content to be displayed according to the state of the display of the external device, and
    control to display the content based on the determined display area.

11. The AR device of claim 1, wherein the instructions that, when executed by the at least one processor, cause the AR device to detect a specified interaction related to determining the display mode for displaying content.

12. The AR device of claim 11, wherein the specified interaction comprises:
    an interaction that detects the external device on an execution screen provided through the display of the AR device, an interaction that detects the external device from an image obtained through the camera, an interaction that detects a specified gesture, such as a slide-out gesture or a rollable extension gesture, input by a user using the external device after the detection of the external device, and/or an interaction that detects an input based on a specified menu provided through the AR device on the execution screen after the detection of the external device.

13. A wearable device for providing augmented reality (AR) services, the wearable device comprising:

a display;

communication circuitry;

at least one processor comprising processing circuitry; and memory storing instructions that, when executed by the at least one processor, individually and/or collectively, cause the wearable device to:

connect, through the communication circuitry, with an external device, display content on an execution screen provided through the display, based on an execution of an application, while displaying the content via the display, detect a specified interaction related to determining a display mode, determine the display mode, based on the specified interaction, if the display mode is determined to be a first display mode, control to display the content through a display of the external device, and if the display mode is determined to be a second display mode, control to display the content on the execution screen through the display of the wearable device, wherein the content is provided by the wearable device, and wherein the content is displayed the display of the wearable device or the display of the external device, based on the determined display mode.

14. The wearable device of claim 13, wherein the instructions that, when executed by the at least one processor, cause the wearable device to:

based on the determination of the first display mode, transmit content data related to the content mapping to the external device and control to display through the display of the external device, based on the determination of the second display mode, map the content, based on a display area corresponding to the external device of the execution screen and control to display the content through the display area on the execution screen.

15. The wearable device of claim 13, wherein the instructions that, when executed by the at least one processor, cause the wearable device to detect the specified interaction related to determining the display mode for displaying the content.

16. The wearable device of claim 15, wherein the specified interaction comprises at least one interaction that detects the external device connected to the wearable device through the execution screen while displaying the execution screen, and wherein the at least one interaction comprises:

an interaction that detects the external device on an execution screen provided through the display of the wearable device, an interaction that detects the external device from an image obtained through a camera, an interaction that detects a specified gesture, such as a slide-out gesture or a rollable extension gesture, input by a user using the external device after the detection of the external device, and/or an interaction that detects an input based on a specified menu provided through the external device on the execution screen after the detection of the external device.

17. The wearable device of claim 13, wherein the instructions that, when executed by the at least one processor, cause the wearable device to:

determine whether the content is processed by the external device or the wearable device, based on the detection of the specified interaction, based on determining the external device, determine the first display mode in which the content on the execution screen of the wearable device switches to be displayed through the external device, and based on determining the wearable device, determine the second display mode in which the content is mapped to a display area corresponding to the external device and displayed on the execution screen of the wearable device.

18. The wearable device of claim 13, wherein the instructions that, when executed by the at least one processor, cause the wearable device to:

if the content corresponds to a specified profile, determine the display mode as the second display mode, and display the content on the execution screen provided through the display of the wearable device, wherein the specified profile comprises identification information related to whether or not the content is information related to privacy and/or whether the content is an application category specified to be protected by a user.

19. The wearable device of claim 18, wherein the instructions that, when executed by the at least one processor, cause the wearable device to:

determine whether or not the content corresponds to the specified profile, and in case that the content corresponds to the specified profile, determine the second display mode so as to provide content of the specified profile through the execution screen provided through the display.

20. A non-transitory computer-readable recording medium storing a program which, when executed, causes an augmented reality (AR) device to perform operations comprising:

connecting with an external device, displaying a first content on an execution screen provided through a display, while displaying the first content via the display, detecting the external device from an image obtained through a camera, determining a display mode for displaying a second content, based on the detection of the external device, and based on the determined display mode, controlling to display the second content through a specified display area, wherein the first content and the second content are provided by the external device or the AR device, and wherein the second content is displayed based on the display of the AR device or a display of the external device, based on the determined display mode.

* * * * *